(12) United States Patent
Freiman

(10) Patent No.: US 8,762,835 B2
(45) Date of Patent: *Jun. 24, 2014

(54) OBJECTS HAVING USAGE RULES THAT EXIST OUTSIDE OF THE DOCUMENT IN WHICH THE OBJECT IS USED

(75) Inventor: Daniel J. Freiman, Philadelphia, PA (US)

(73) Assignee: Colorquick, L.L.C., Pennsauken, NJ (US)

( * ) Notice: Subject to any disclaimer, the term of this patent is extended or adjusted under 35 U.S.C. 154(b) by 907 days.

This patent is subject to a terminal disclaimer.

(21) Appl. No.: 12/429,289

(22) Filed: Apr. 24, 2009

(65) Prior Publication Data

US 2009/0254811 A1 Oct. 8, 2009

Related U.S. Application Data

(63) Continuation of application No. 12/417,480, filed on Apr. 2, 2009.

(60) Provisional application No. 61/041,839, filed on Apr. 2, 2008.

(51) Int. Cl.
*G06F 17/00* (2006.01)
*G06F 17/24* (2006.01)
*G06F 17/21* (2006.01)

(52) U.S. Cl.
CPC .................................. *G06F 17/24* (2013.01); *G06F 17/211* (2013.01)
USPC ........... 715/255; 715/200; 715/204; 715/234; 715/243

(58) Field of Classification Search
CPC .............................. G06F 17/24; G06F 17/211
USPC .......... 715/200, 204, 211, 234, 243, 255, 273
See application file for complete search history.

(56) References Cited

U.S. PATENT DOCUMENTS

| | | | | |
|---|---|---|---|---|
| 5,845,303 A * | 12/1998 | Templeman | ................... | 715/255 |
| 5,895,477 A * | 4/1999 | Orr et al. | ....................... | 715/202 |
| 6,038,567 A | 3/2000 | Young | | |
| 6,173,286 B1 * | 1/2001 | Guttman et al. | .............. | 715/234 |
| 6,177,935 B1 | 1/2001 | Munn | | |
| 6,199,082 B1 * | 3/2001 | Ferrel et al. | ................... | 715/205 |
| 6,560,616 B1 | 5/2003 | Garber | | |
| 6,606,633 B1 | 8/2003 | Tabuchi | | |

(Continued)

OTHER PUBLICATIONS

Microsoft, "Microsoft Office Publisher 2003", Microsoft, copyrighted 2003, FIG 0-12e, p. 1-3 (25 total pages).*

(Continued)

*Primary Examiner* — Cesar Paula
*Assistant Examiner* — David Faber
(74) *Attorney, Agent, or Firm* — Panitch Schwarze Belisario & Nadel LLP

(57) ABSTRACT

An electronically manipulative object that is usable in a plurality of different electronic documents comprises at least one electronically stored property that includes an associated rule that affects the object or the electronic document that the object is used in. The at least one electronically stored property and associated rule are elements of the object. The object and at least one of electronically stored property and associated rule exists outside of document that the object is used in. The rule associated with the at least one property is enforced in the plurality of different documents.

4 Claims, 75 Drawing Sheets

(56) References Cited

U.S. PATENT DOCUMENTS

| | | | |
|---|---|---|---|
| 6,931,591 | B1 | 8/2005 | Brown et al. |
| 7,373,593 | B2 * | 5/2008 | Uchida .................. 715/210 |
| 7,427,995 | B2 | 9/2008 | Farrah |
| 7,448,023 | B2 * | 11/2008 | Chory et al. ............ 717/124 |
| 7,554,689 | B2 | 6/2009 | Tonisson |
| 8,548,963 | B2 | 10/2013 | Dettori et al. |
| 2003/0200504 | A1 | 10/2003 | Atkinson et al. |
| 2004/0003057 | A1 | 1/2004 | Broad et al. |
| 2004/0030997 | A1 | 2/2004 | Farrah |
| 2005/0149861 | A1 | 7/2005 | Bishop et al. |
| 2006/0195819 | A1 * | 8/2006 | Chory et al. ............ 717/117 |
| 2007/0038670 | A1 * | 2/2007 | Dettori et al. .......... 707/104.1 |
| 2007/0078672 | A1 * | 4/2007 | Lee et al. ............... 705/1 |
| 2008/0256439 | A1 | 10/2008 | Boreham et al. |

OTHER PUBLICATIONS

Microsoft, "Microsoft Office Publisher 2003", Microsoft, copyrighted 2003, FIG 0-13f, p. 1-5 (30 total pages).*

O'Reilly and Associates, Inc, GFF Format Summary: Microsoft Windows Metafile, O'Reilly and Associates, Inc, copyrighted 1996, p. 1-21 http://wvware.sourceforge.net/caolan/ora-wmf.html.*

Ferrie, Peter, "Inside the Windows Meta File Format", Symantec, published Feb. 2006, p. 1-12.*

Companion Software , "Windows Metafile FAQ", Companion Software, published Nov. 23, 1997, p. 1-6 http://alpha-supernova.dev.filibeto.org/lib/ossc/doc/mswordview-0.5.2/notes/wmf/WindowsMetafileFaq.html.*

Microsoft, "Windows Metafile Format (wmf) Specification", Microsoft, copyrighted 2007, p. 1-210.*

Office Action Issued Mar. 19, 2010 in U.S. Appl. No. 12/417,480, 17 pages.

Bear, "Template—Defining Templates as Used in Desktop Publishing", 2003, About, pp. 1-2; http://web.archive.org/web/20031229174840/http://desktoppub.about.com/cs/basic/g/template.htm.

* cited by examiner

OBJECTS HAVING USAGE RULES THAT EXIST OUTSIDE OF THE DOCUMENT IN WHICH THE OBJECT IS USED

CROSS-REFERENCE TO RELATED APPLICATIONS

This application is a continuation of U.S. application Ser. No. 12/417,480 filed Apr. 2, 2009, the entire disclosure of which is incorporated herein by reference.

This application claims the benefit of U.S. Provisional Patent Application No. 61/041,839 filed Apr. 2, 2008.

COPYRIGHT NOTICE AND AUTHORIZATION

Portions of the documentation in this patent document contain material that is subject to copyright protection. The copyright owner has no objection to the facsimile reproduction by anyone of the patent document or the patent disclosure as it appears in the Patent and Trademark Office file or records, but otherwise reserves all copyright rights whatsoever.

BACKGROUND OF THE INVENTION

It is well-known to use objects within an electronic document. The object may cause text and/or images to appear in the electronic document at a user-defined location. Objects may include rules that affect the object. However, rules in conventional objects are associated with the environment that the object is used in, such as the particular document that the object is used in. It would be desirable to define objects that are not constrained in this manner. The present invention fulfills such a need.

BRIEF SUMMARY OF THE INVENTION

In one preferred embodiment, an object that is usable in a plurality of different environments comprises at least one property having an associated rule that affects the object. The object and at least one of its properties and associated rules exist outside of an environment that the object is used in. The rule associated with the at least one property is enforced in the plurality of different environments.

BRIEF DESCRIPTION OF THE DRAWINGS

The foregoing summary as well as the following detailed description of preferred embodiments of the invention, will be better understood when read in conjunction with the appended drawings. For the purpose of illustrating the invention, the drawings show presently preferred embodiments. However, the invention is not limited to the precise arrangements and instrumentalities shown. In the drawings.

DETAILED DESCRIPTION OF THE INVENTION

Certain terminology is used herein for convenience only and is not to be taken as a limitation on the present invention.

This patent application includes an Appendix having a file named appendix10379-26U2.txt, created on Apr. 14, 2009, and having a size of 1,466,432 bytes. The Appendix is incorporated by reference into the present patent application. One preferred embodiment of the present invention is implemented via the source code in the Appendix. The Appendix is subject to the "Copyright Notice and Authorization" stated above.

The present invention is described in the context of a web-based commercial implementation called Improv™ marketed by Colorquick, L.L.C, Pennsauken, N.J. Improv is a document composition application.

FIGS. 1-11 show the creation of an object, the association of rules to properties of that object, the enforcement of those rules, and the saving of that object and the associated rules as a "Smart Object" to a digital asset library of Smart Objects outside of the document and application in which the object was created.

In one preferred embodiment, a smart object is an object that is usable in a plurality of different environments. The object comprises at least one property having an associated rule that affects the object. The object and the at least one property and associated rule exists outside of an environment that the object is used in. The rule associated with the at least one property is enforced in the plurality of different environments.

In another preferred embodiment, a smart object is an object that is usable in a plurality of different environments. The object comprises at least one property having an associated rule that affects the environment that the object is used in. The object and the at least one property and associated rule exists outside of an environment that the object is used in. The rule associated with the at least one property is enforced in the plurality of different environments.

In other preferred embodiments, a smart object is an object that is usable in a plurality of different environments. The object comprises at least one rule that affects either the object or the environment that the object is used in. The object and the at least one rule exists outside of an environment that the object is used in. The at least one rule is enforced in the plurality of different environments.

Figure 1:
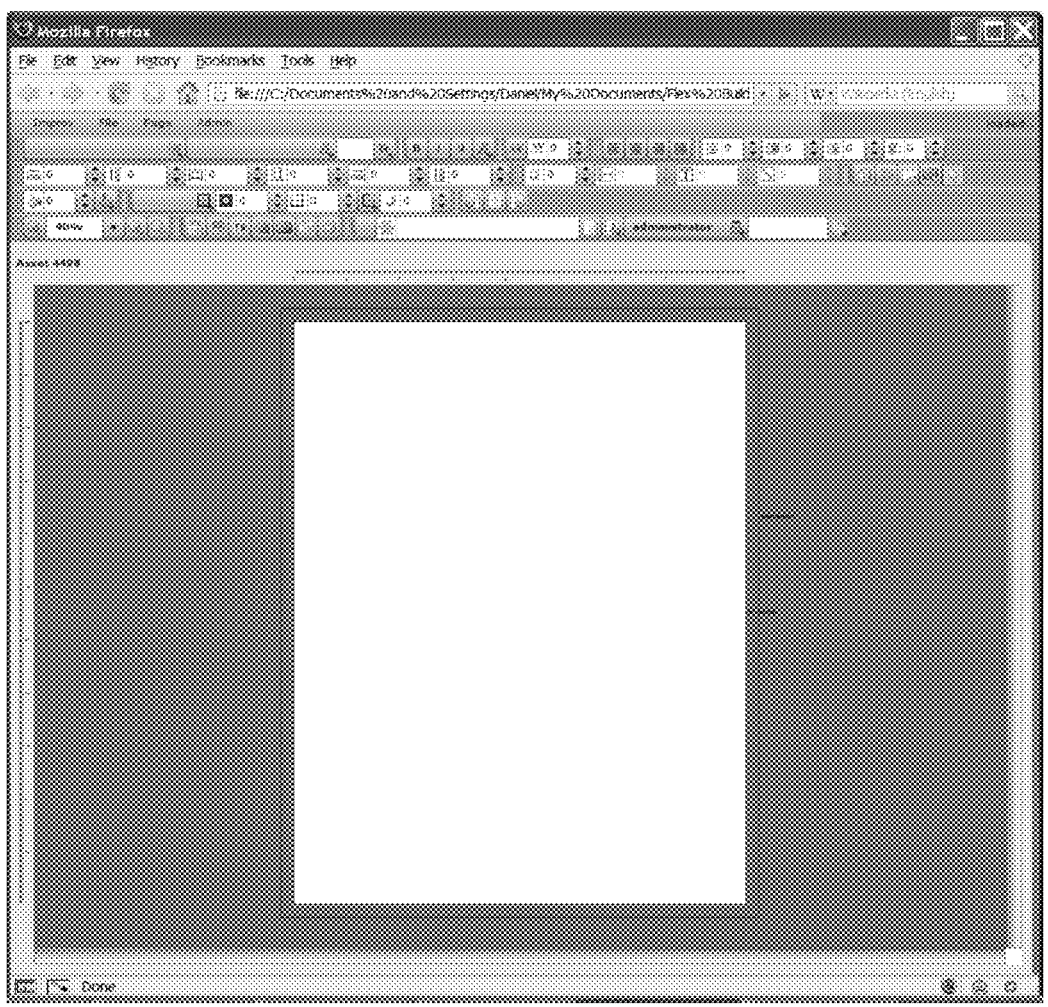
FIGS. 1-71 are user interface display screens in accordance with preferred embodiments of the present invention.
Figure 2:
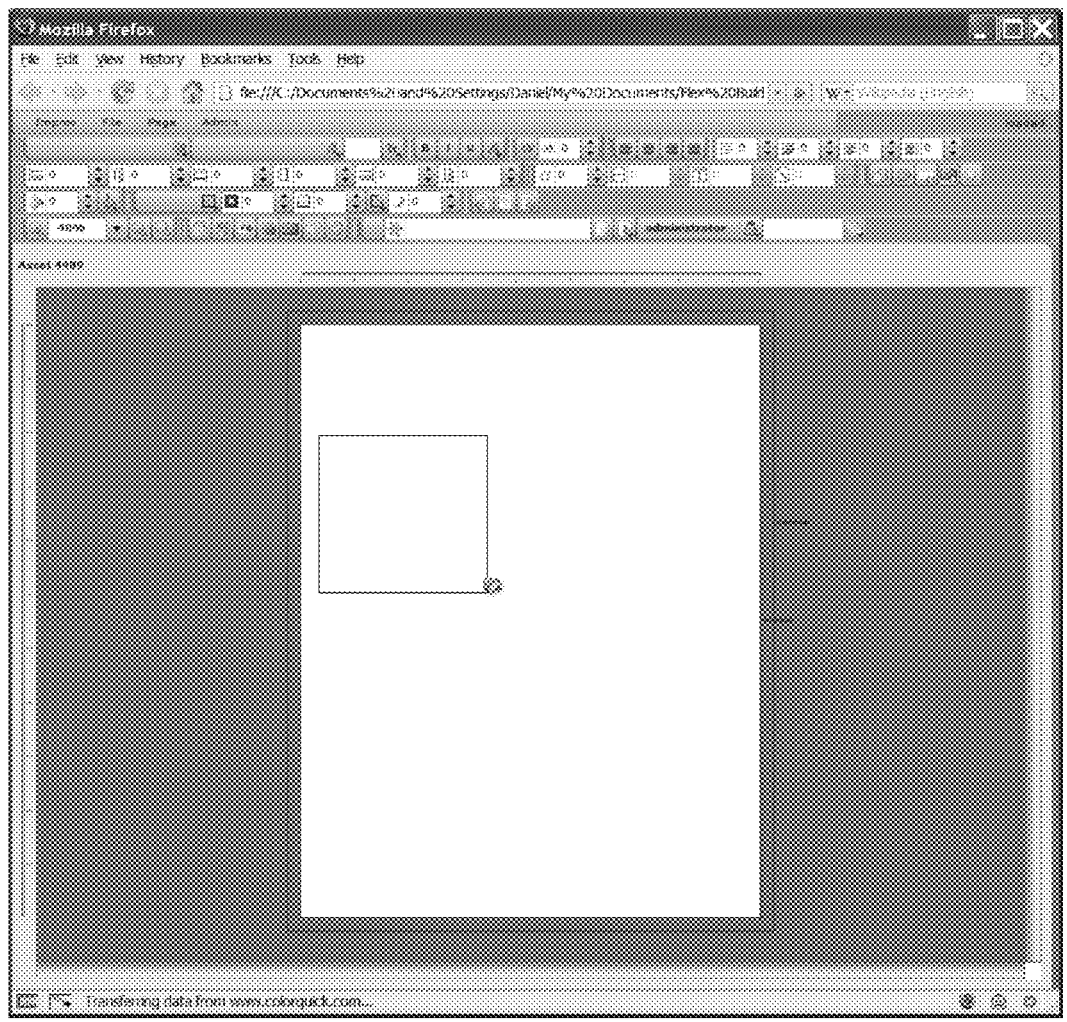
Figure 3:
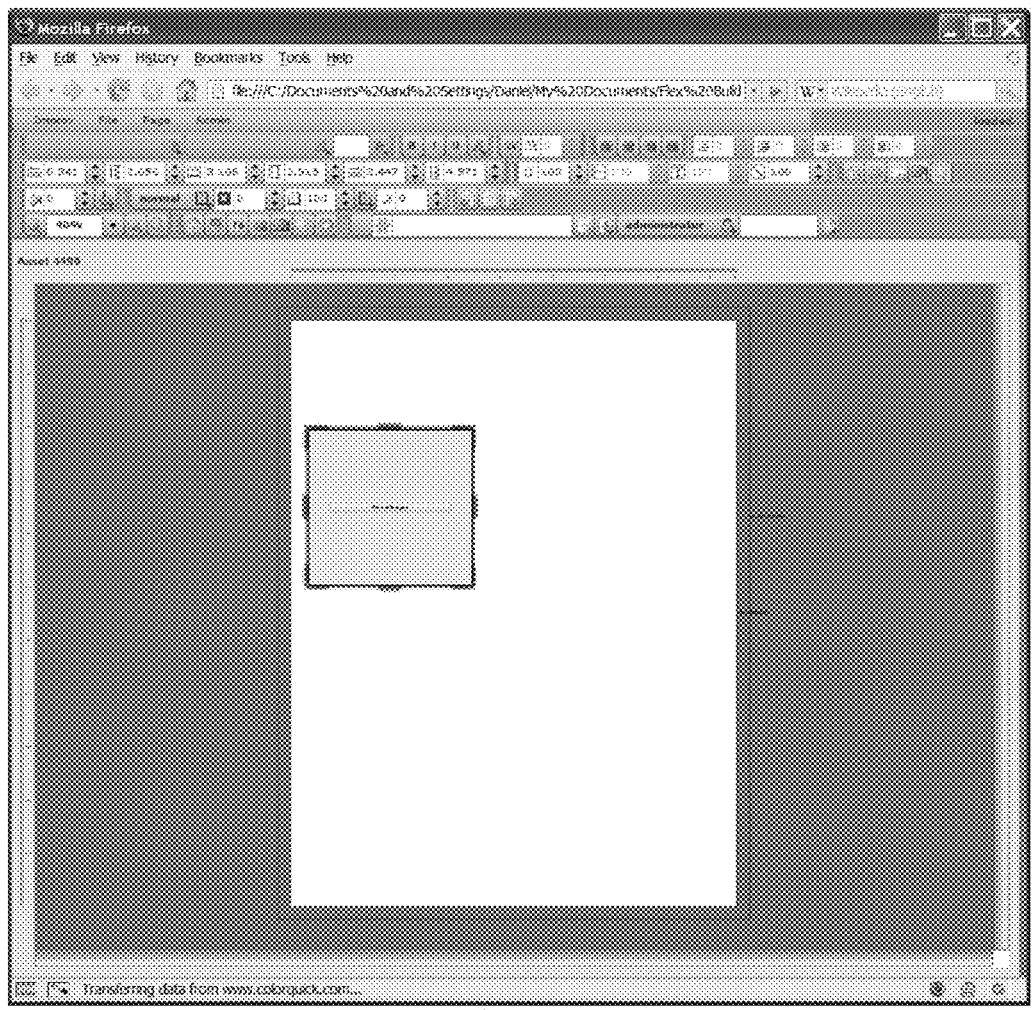
Figure 4:
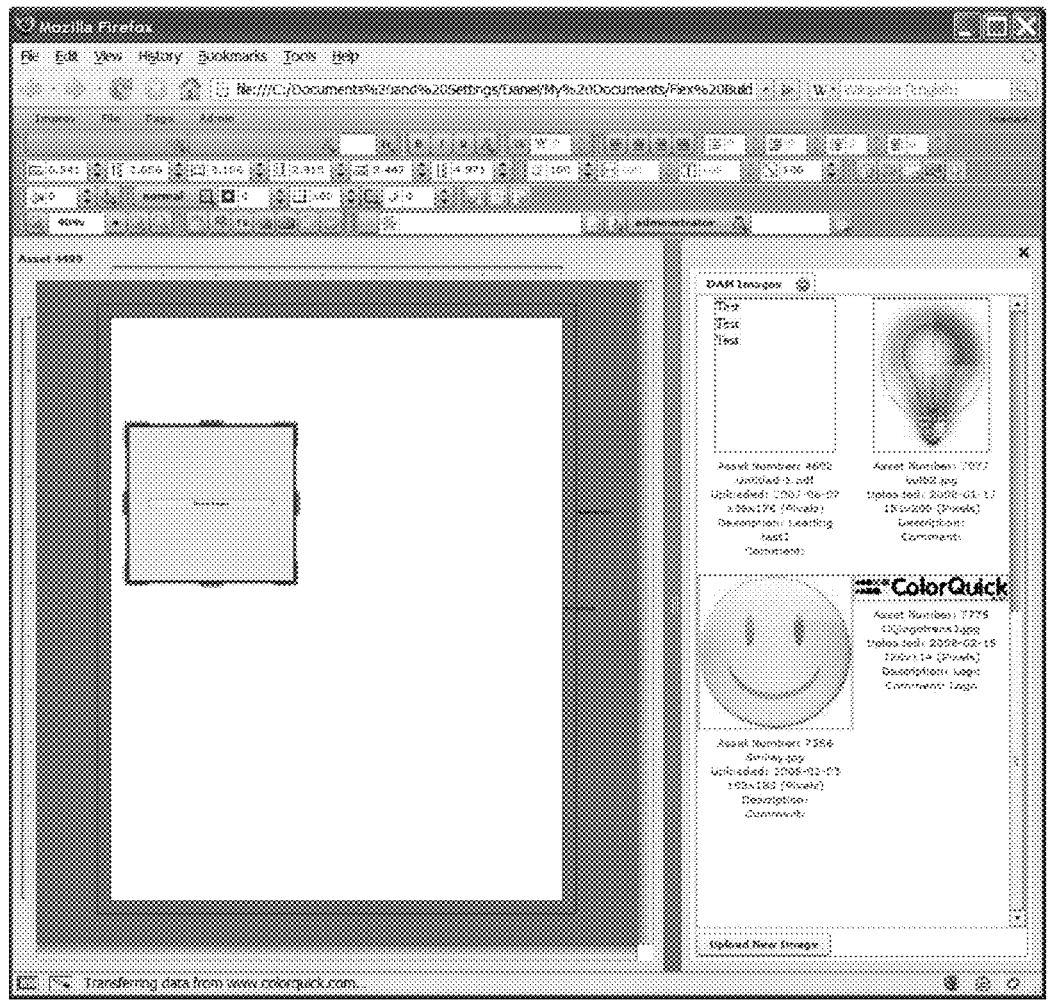
Figure 5:
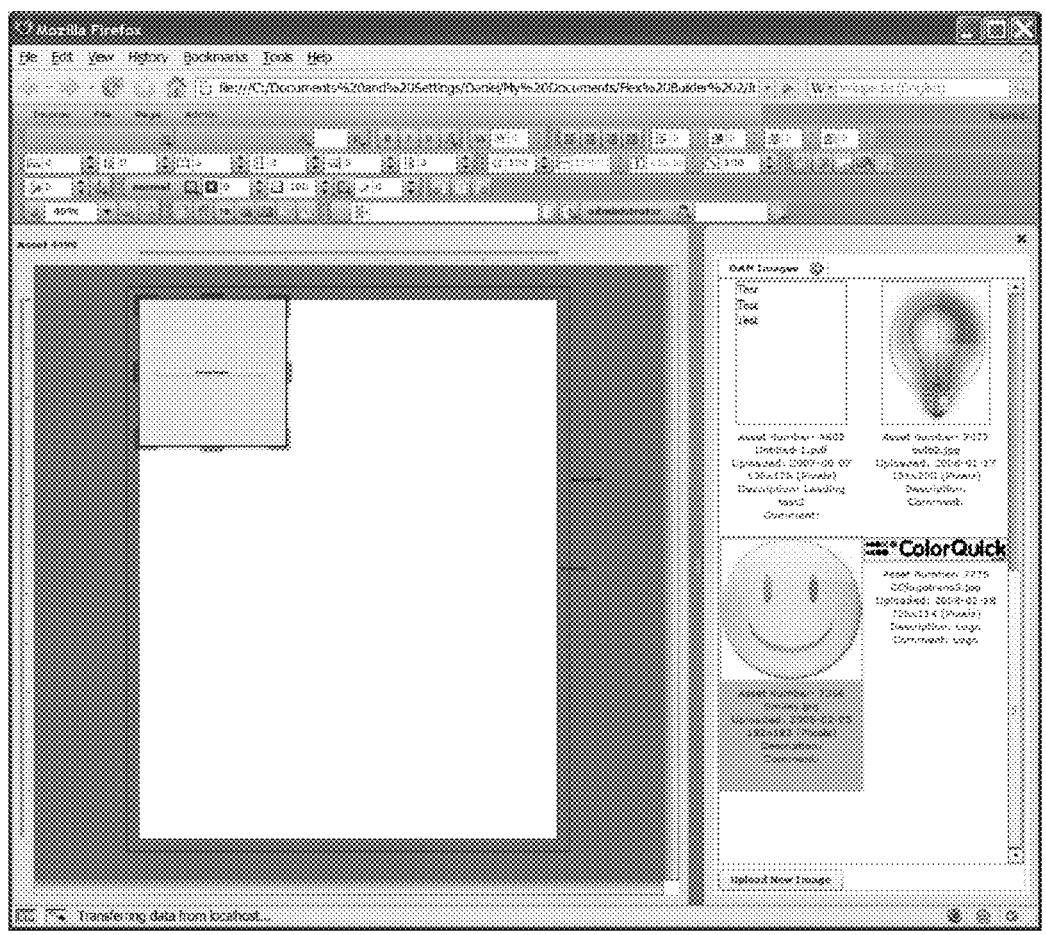

From the blank document shown in FIG. 1, the user creates a new image box in FIG. 2, which is shown completed in FIG. 3. FIG. 4 shows a view of the digital asset library of images available to the user that may be placed in the image box. In FIG. 5, the image box has been moved to the top left corner of the document for later illustrative purposes.

Figure 6:
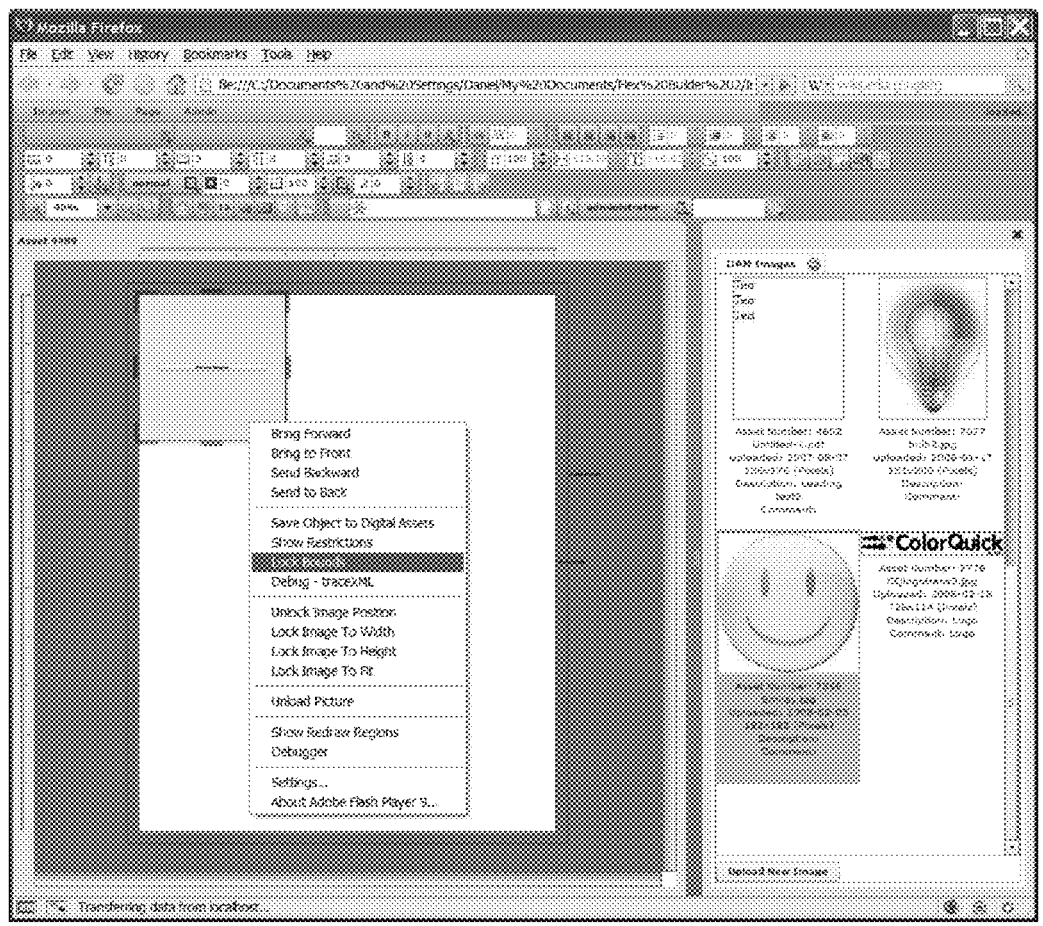
Figure 7:
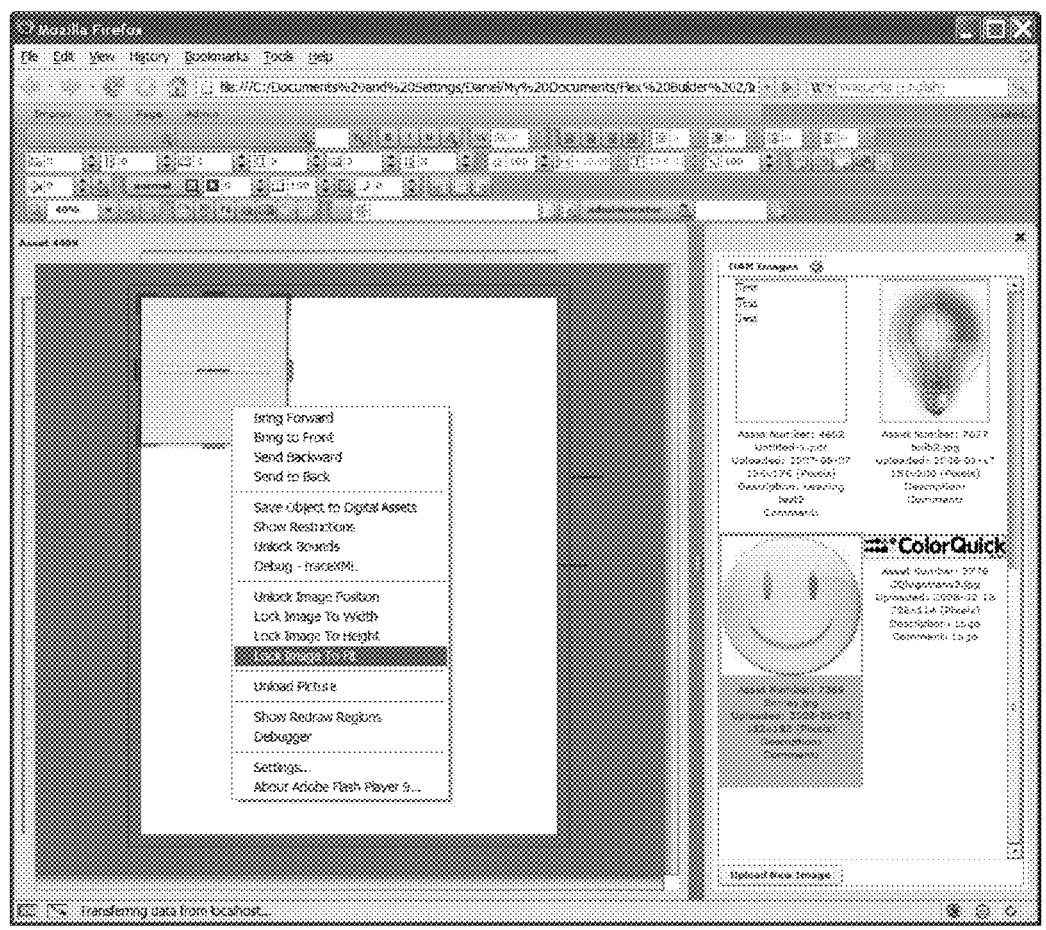

FIGS. 6-7 show rules being associated with properties of the image box. FIG. 6 shows a user constraining the location, width and height of the box to its current values. These are invariant rules. FIG. 7 shows the user constraining the scale of any image placed in the image box to the scale that will resize the image to the size of the box. These rules are enforced in these figures, but since the current values of the constrained properties are valid given these new rules, there are no new visual indications of these enforcements.

Figure 8:
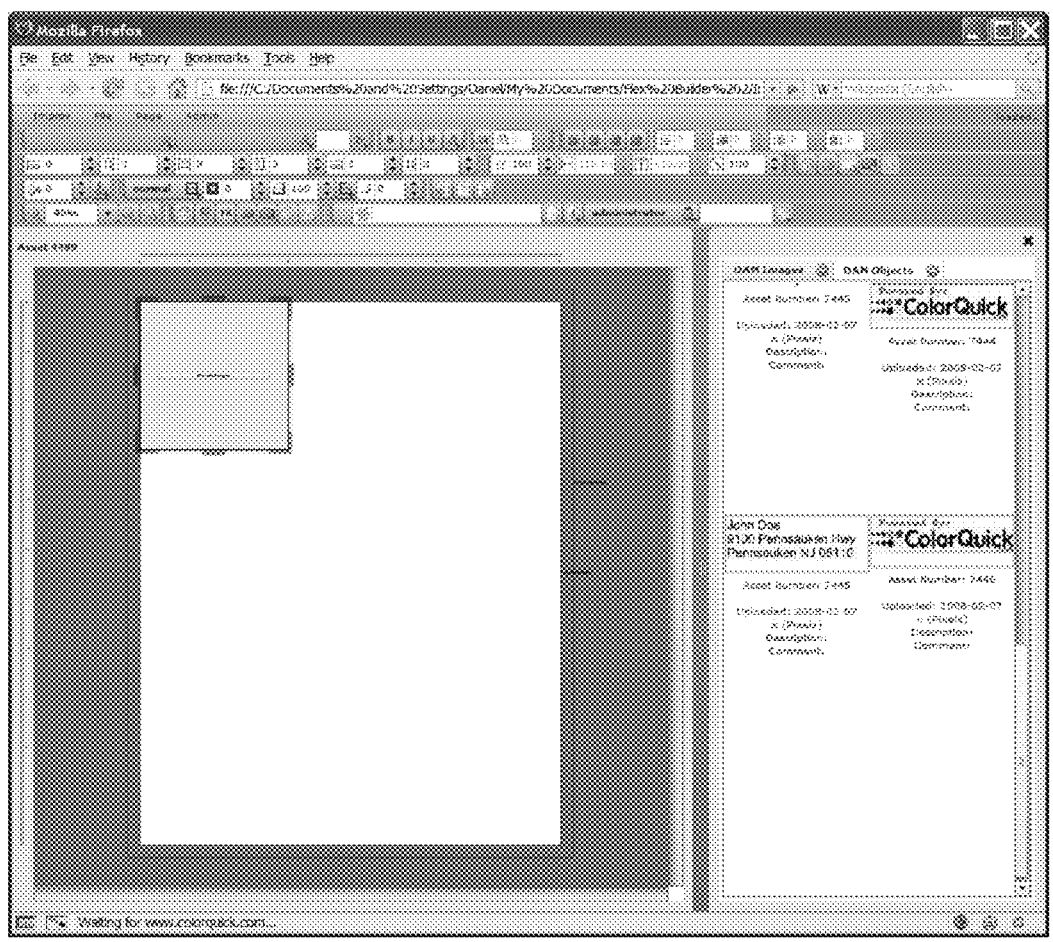
Figure 9:
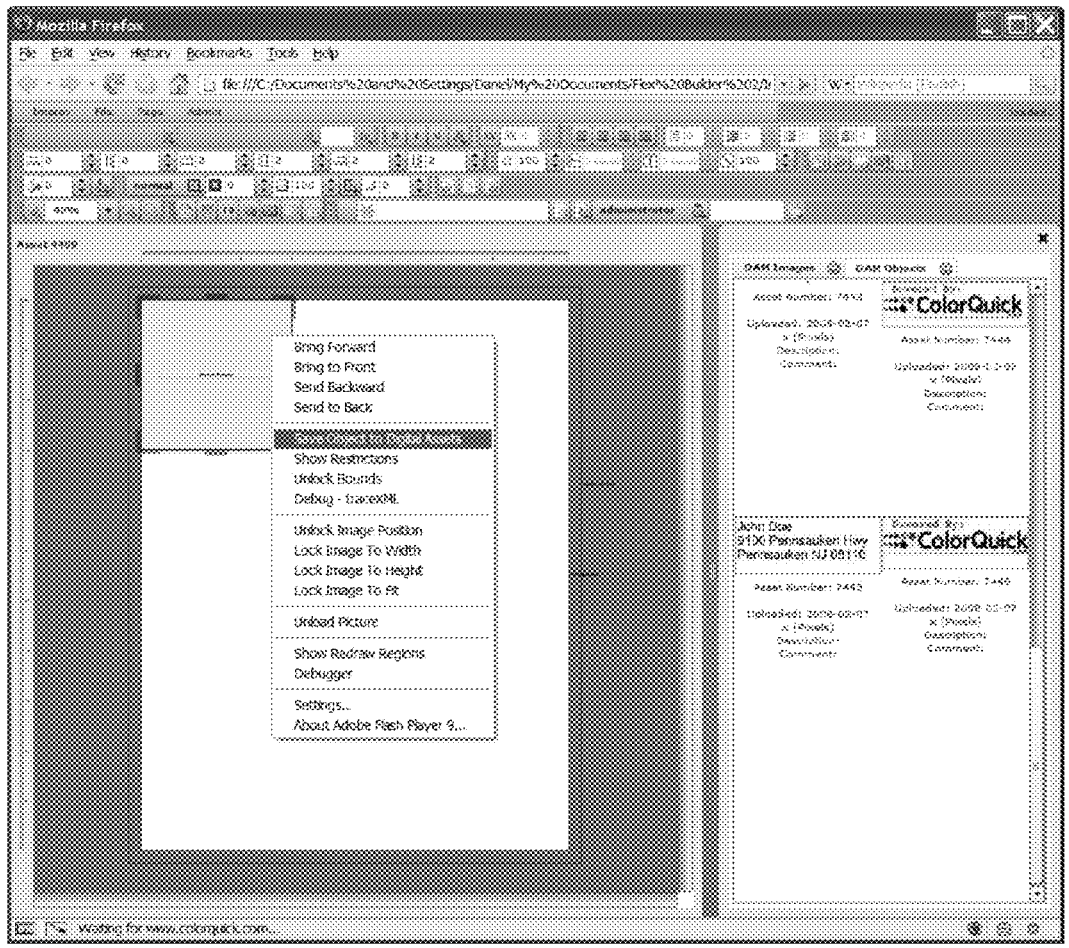
Figure 10:
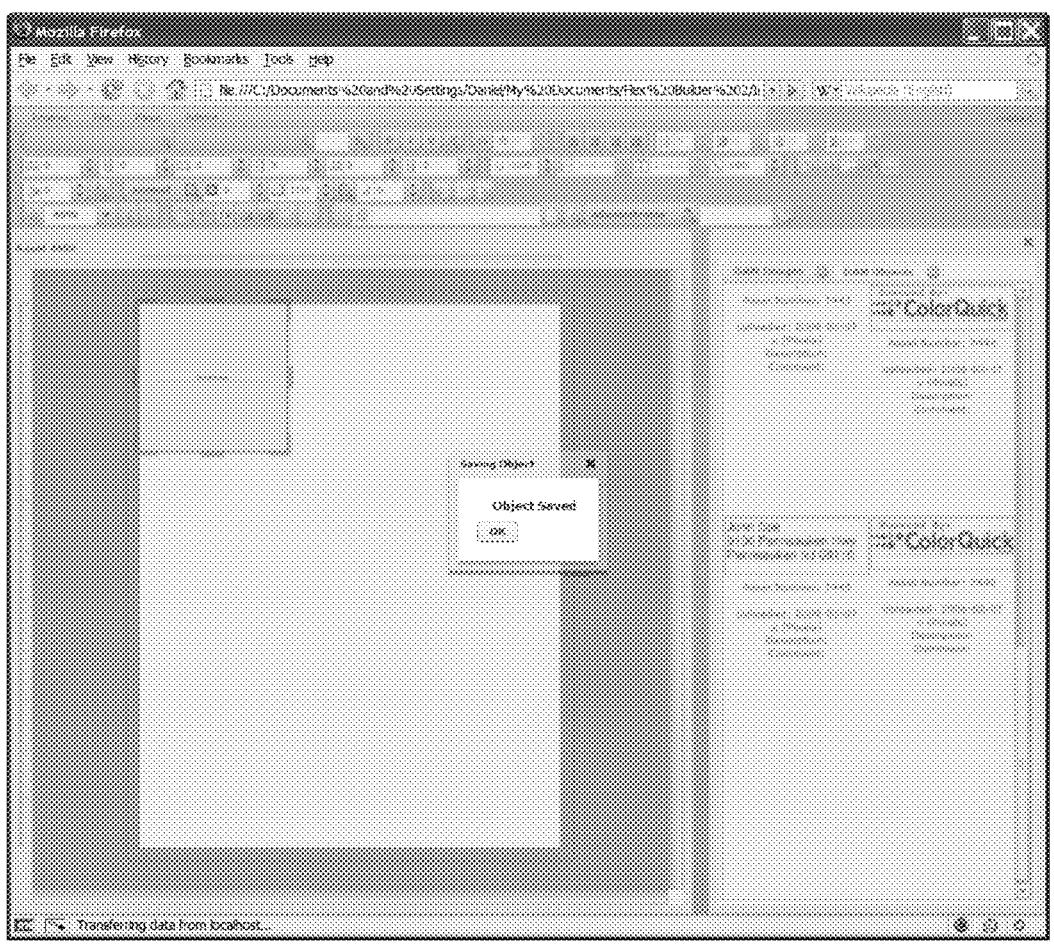
Figure 11:
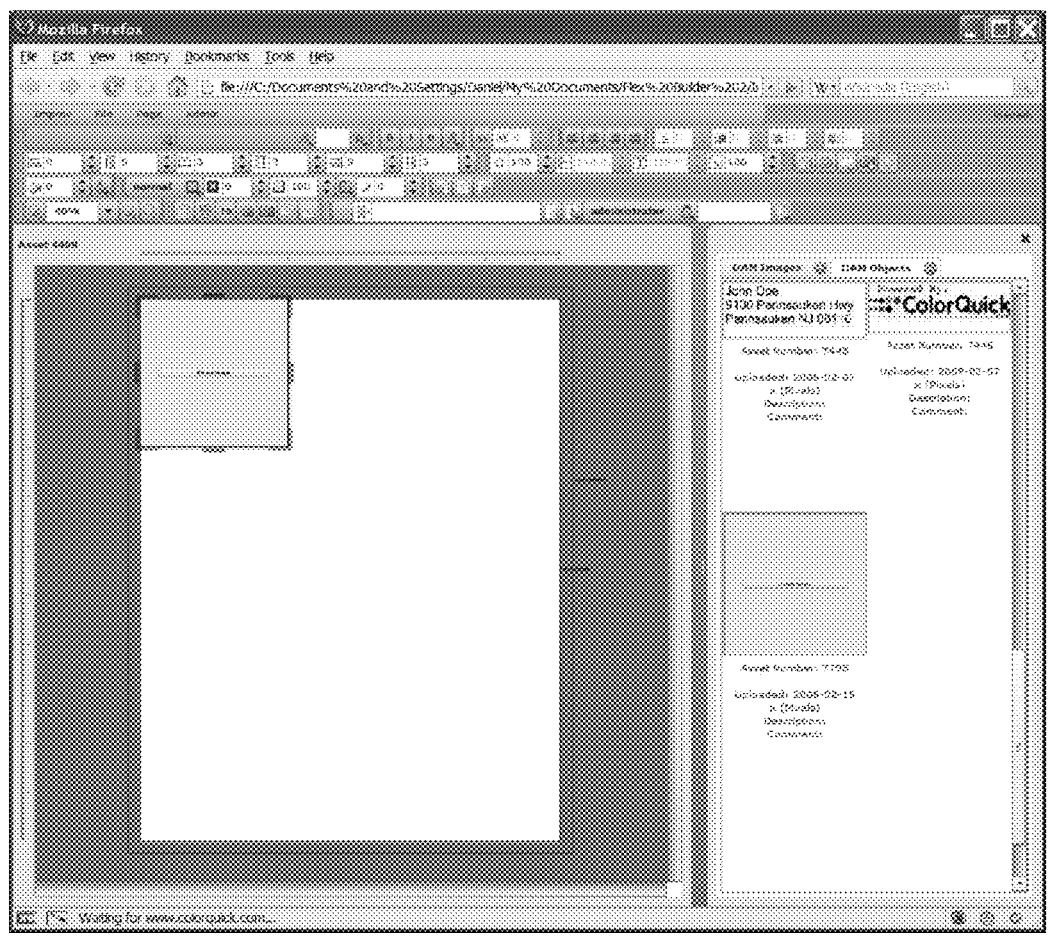

The digital asset library of currently saved Smart Objects is shown in FIG. 8. In FIG. 9, the user saves the image box along with the rules associated with the properties of the image box as a Smart Object to the digital asset library outside of the document and application. FIG. 10 shows that the attempt to save has succeeded. FIG. 11 shows that the newly saved Smart Object is now in the digital asset library.

FIGS. 12-17 show the use of the previously mentioned Smart Object within the document it was created in.

Figure 12:
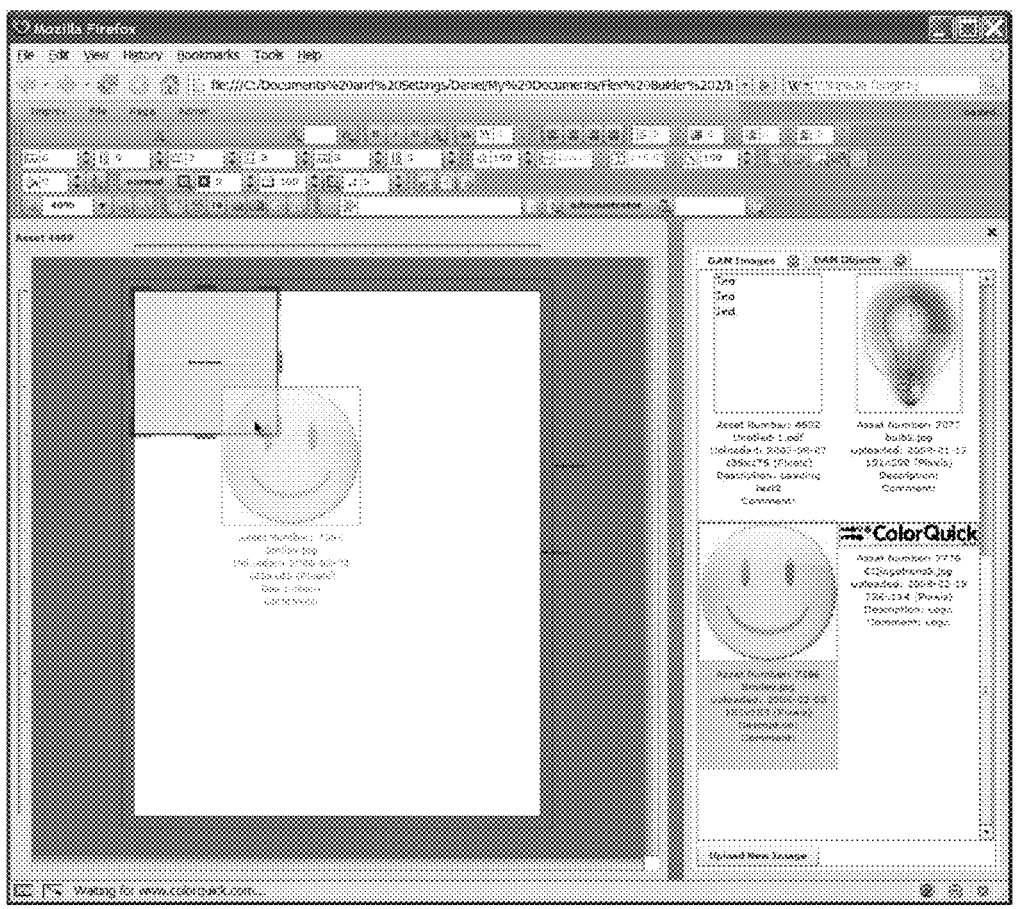
Figure 13:
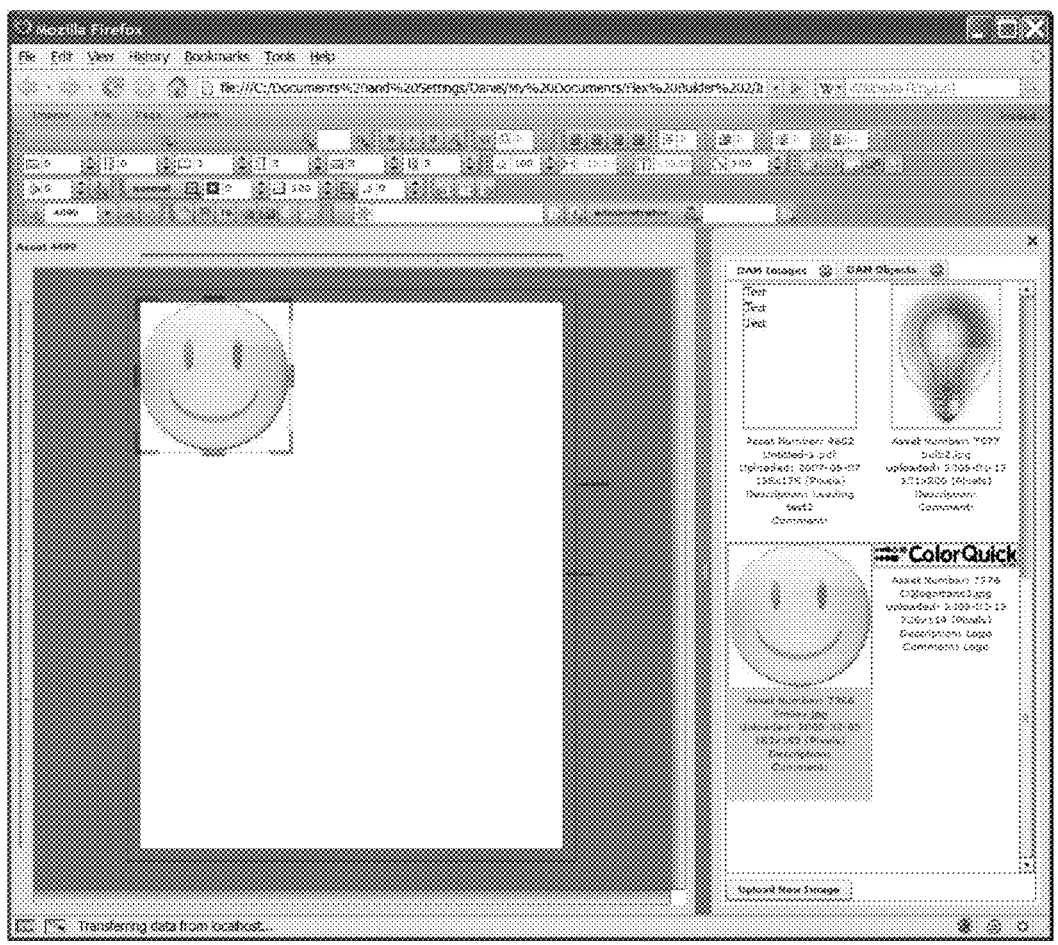
Figure 14:
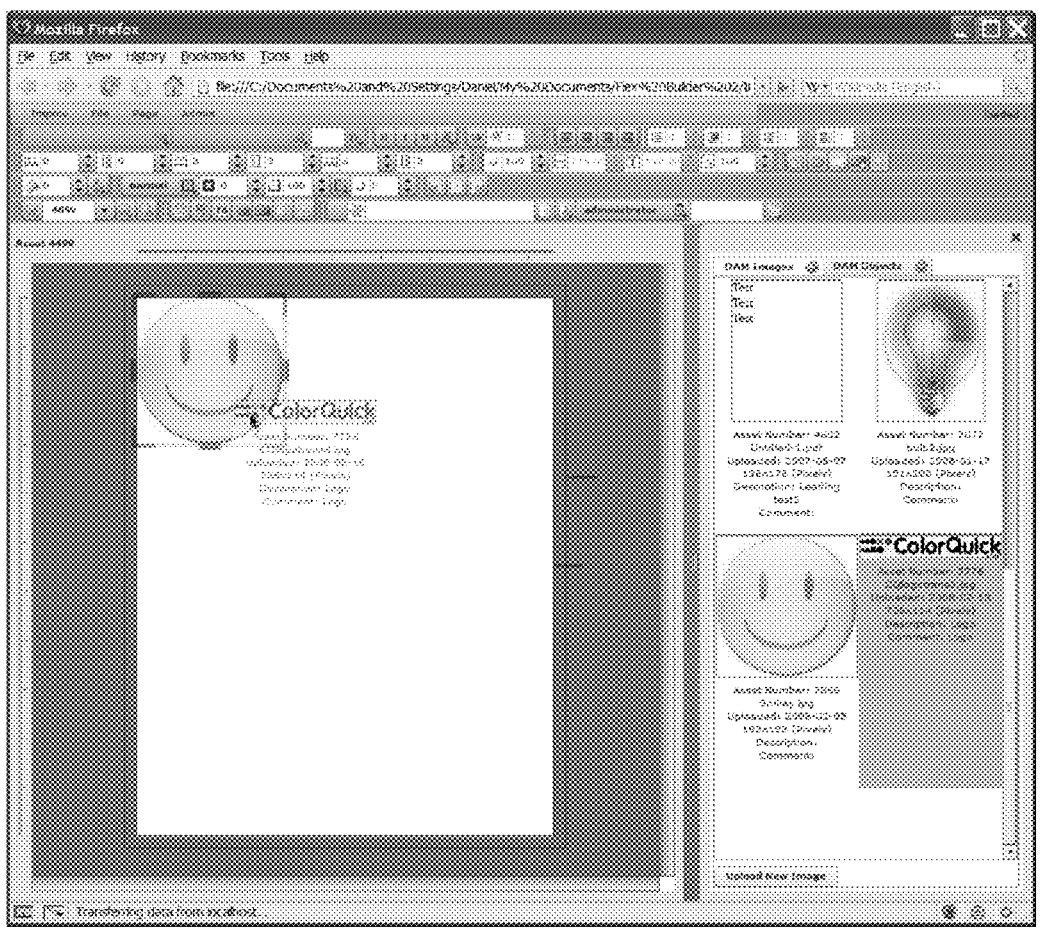
Figure 15:
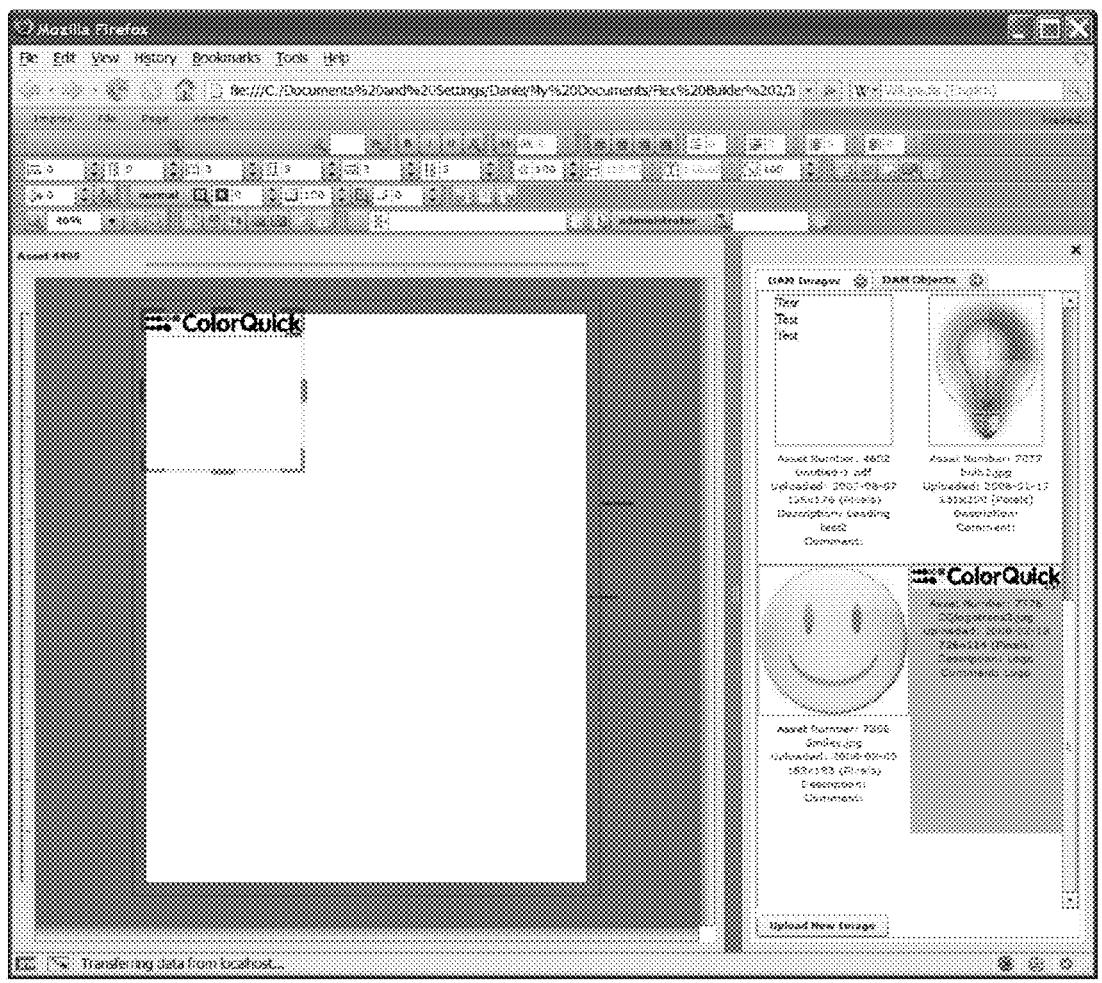

FIG. 12 shows the Smart Object being populated with an image that is immediately and automatically resized to the size of the box as shown in FIG. 13. This is due to the enforcement of the rules associated with the properties of the image box in FIG. 7. FIGS. 14 and 15 show the same action and effect with an image of a different aspect ratio.

Figure 16:
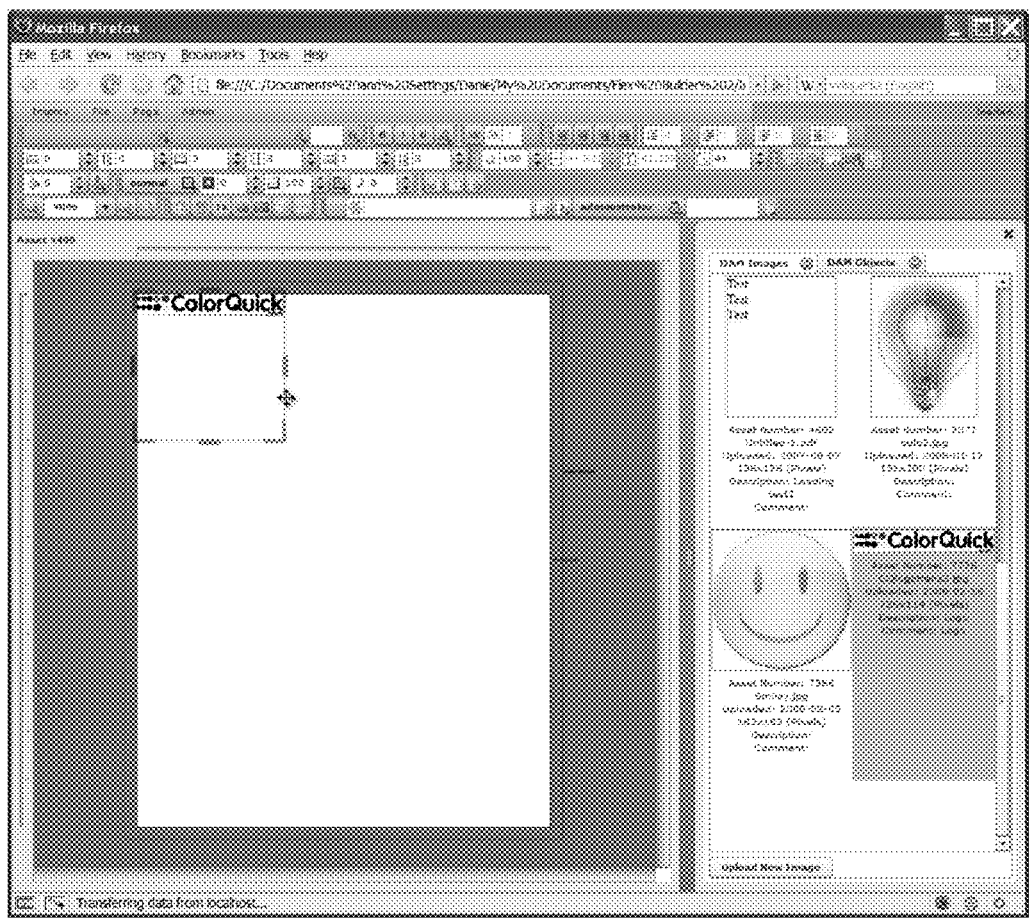
Figure 17:
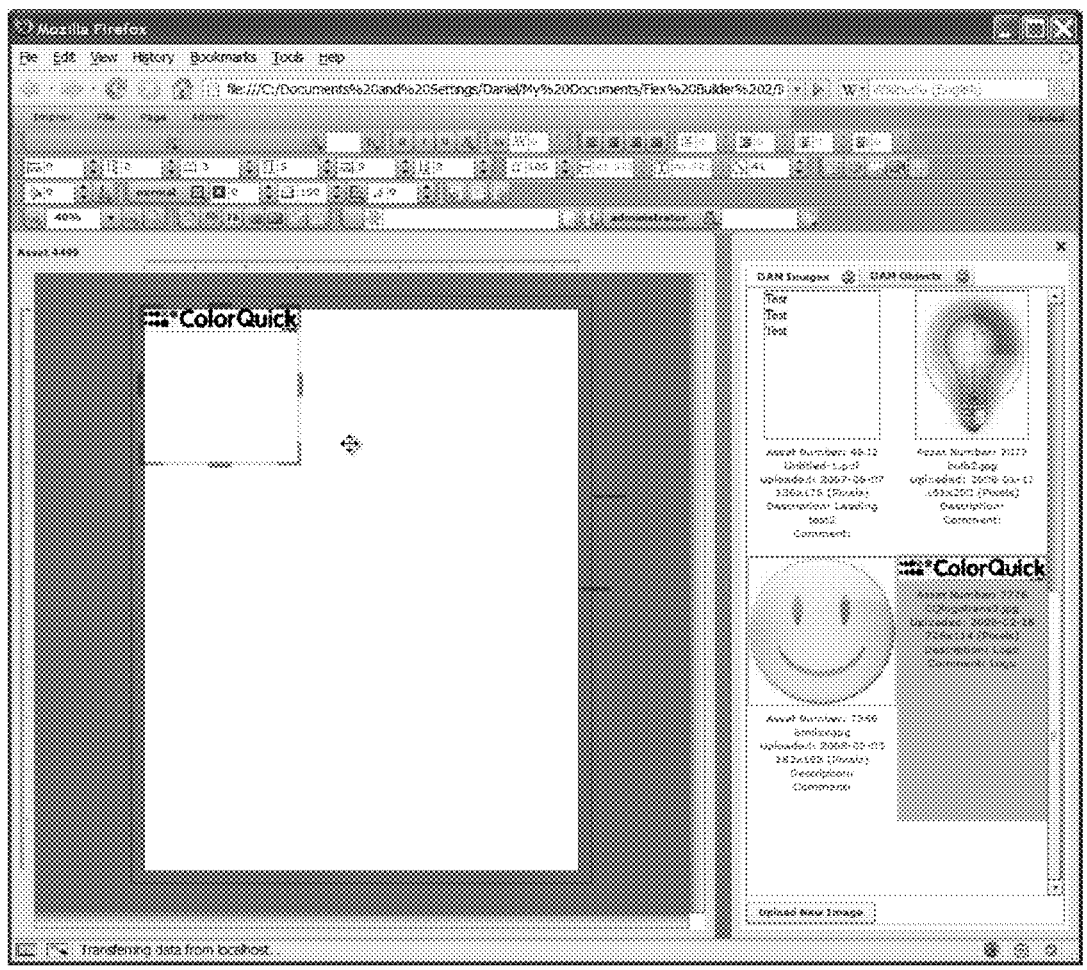

FIG. 16 shows the user attempting to move the image box in violation of the rules associated with properties of the image box in FIG. 6, and FIG. 17 shows that the user cannot move the image box because of the enforcement of these rules.

FIGS. 18-27 show the use of the aforementioned Smart Object within a new, second document.

Figure 18:
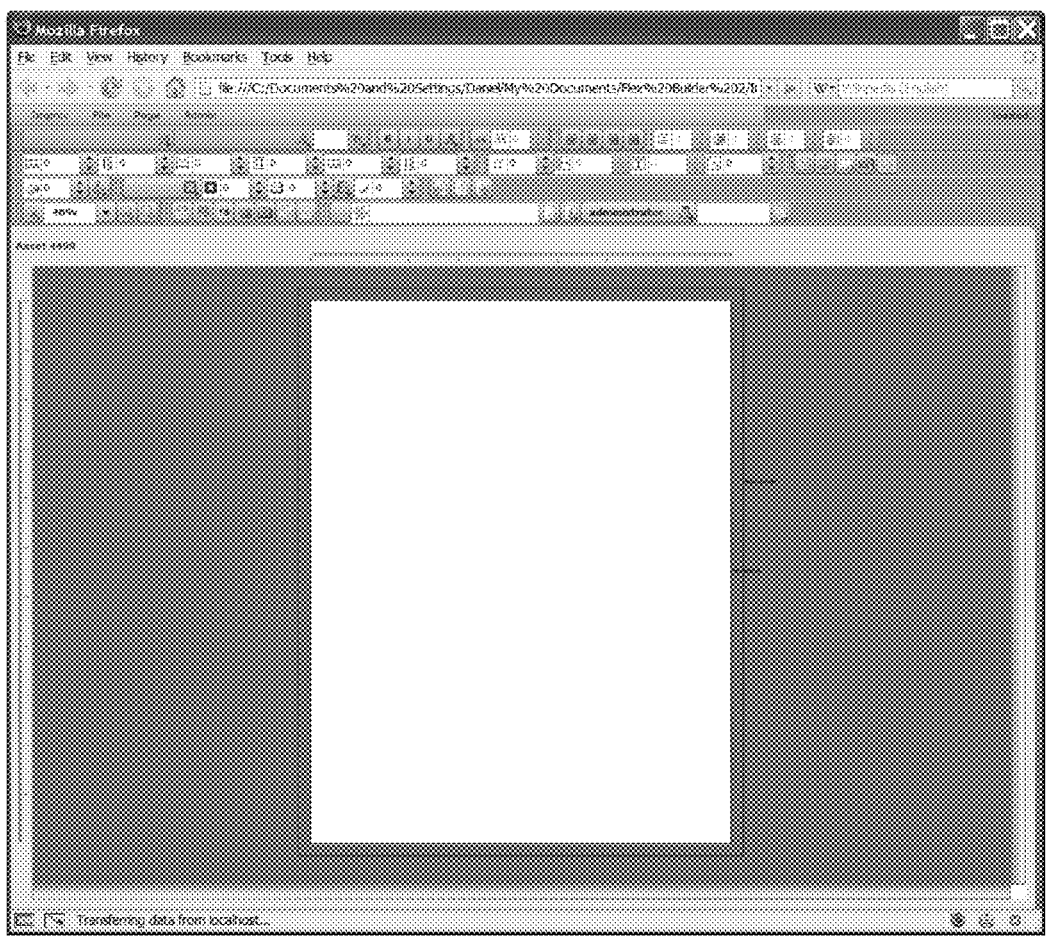
Figure 19:
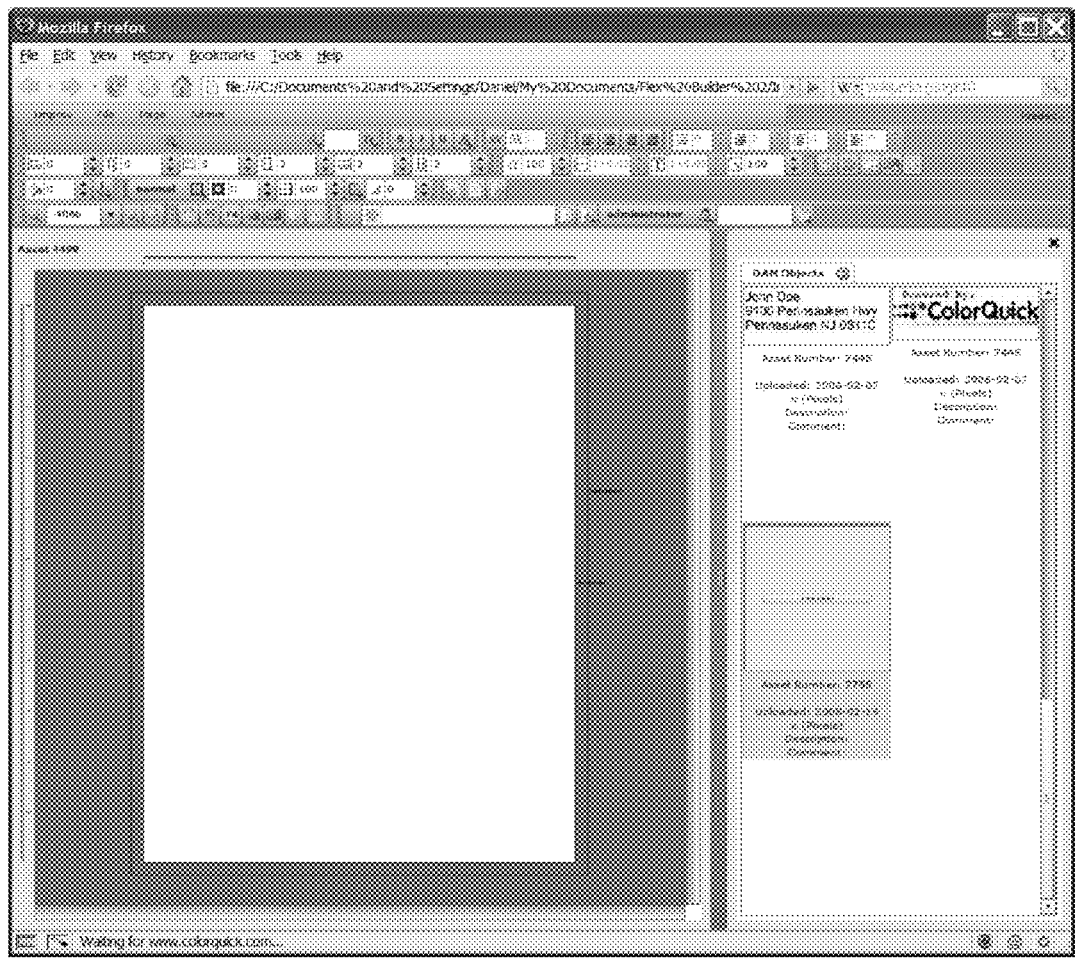
Figure 20:
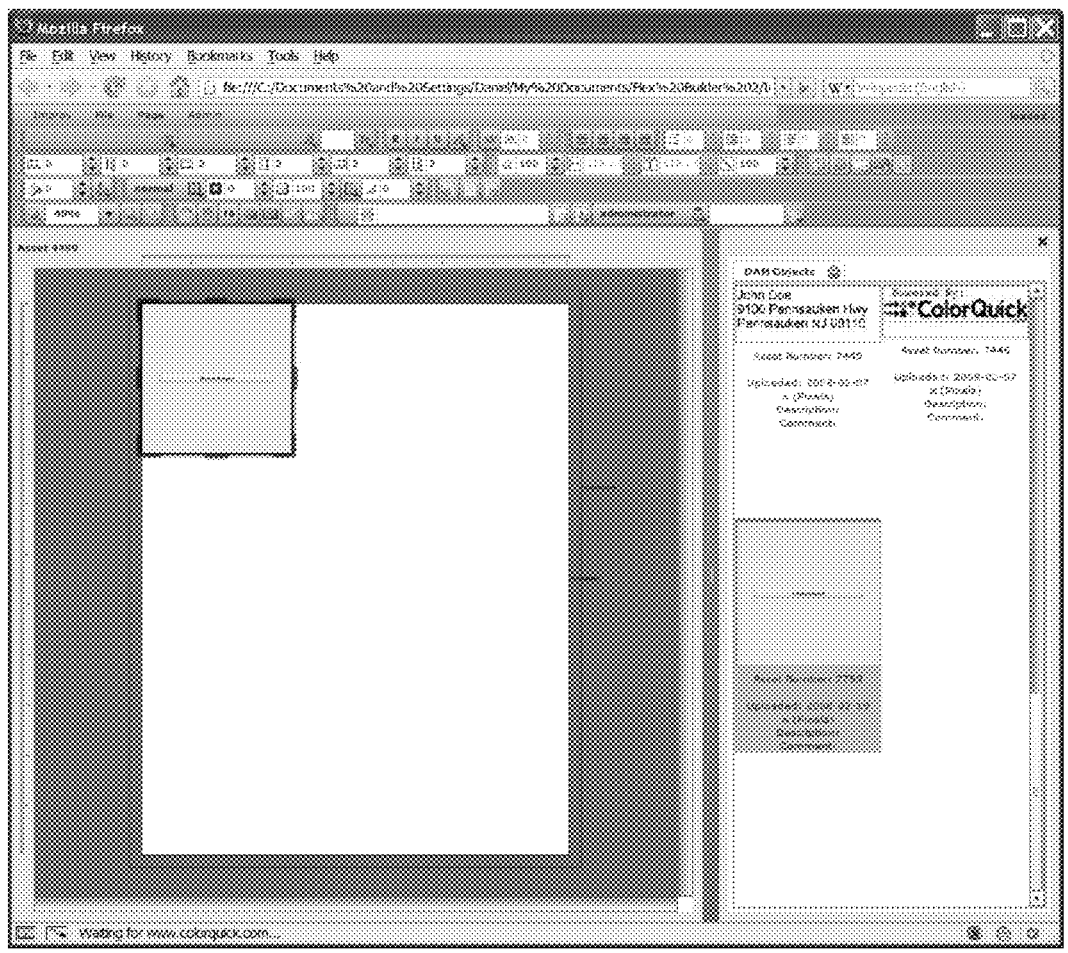
Figure 21:
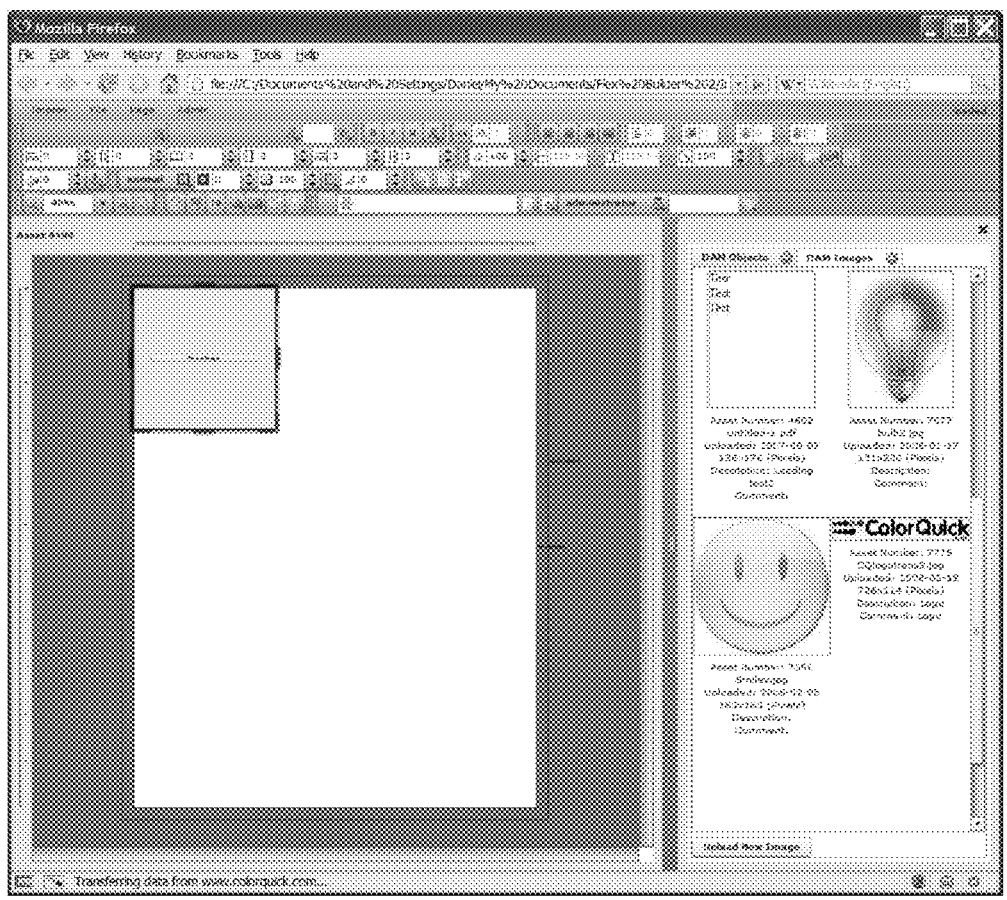
Figure 22:
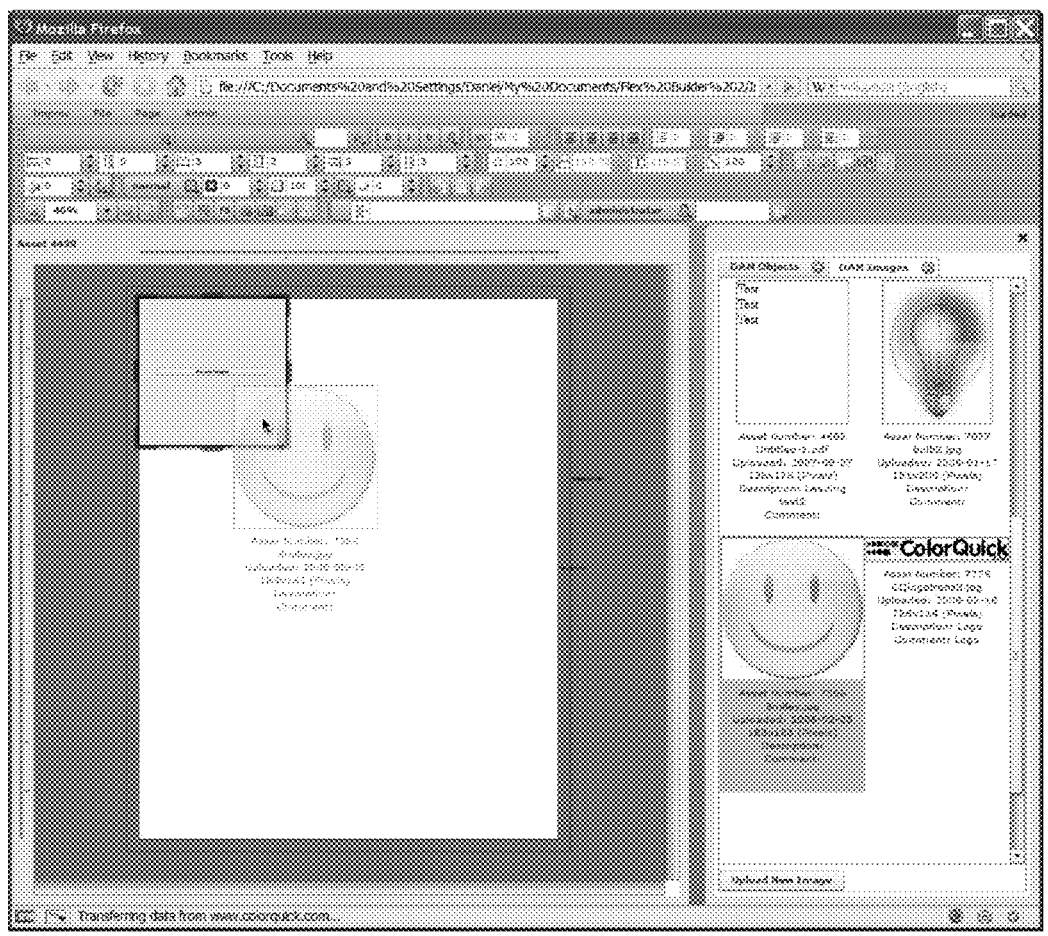
Figure 23:
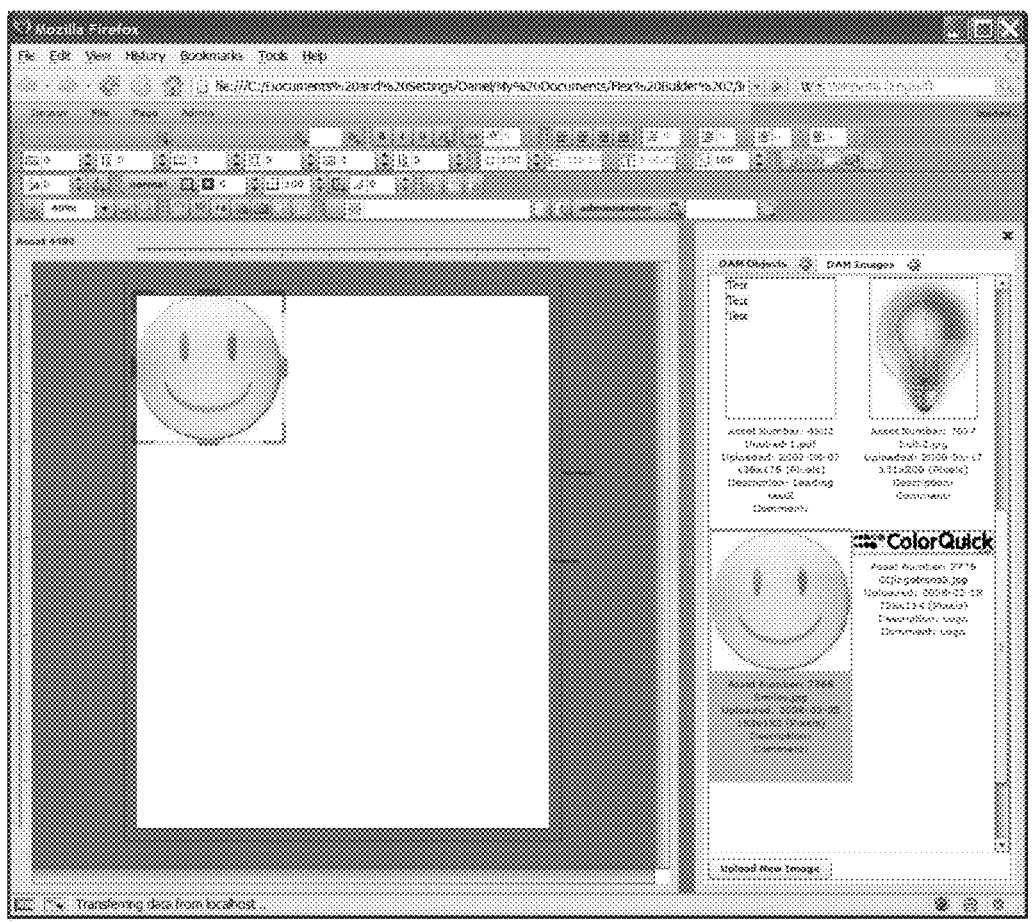
Figure 24:
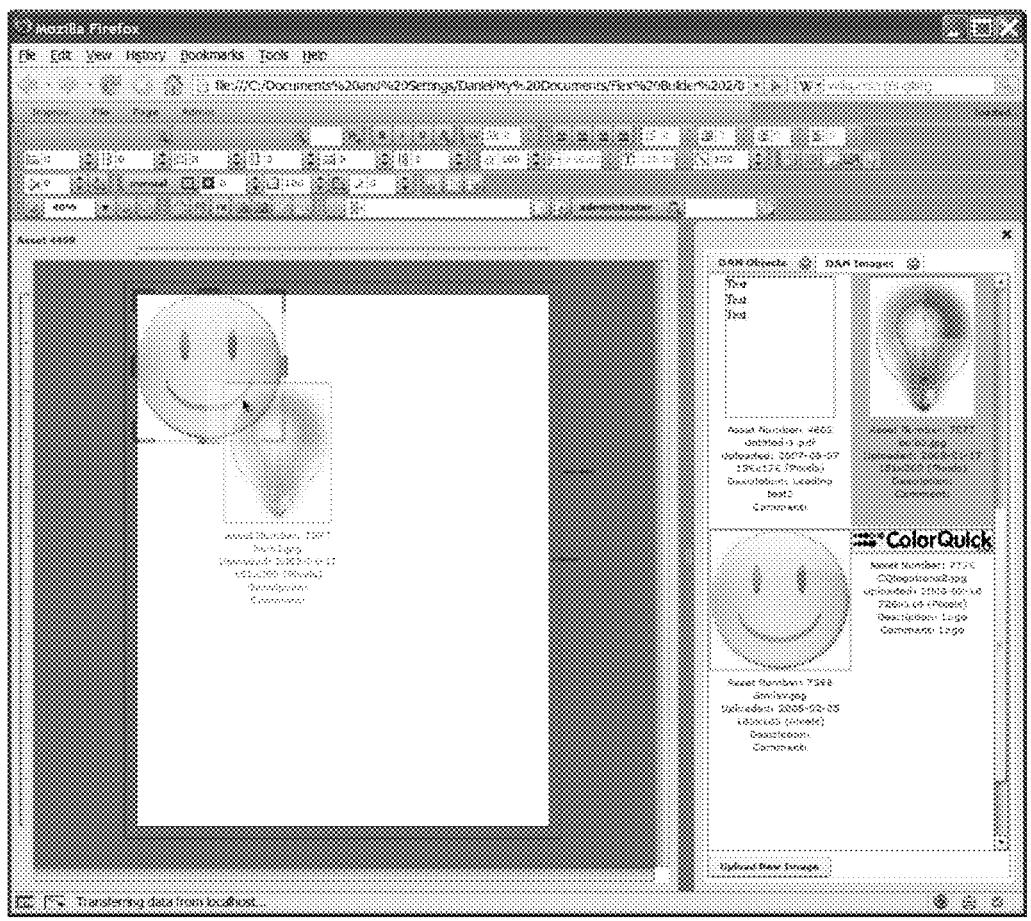
Figure 25:
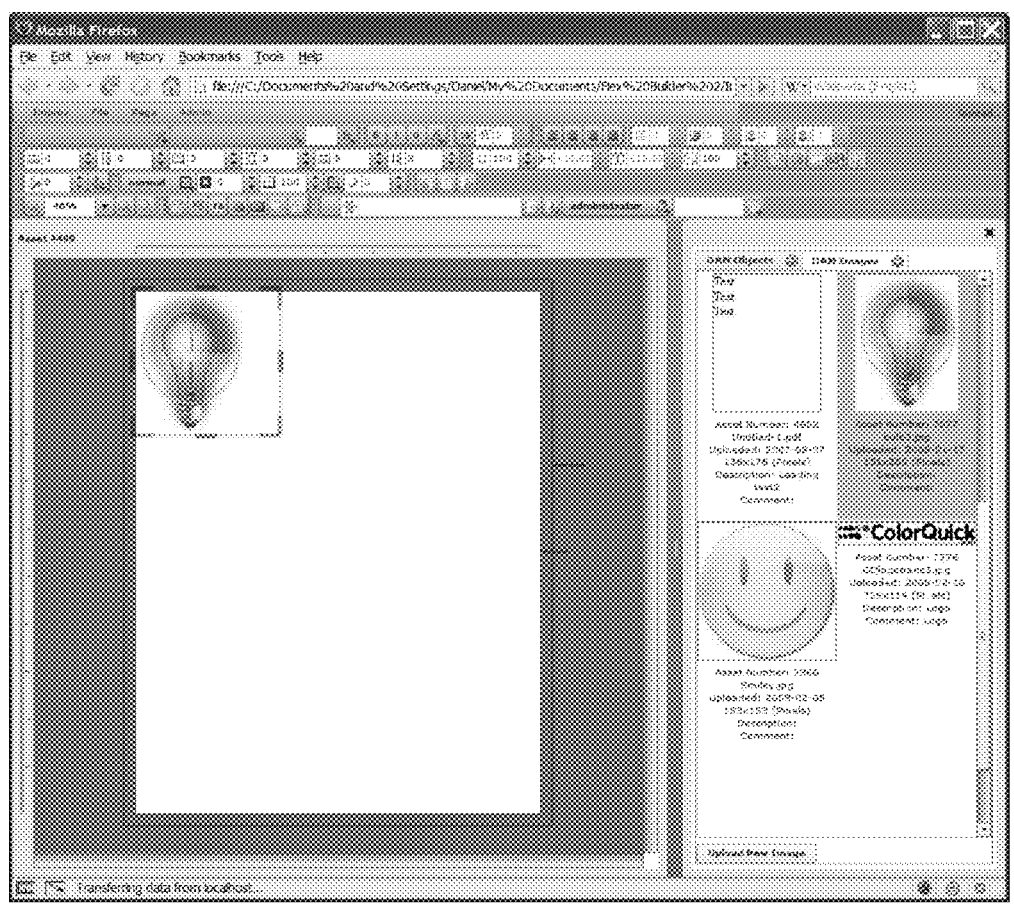
Figure 26:
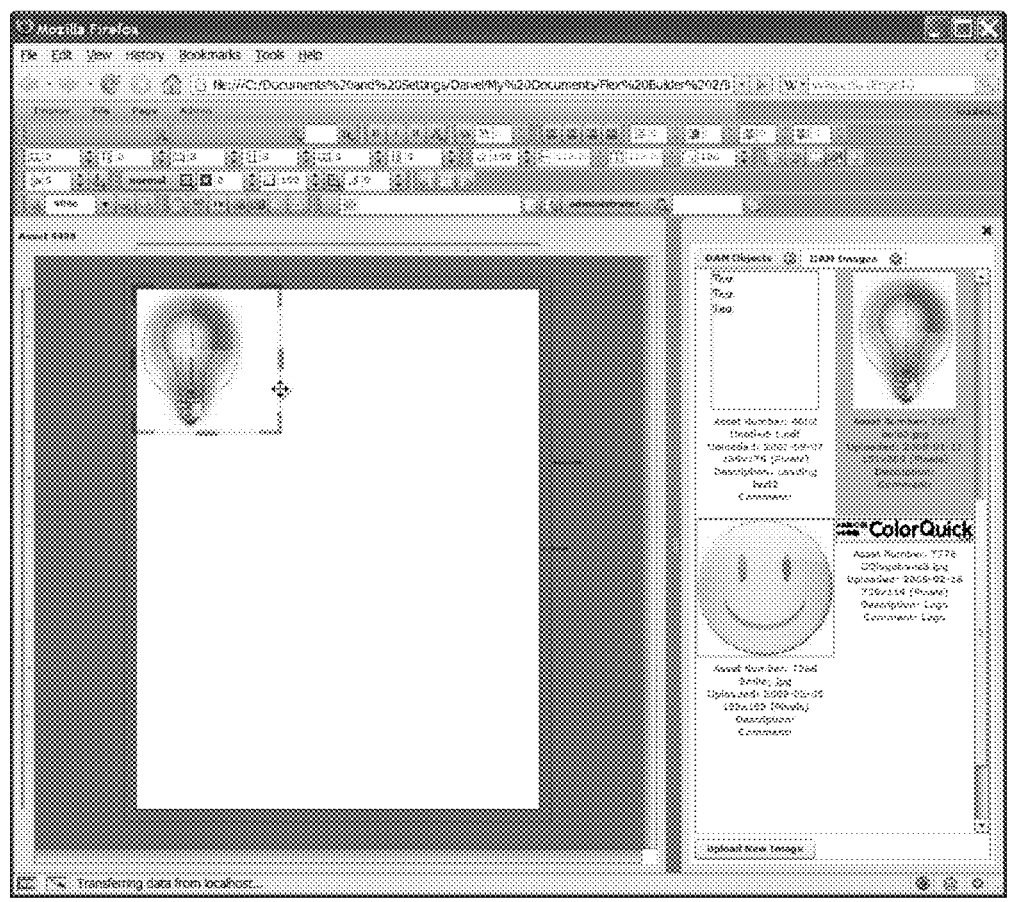
Figure 27:
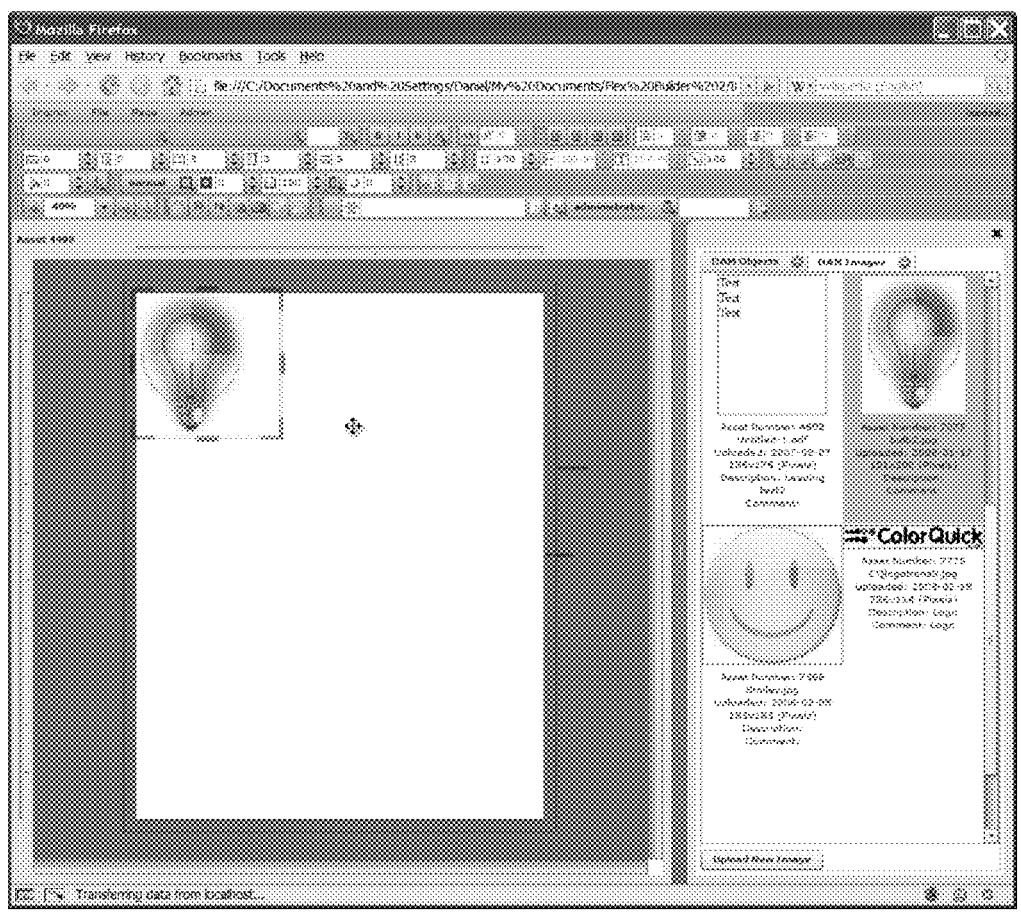

FIG. 18 shows a second, new blank document in a new instance of the application. FIG. 19 shows the user opening the digital asset library of Smart Objects and FIG. 20 shows the user adding the Smart Object that was created in the previous example to the new document. FIG. 21 shows the digital asset library of images the user may select from. FIGS. 22 and 23 show the user populating the image box with the same image in a manner similar to FIGS. 12 and 13 and with the same effect. FIGS. 24 and 25 show the same action and effect with yet another image. FIG. 26 shows the user attempting to move the image box in violation of the rules associated in FIG. 6, and FIG. 27 shows that the user cannot move the image box in a similar manner as shown in FIGS. 16 and 17.

Figure 28:
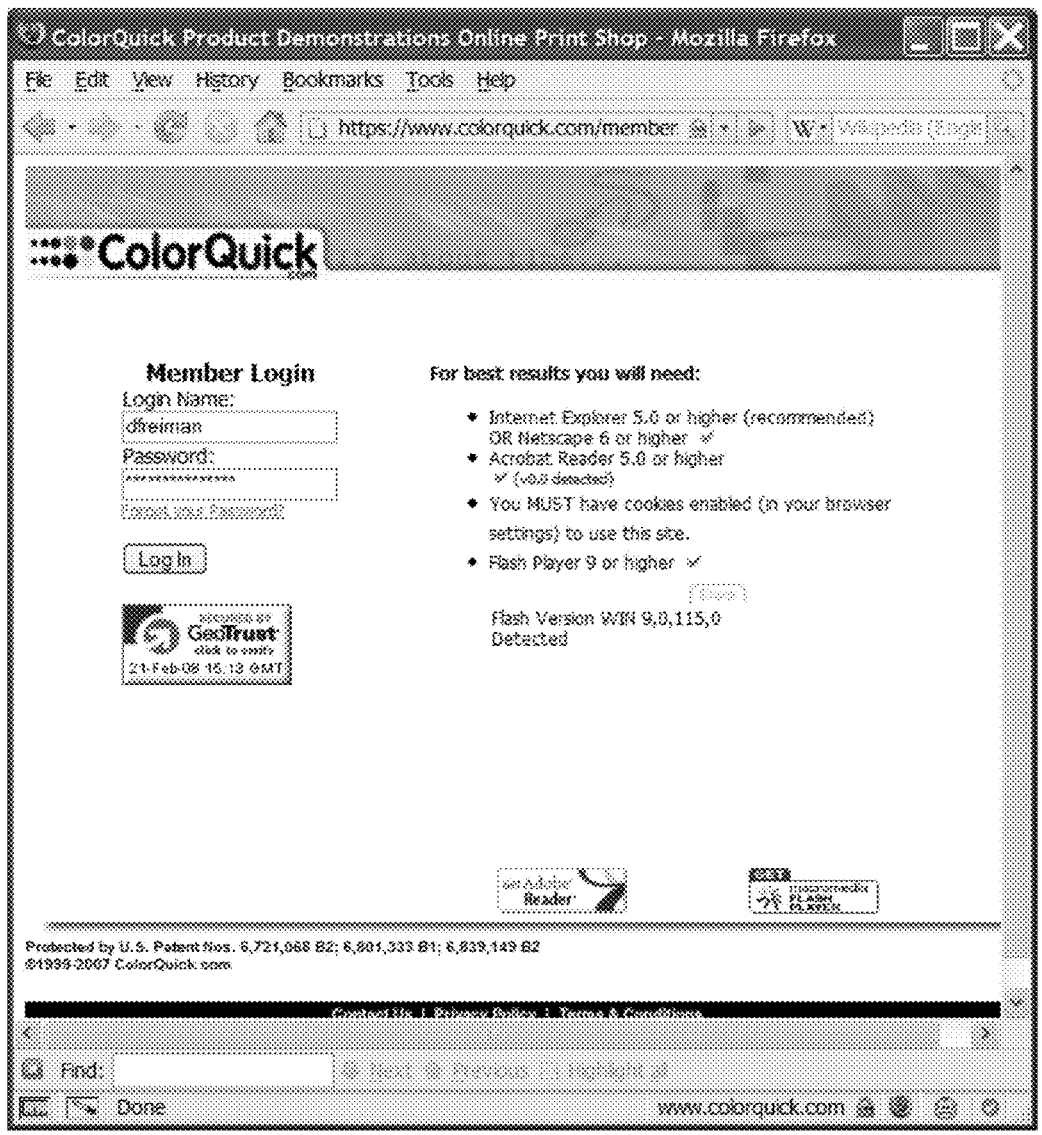
Figure 29:
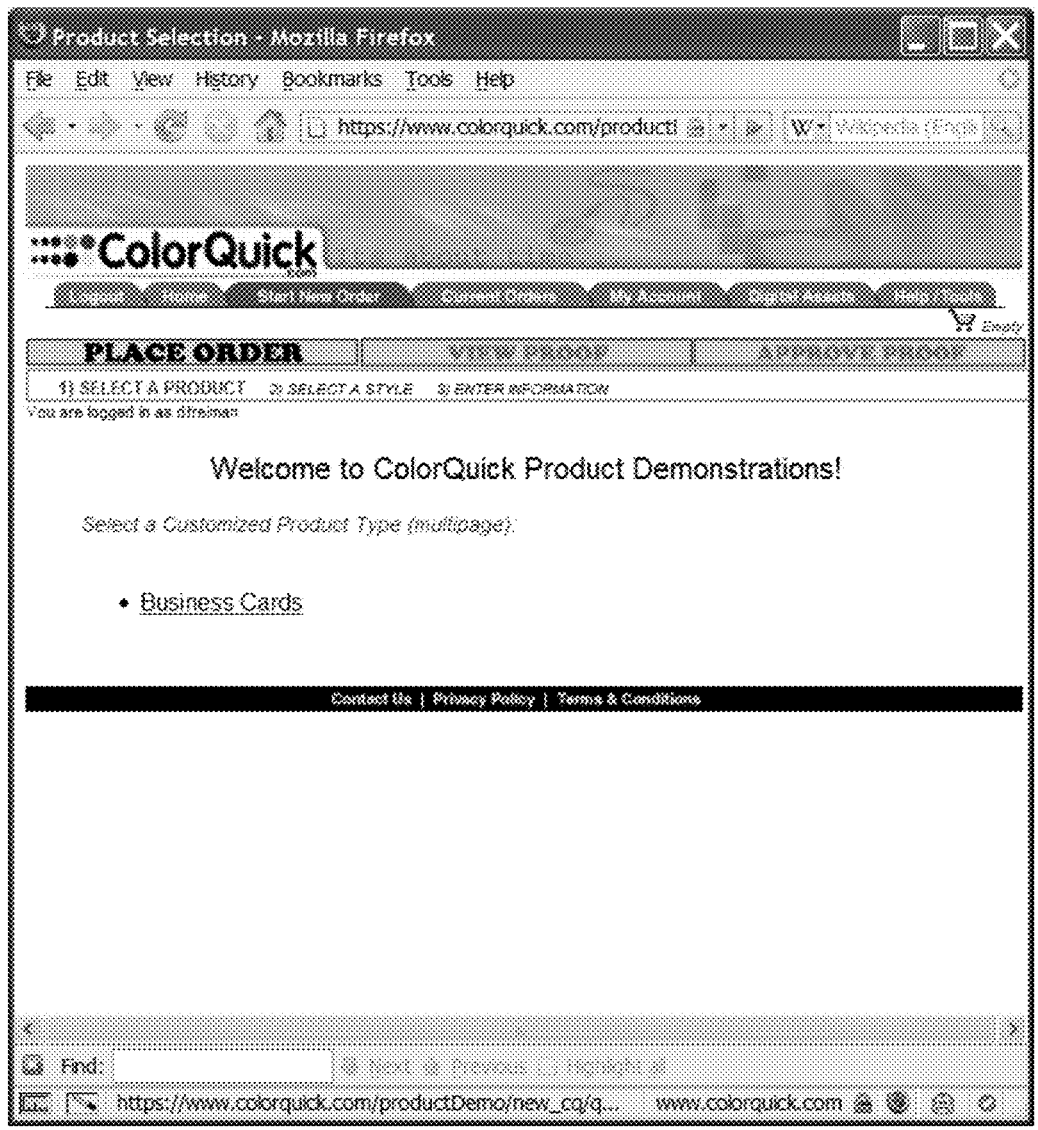

FIG. 28 shows a specific user logging into a website that hosts the application shown in the previous figures. FIG. 29 shows the user creating a new document by clicking the "Start New Order" tab.

FIGS. 30-38 show the user creating and saving a new Smart Object.

Figure 30:
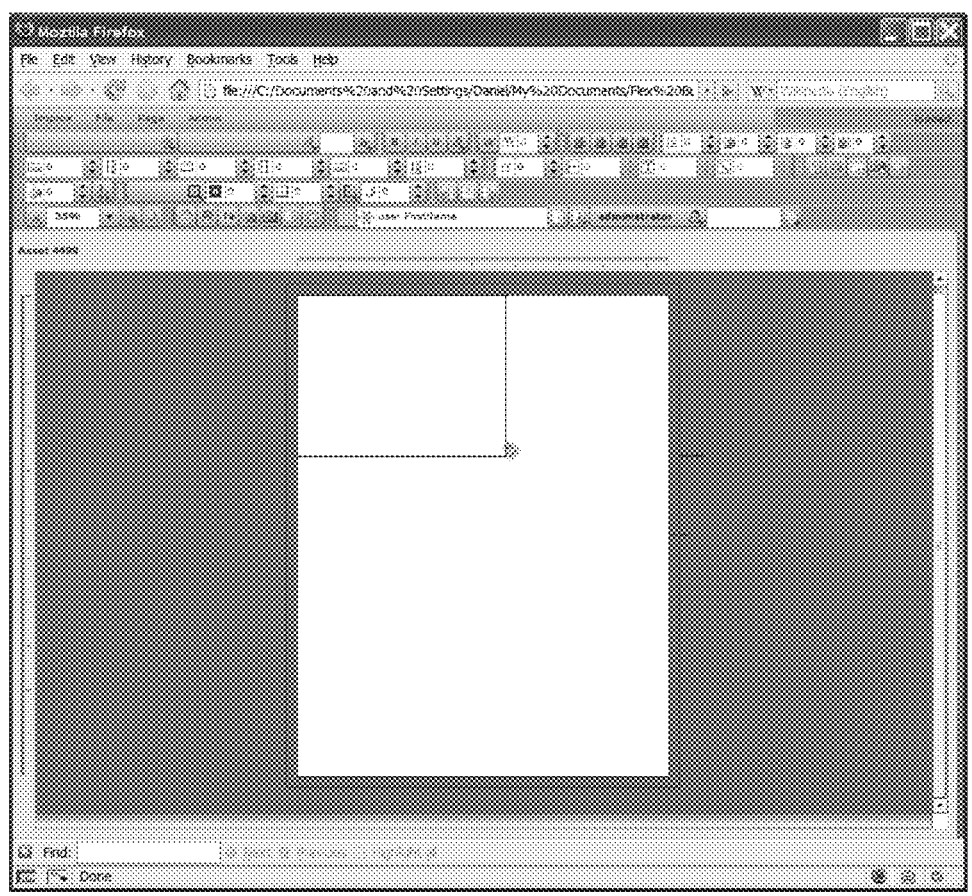
Figure 31:
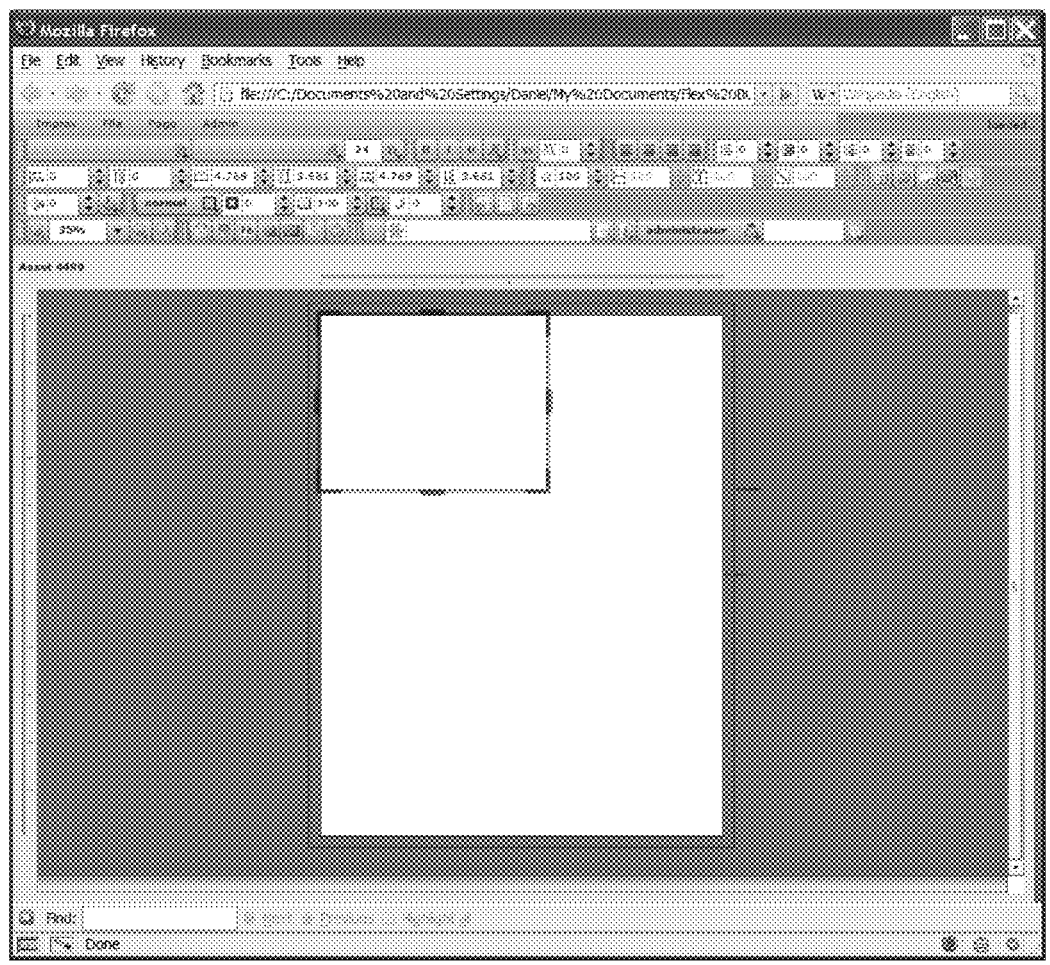

FIG. 30 shows the user creating a new text box on the new document, the result of which is shown in FIG. 31.

Figure 32:
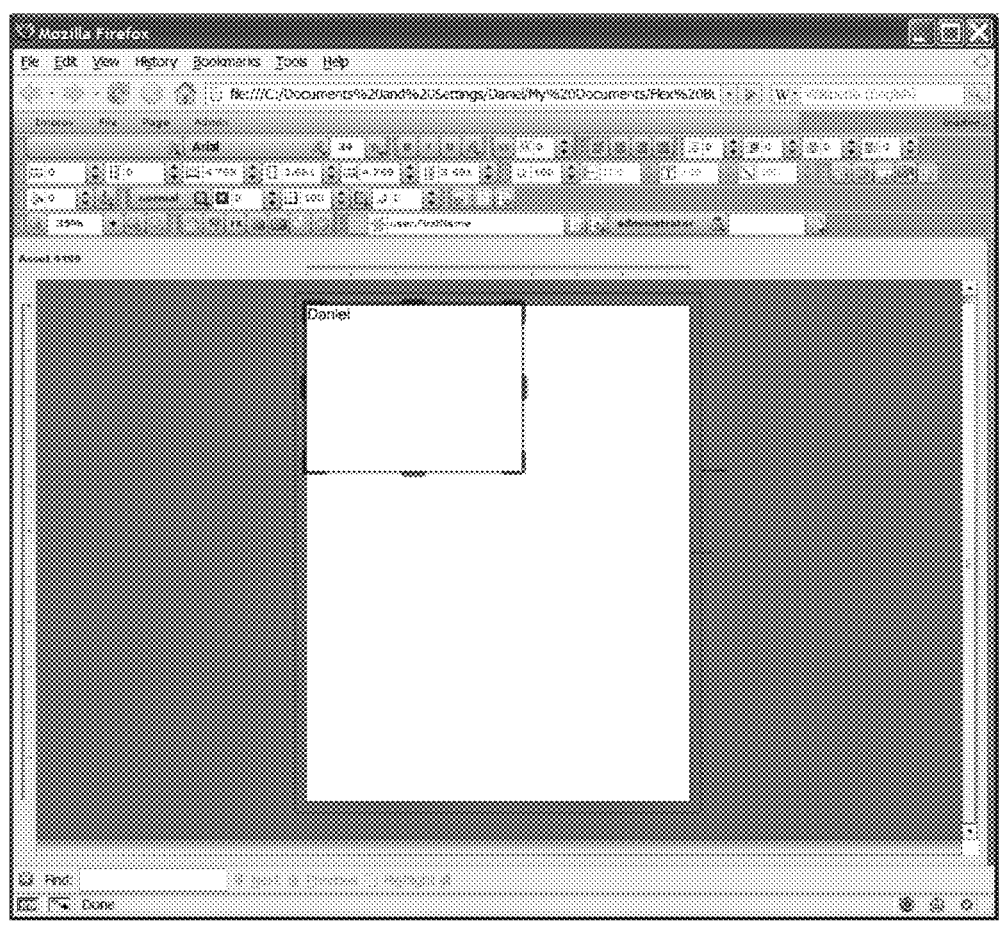
Figure 33:
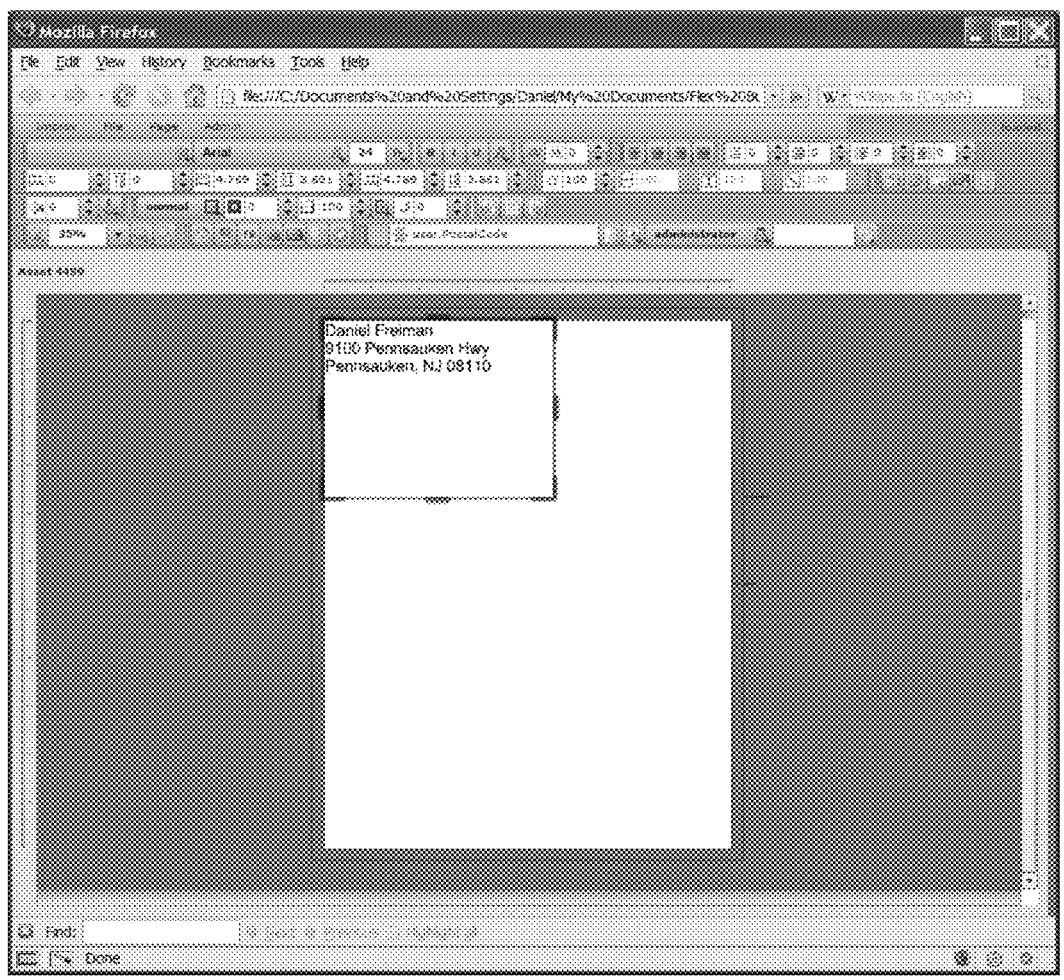

FIG. 32 shows that the user has created a new variable field in the text box linked to the variable "user.FirstName". FIG. 33 shows the document after the user has added other variable fields to the same textbox.

Figure 34A:
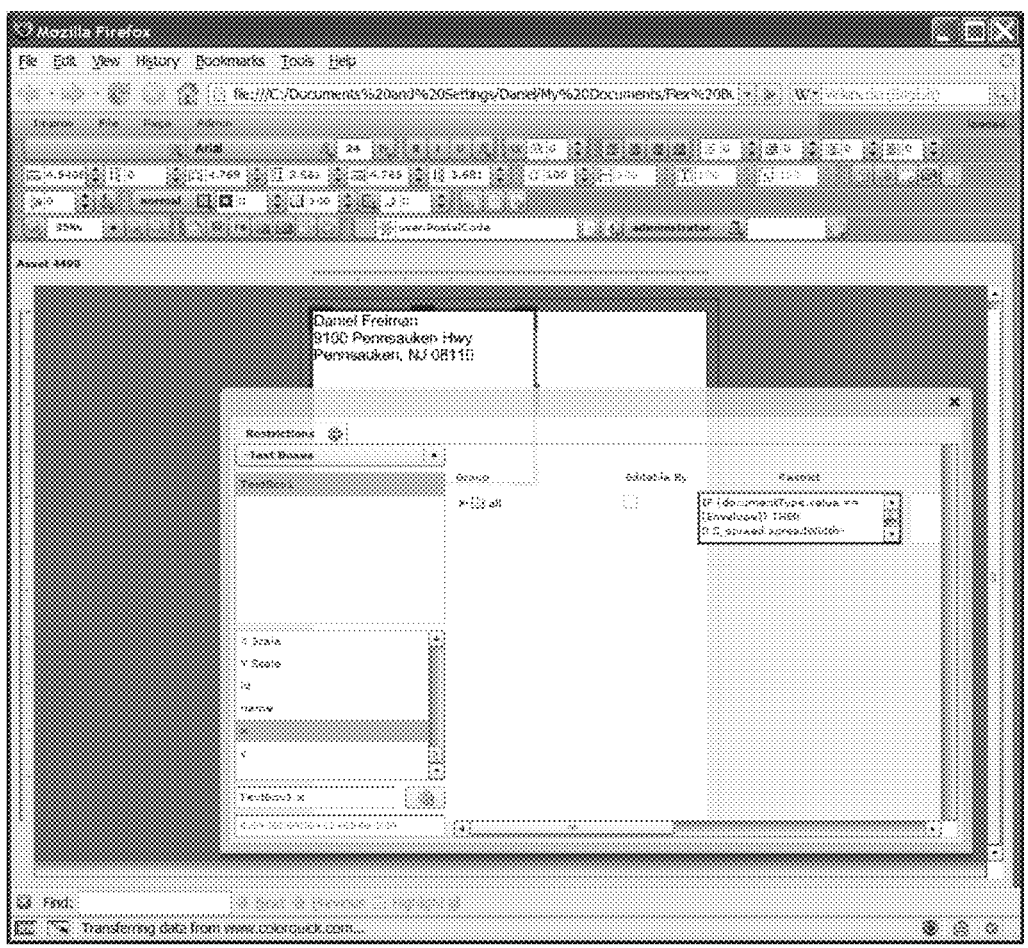

FIG. 34A shows the user setting a rule constraining the property that determines the x-coordinate of the left side of the text box. The effect of the restriction effectively prevents the TextBox from being less than 0.5 inches from either side of the document if and only if the type of the document is an "Envelope".

Figure 34B:
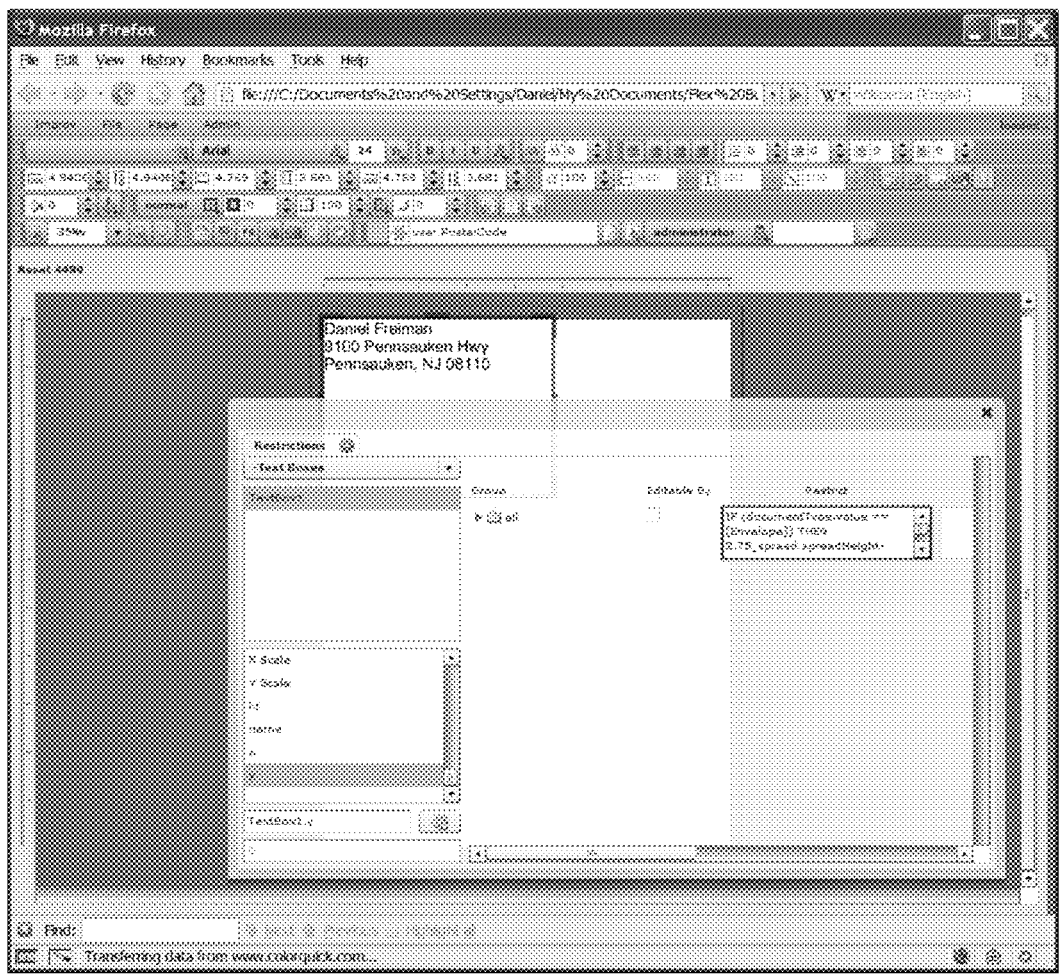
Figure 35:
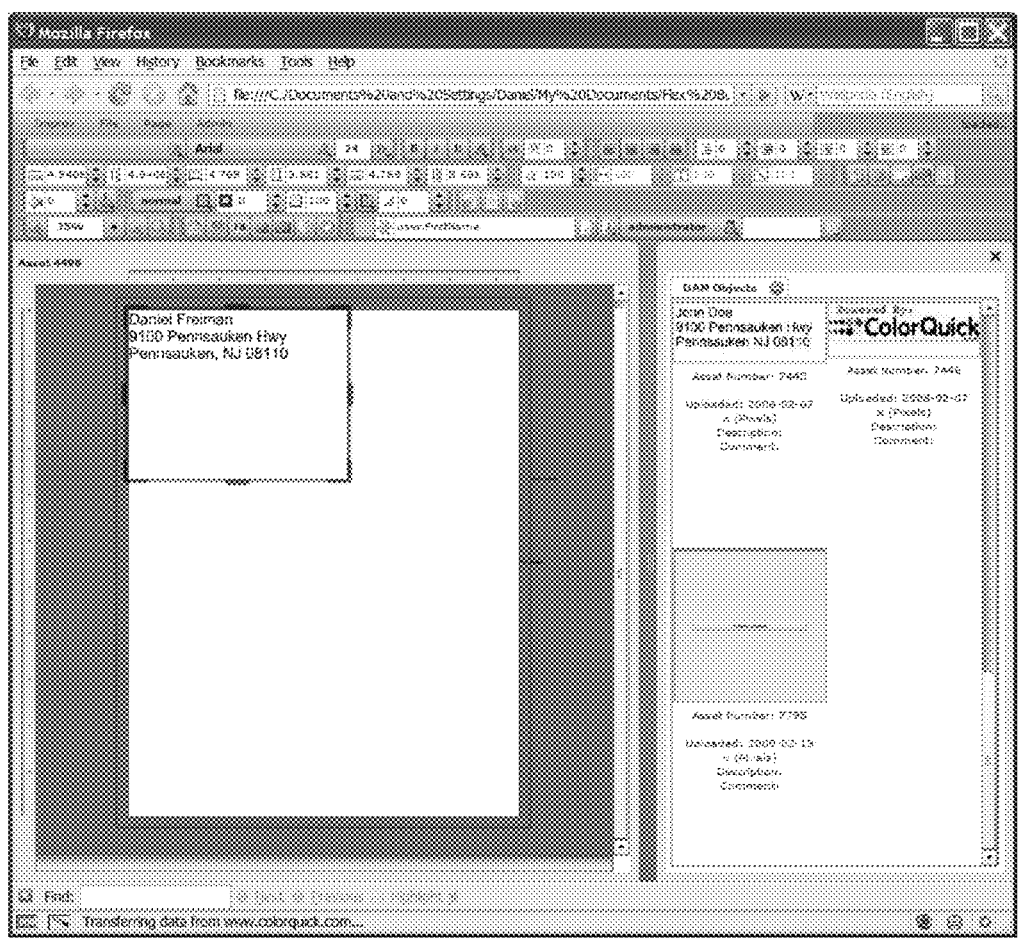
Figure 36:
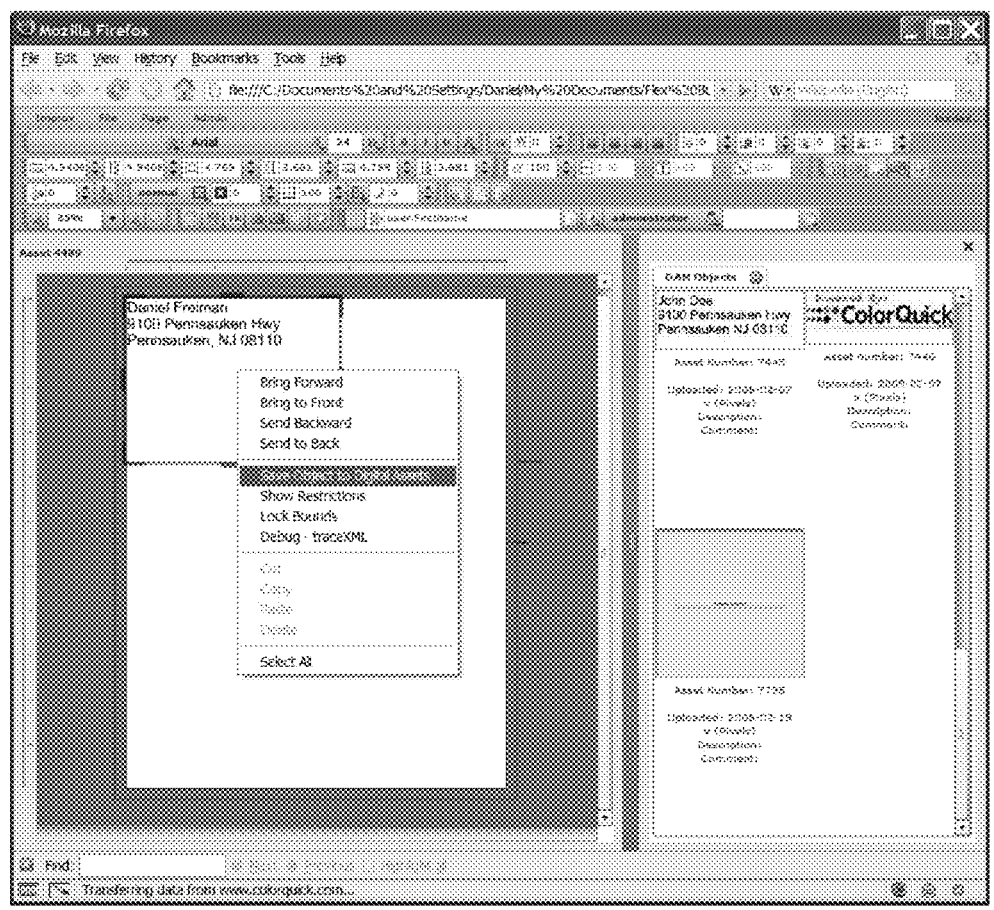
Figure 37:
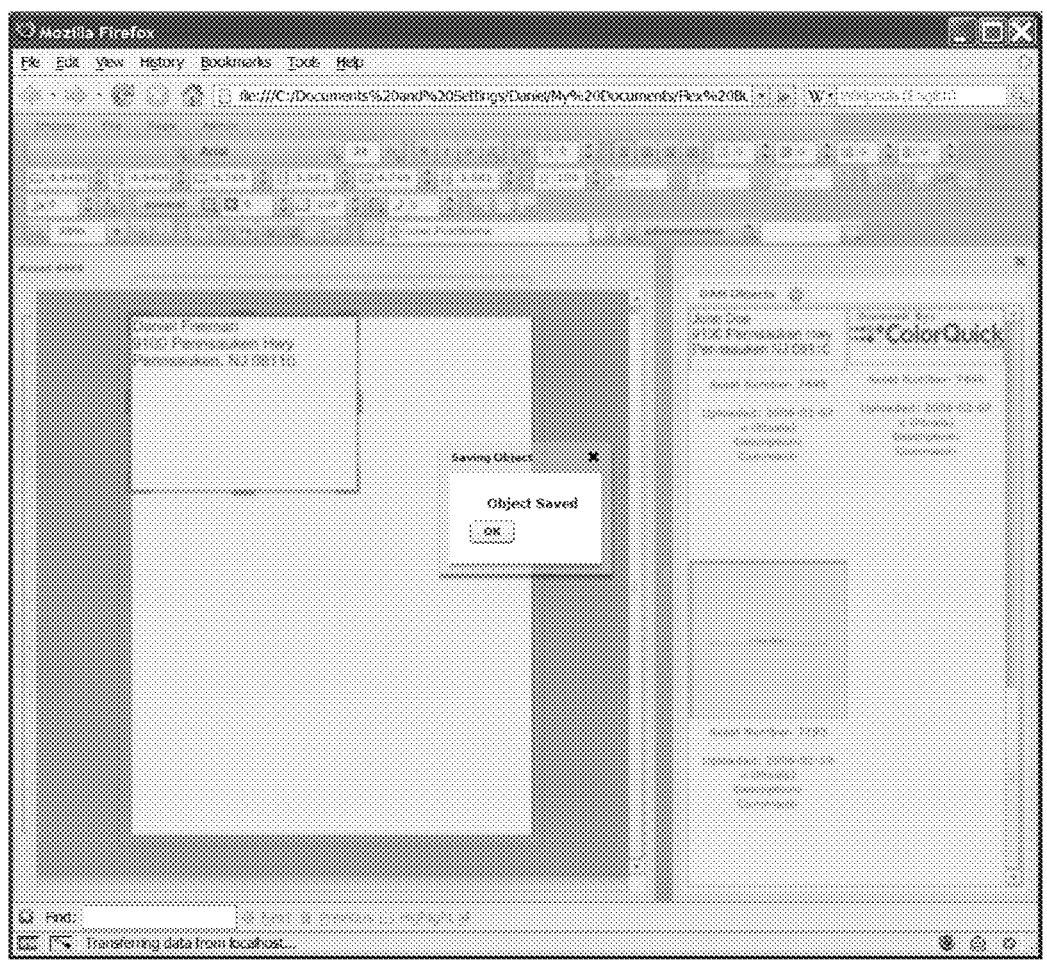
Figure 38:
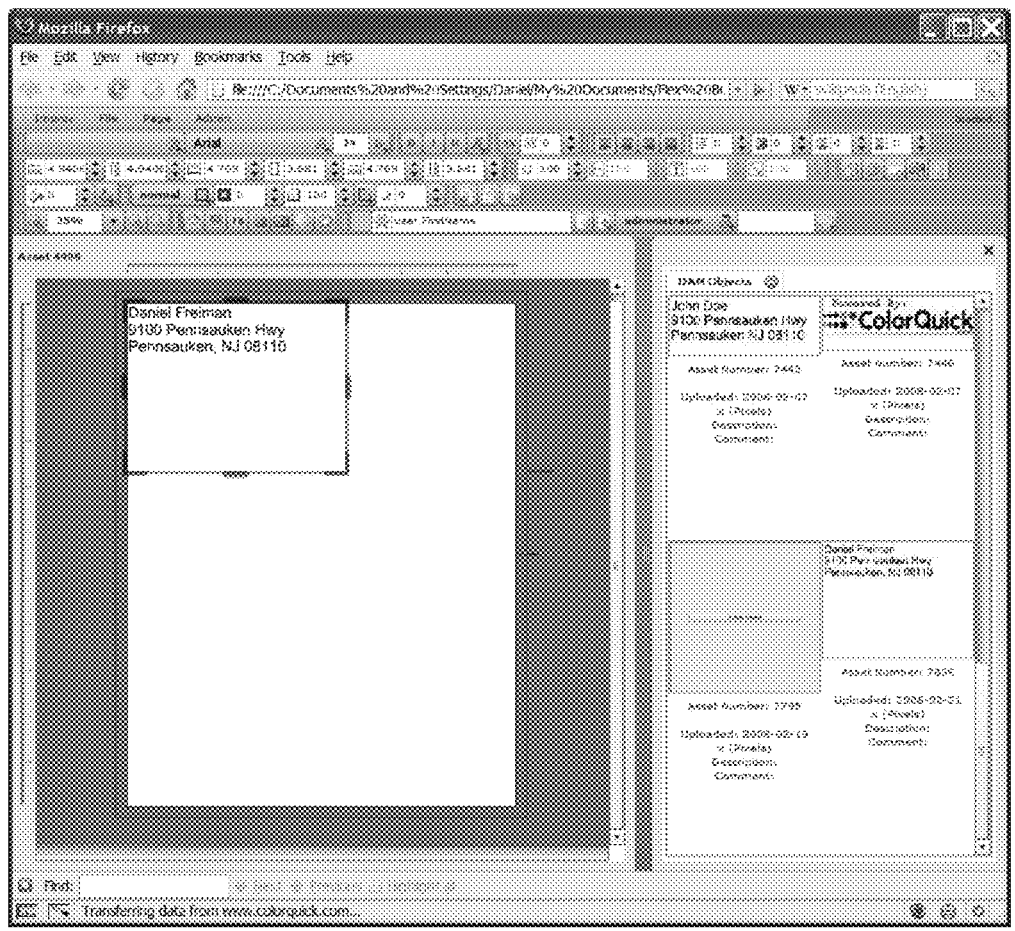

FIG. 34B shows a similar action pertaining to the y-coordinate. This restriction prevents the text box from being less than 2.75 inches from the top of the document and 0.065 inches from the bottom of the document if and only if the type of the document is an "Envelope".

FIGS. 35-38 show the text box being saved as a Smart Object in the same manner as Smart Objects have been saved in previous discussions.

Figure 39:
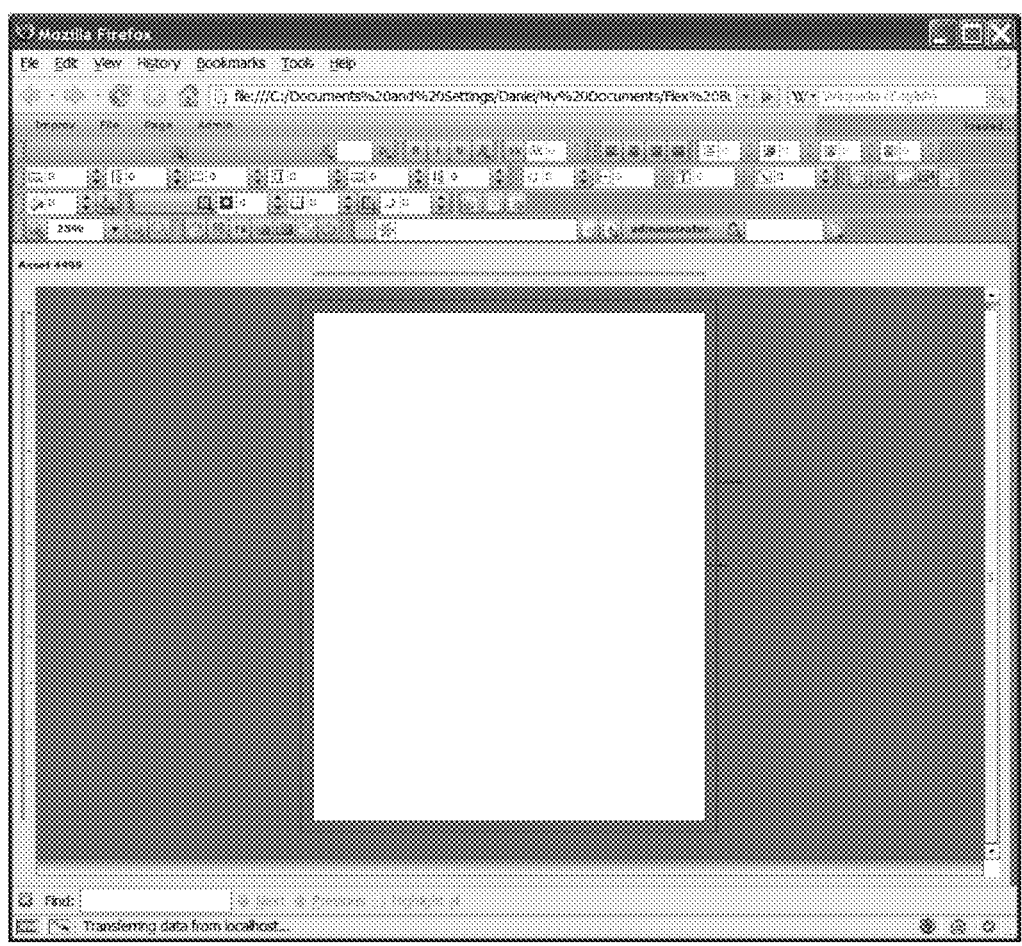
Figure 40:
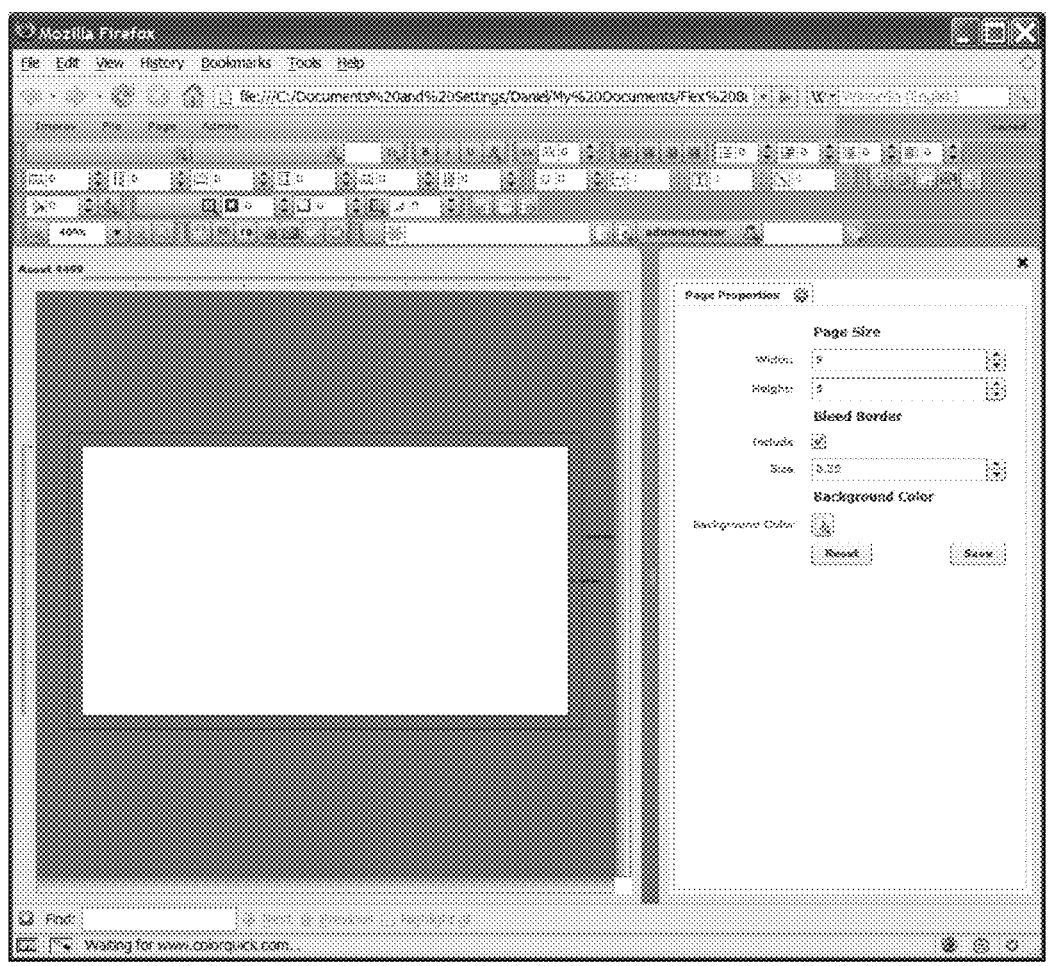
Figure 41:
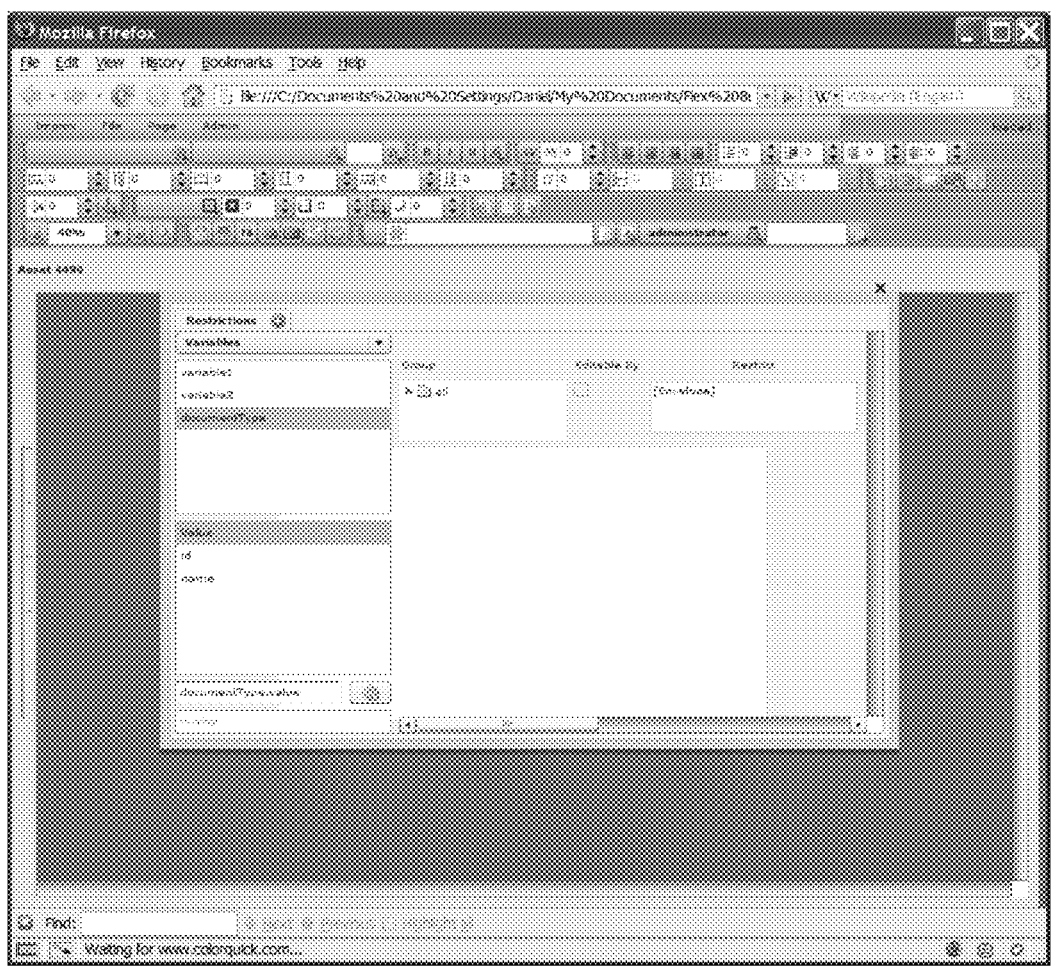

FIGS. 39-41 show the same user setting up a new document in a new instance of the application.

Figure 42:
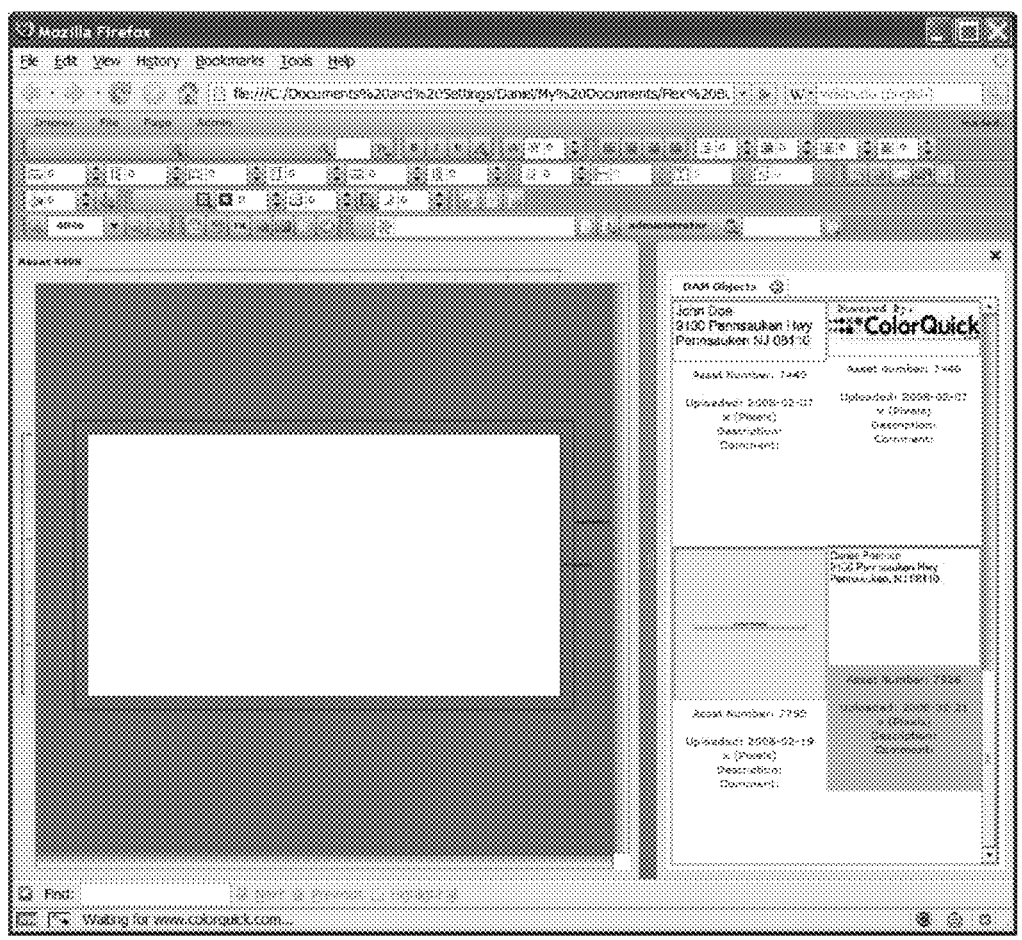

FIG. 39 shows the same user having opened a new document in a new instance of the application. FIG. 41 shows the user resizing the document. FIG. 42 shows the user changing the document type to "Envelope".

FIGS. 42-45 show a user importing a copy of the previously mentioned Smart Object into the new document.

Figure 43:
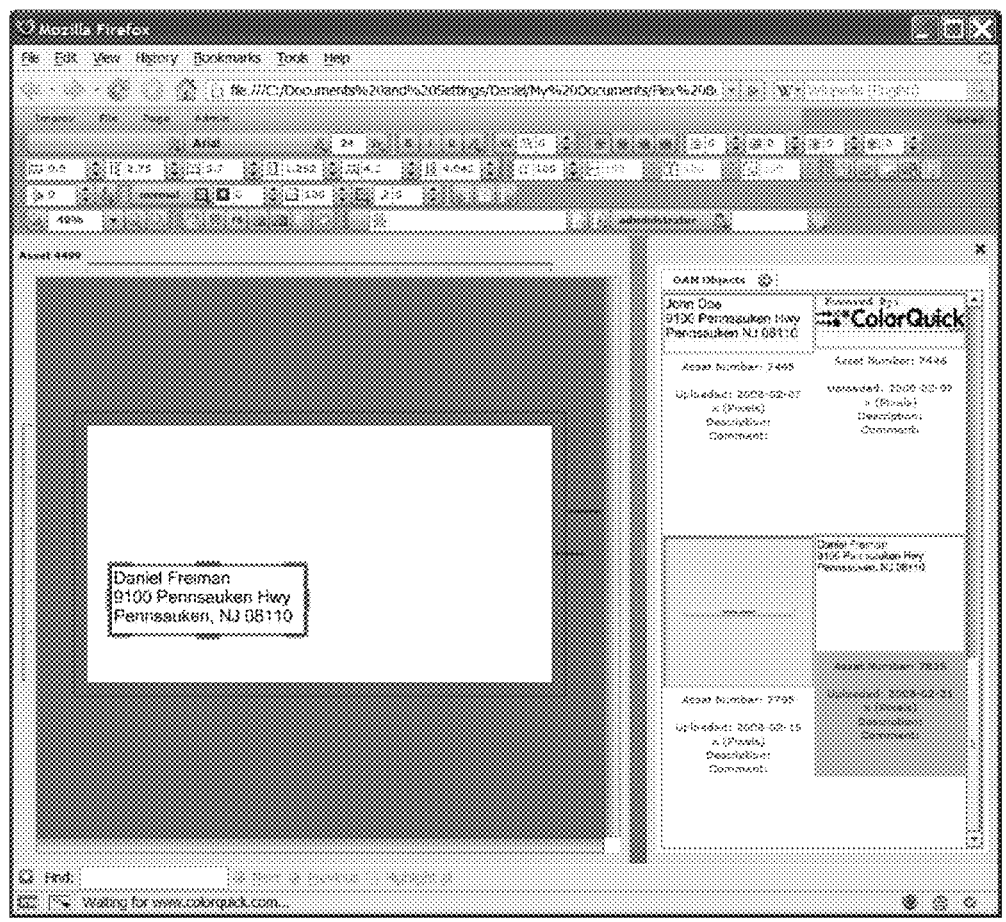
Figure 44:
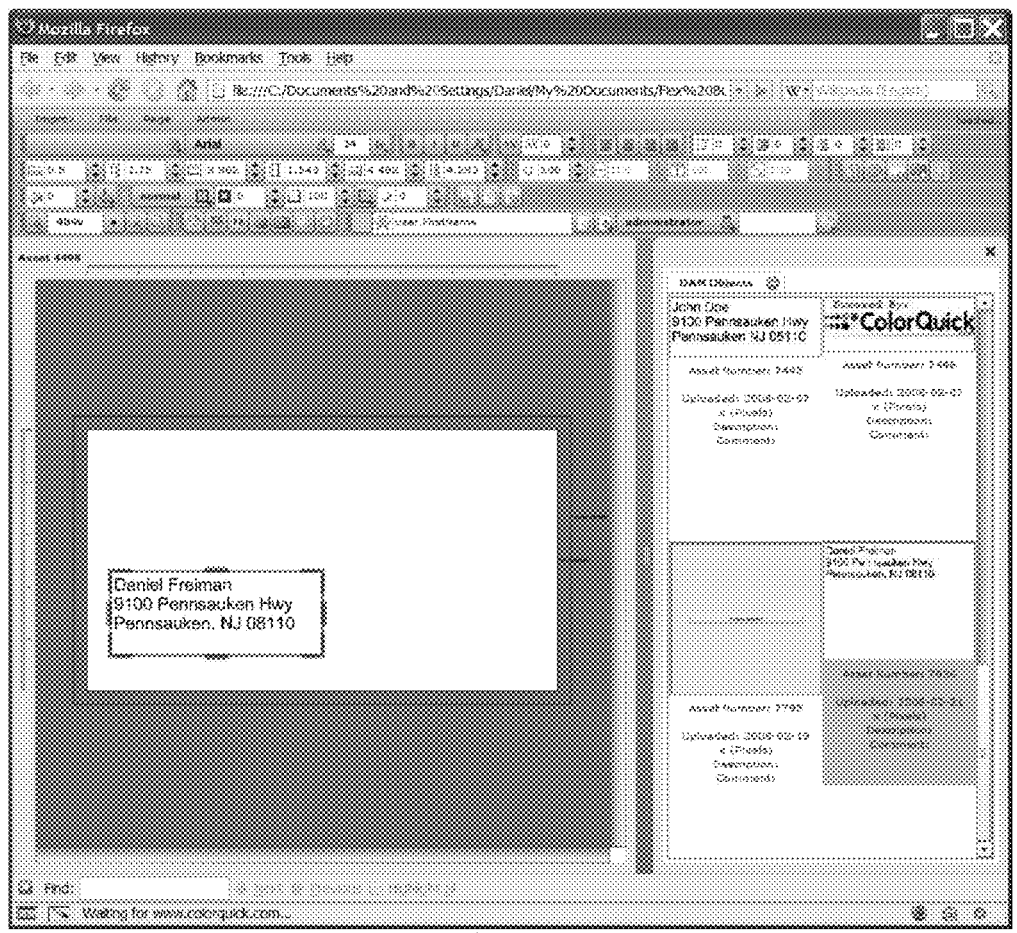
Figure 45:
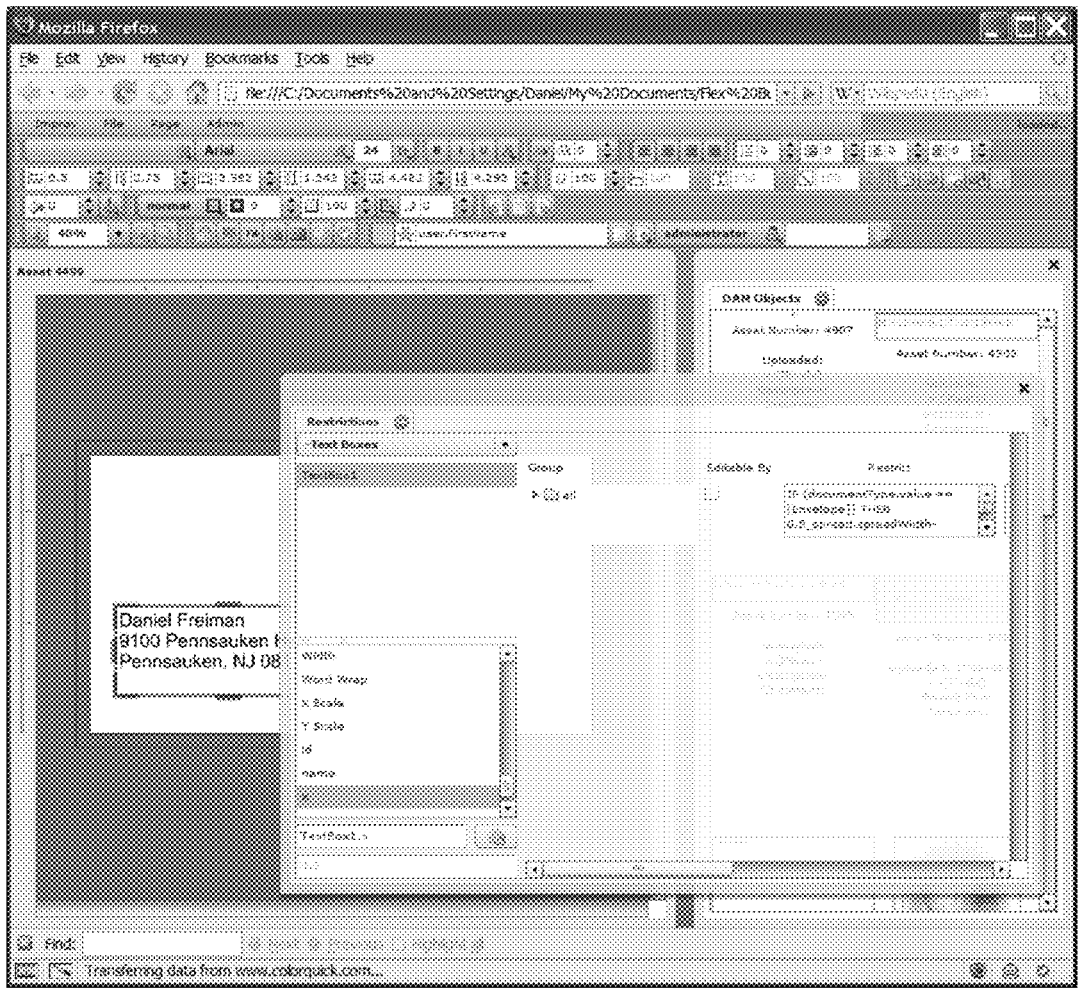

FIG. 43 shows that the Smart Object was automatically moved to a position that does not violate the rules set up in FIGS. 34A and 34B. FIG. 44 shows that the variable fields have not changed. FIG. 45 illustrates that the rules that enforce the valid positions of the text box in FIGS. 34A and 34B are the same rules that are being enforced in FIG. 43.

Figure 46:
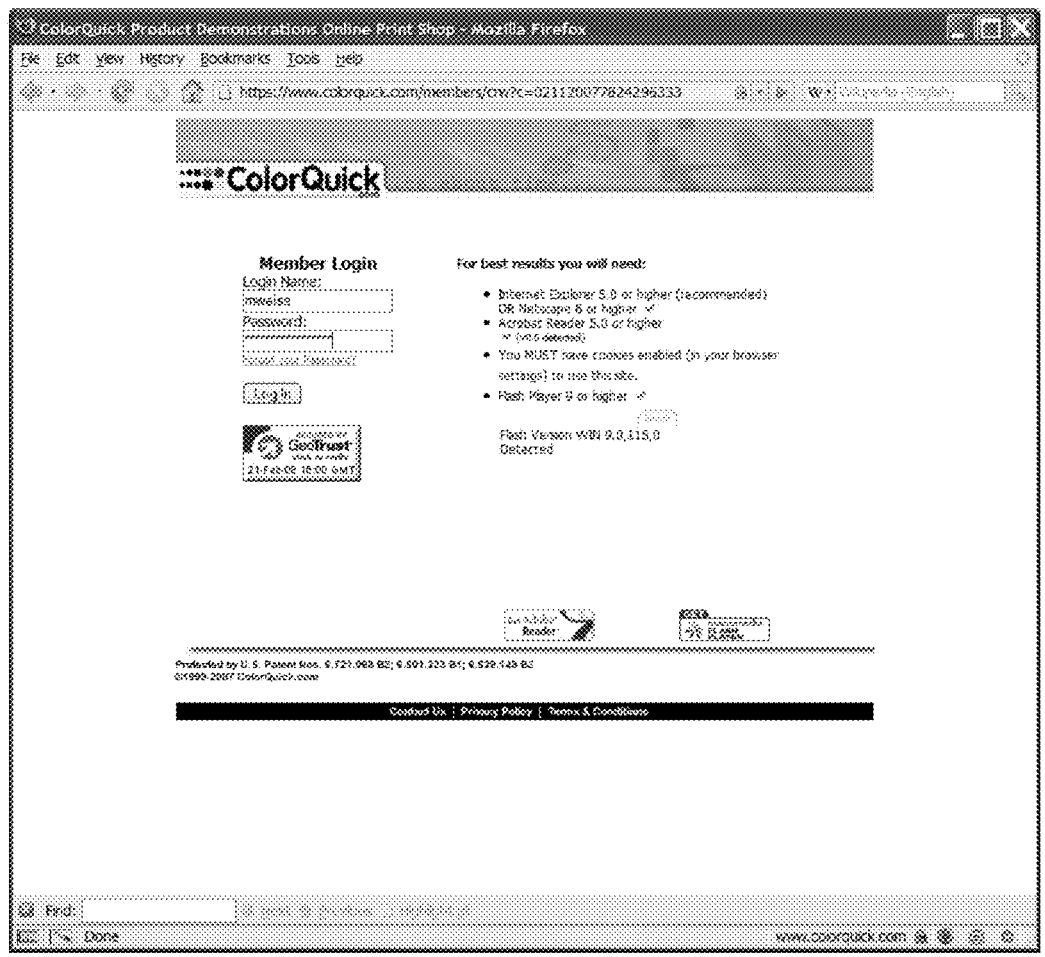
Figure 47:
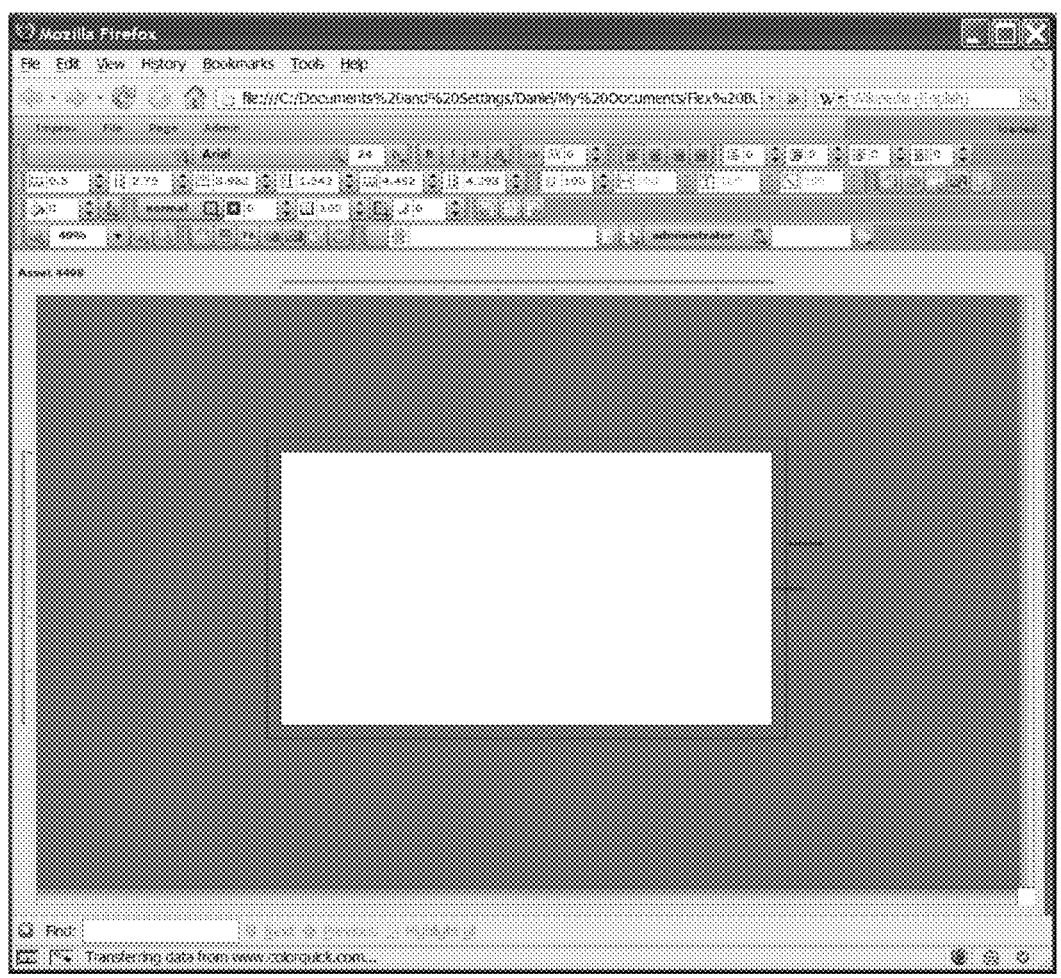
Figure 48:
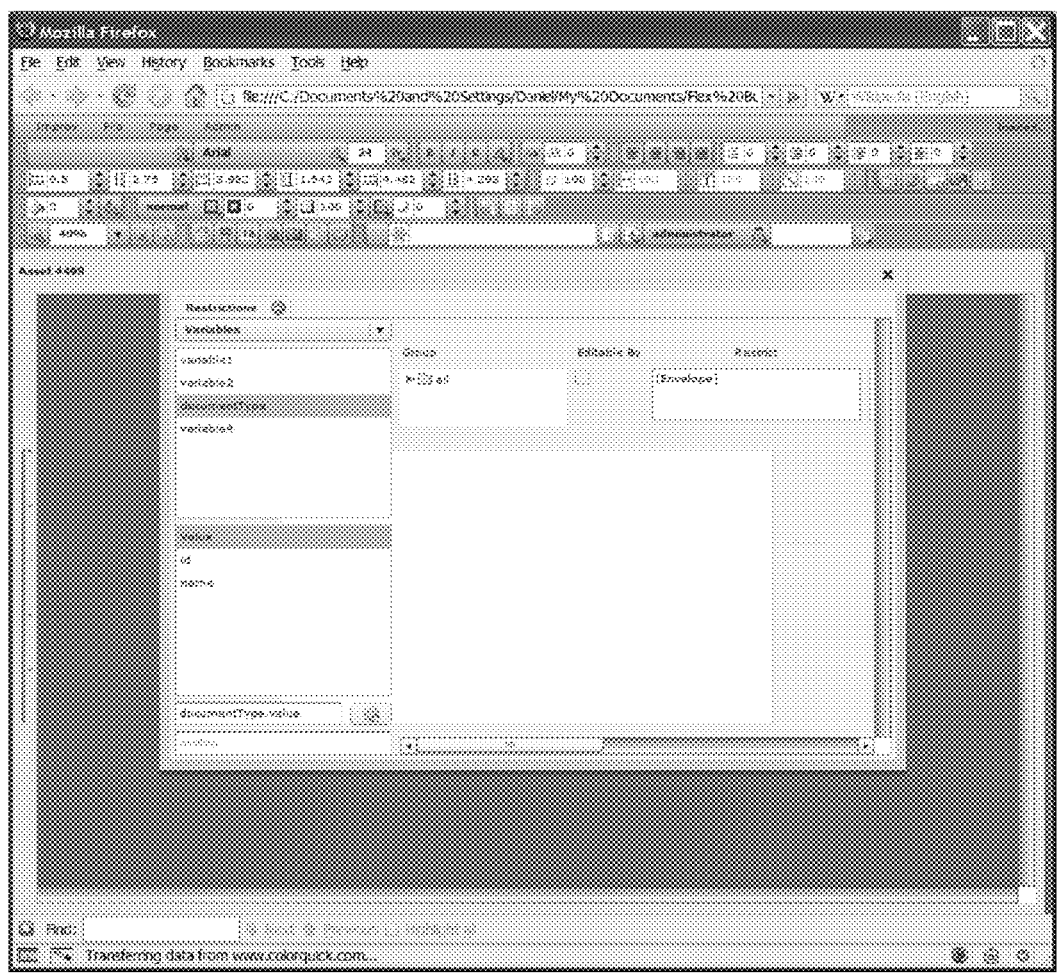

FIGS. 46-48 shows a second user logging in and creating a new document in a new instance of the application.

FIG. 46 shows a second user logging into the website. FIG. 47 shows a new document that the user is editing. FIG. 48 shows the user changing the document type to "Envelope".

Figure 49:
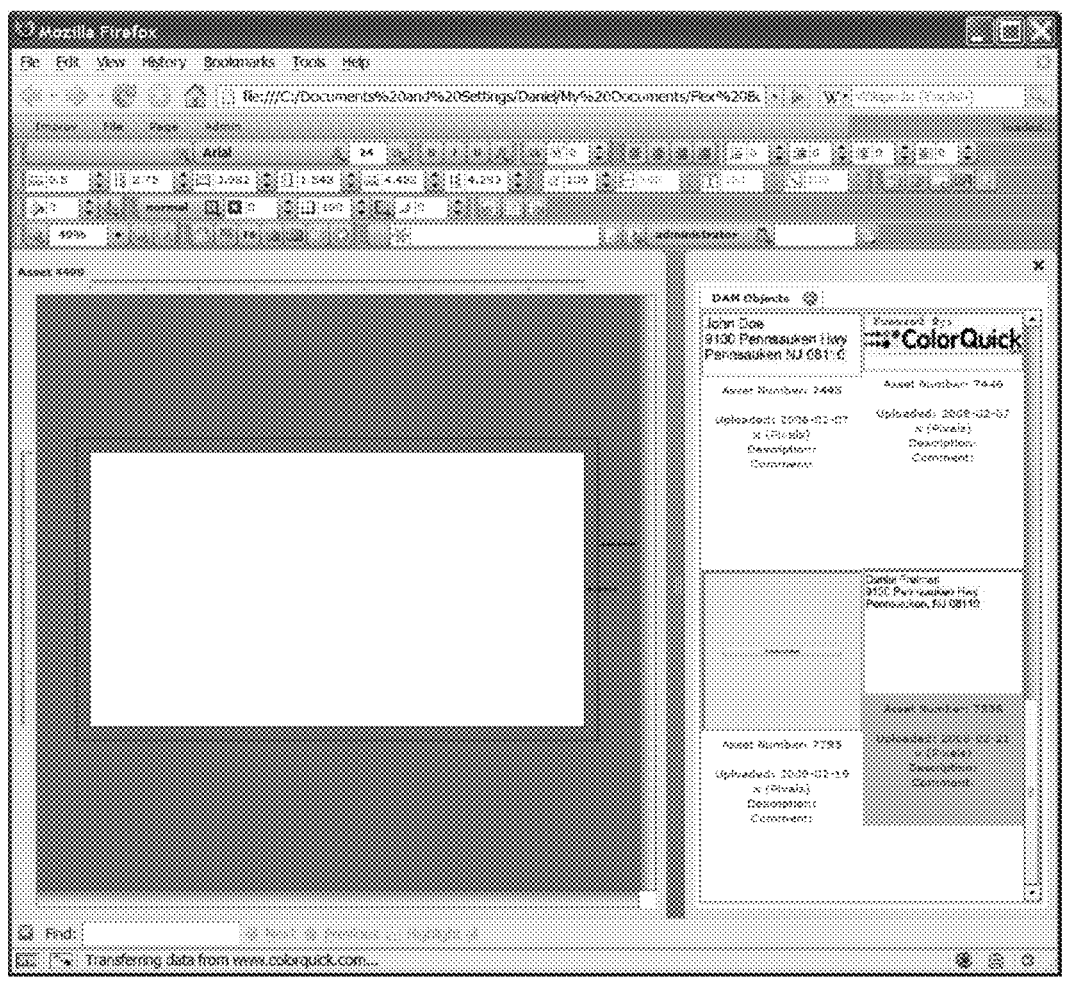
Figure 50:
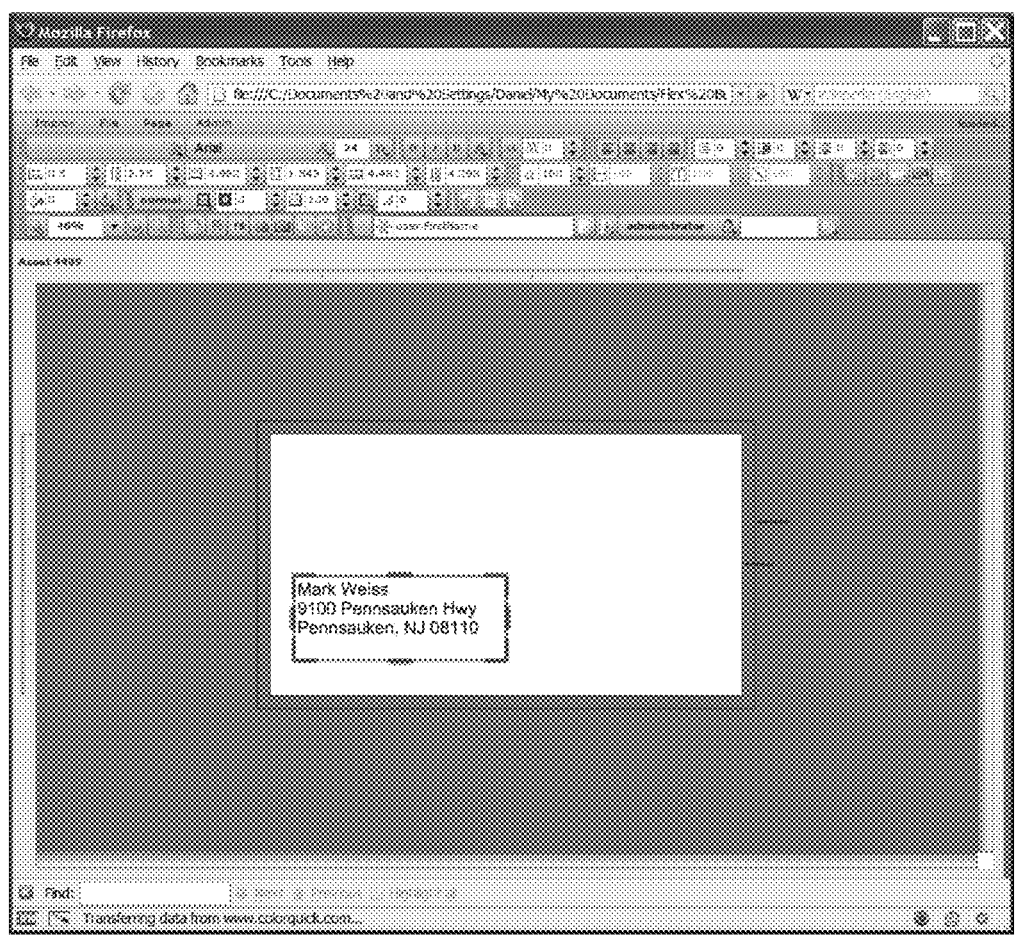

FIGS. 49-50 show the second user importing a copy of the previously mentioned Smart Object into a document.

FIG. 49 shows that this second user has access to the Smart Object that the previous user created. FIG. 50 shows the condition of the document after the user has added this Smart Object. The rules constraining the location of the text box were still enforced as in FIG. 43. The variable fields in the text box automatically took on different values than they did for the previous user. The values reflect information of the current user that is using the Smart Object, not information of the user that created the Smart Object.

Figure 51:
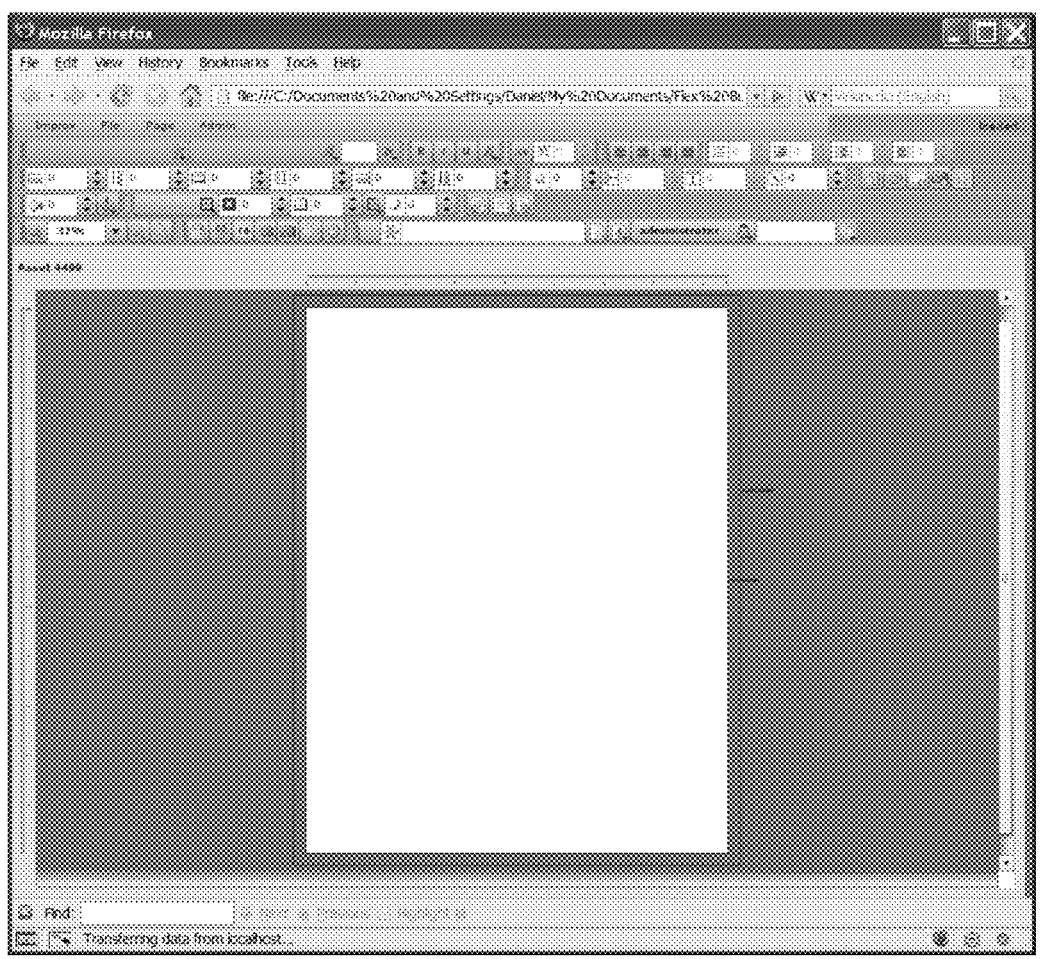

FIG. 51 shows an unspecific user creating a new blank document in a new instance of the application.

FIGS. 52-58 show the user creating a new populated image box with rules that affect the environment that the image box is used in.

Figure 52:
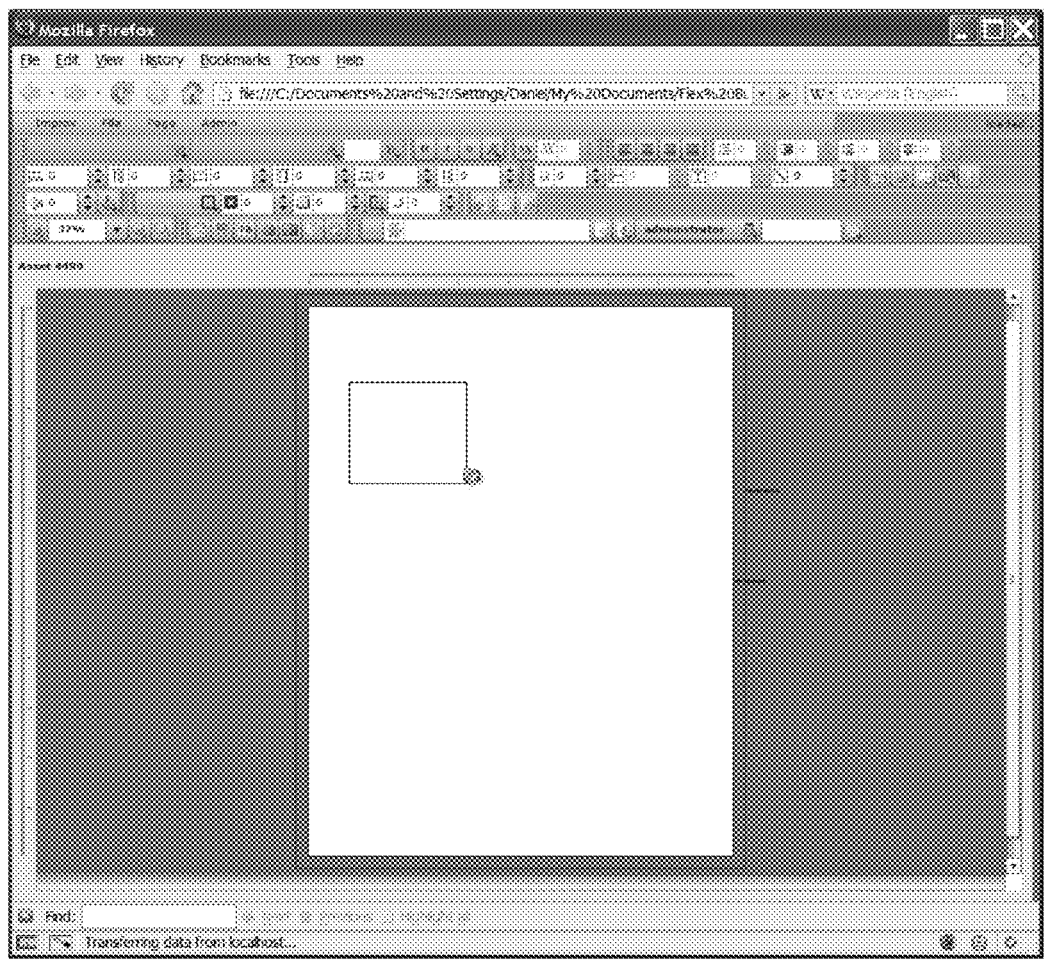
Figure 53:
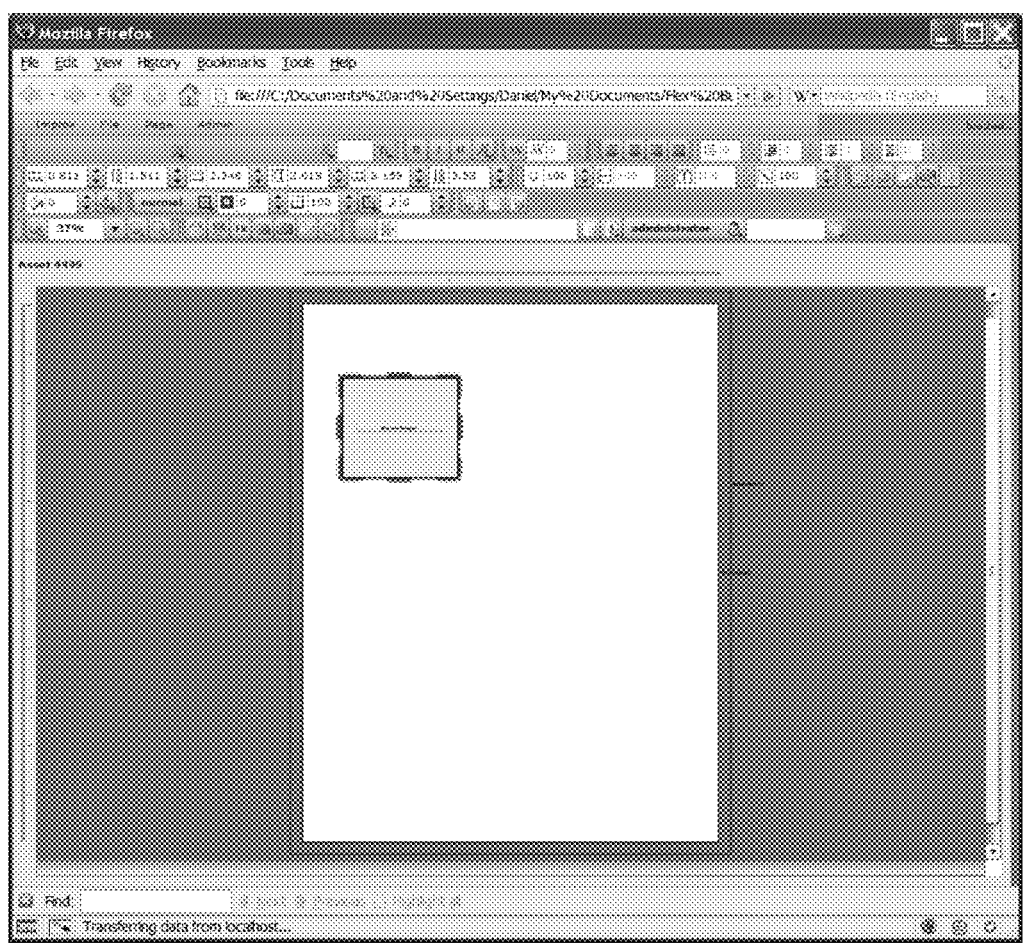
Figure 54:
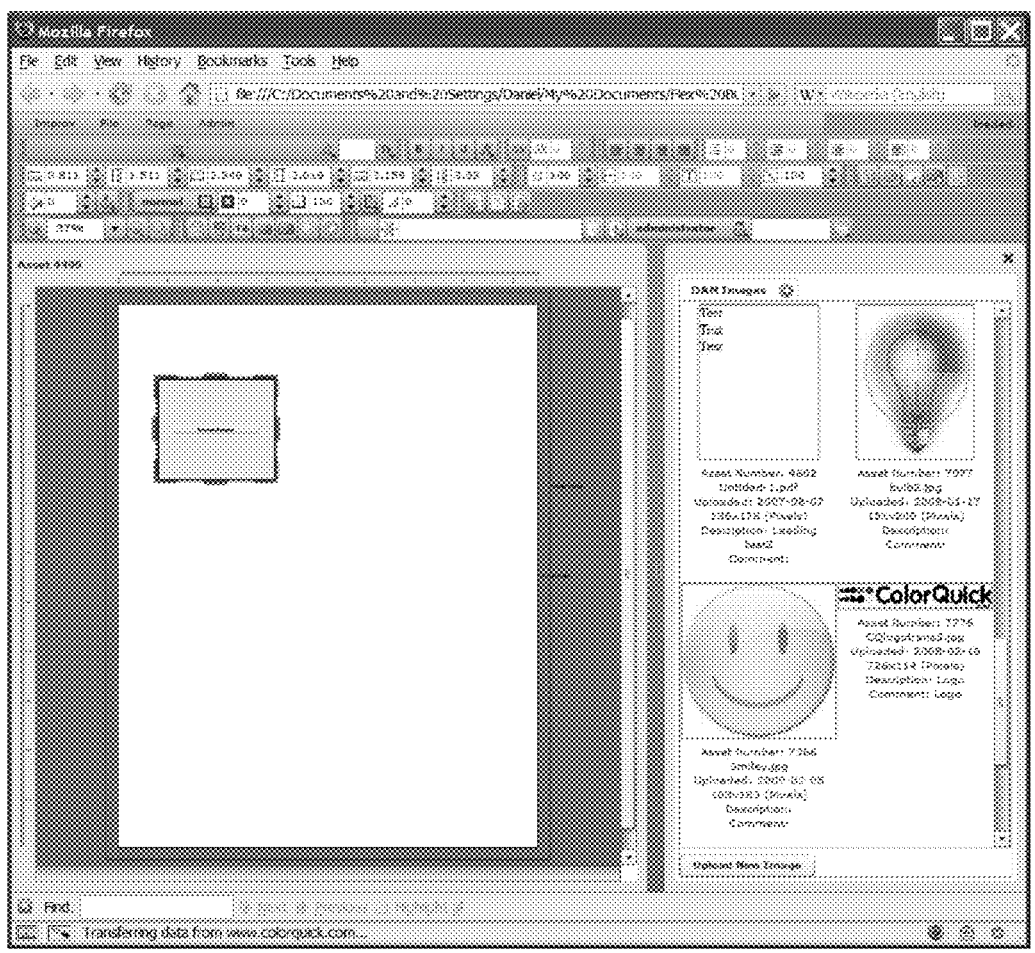

FIG. 52 shows an image box being drawn which is completed in FIG. 53. FIG. 54 shows the user browsing their digital asset library of images.

Figure 55:
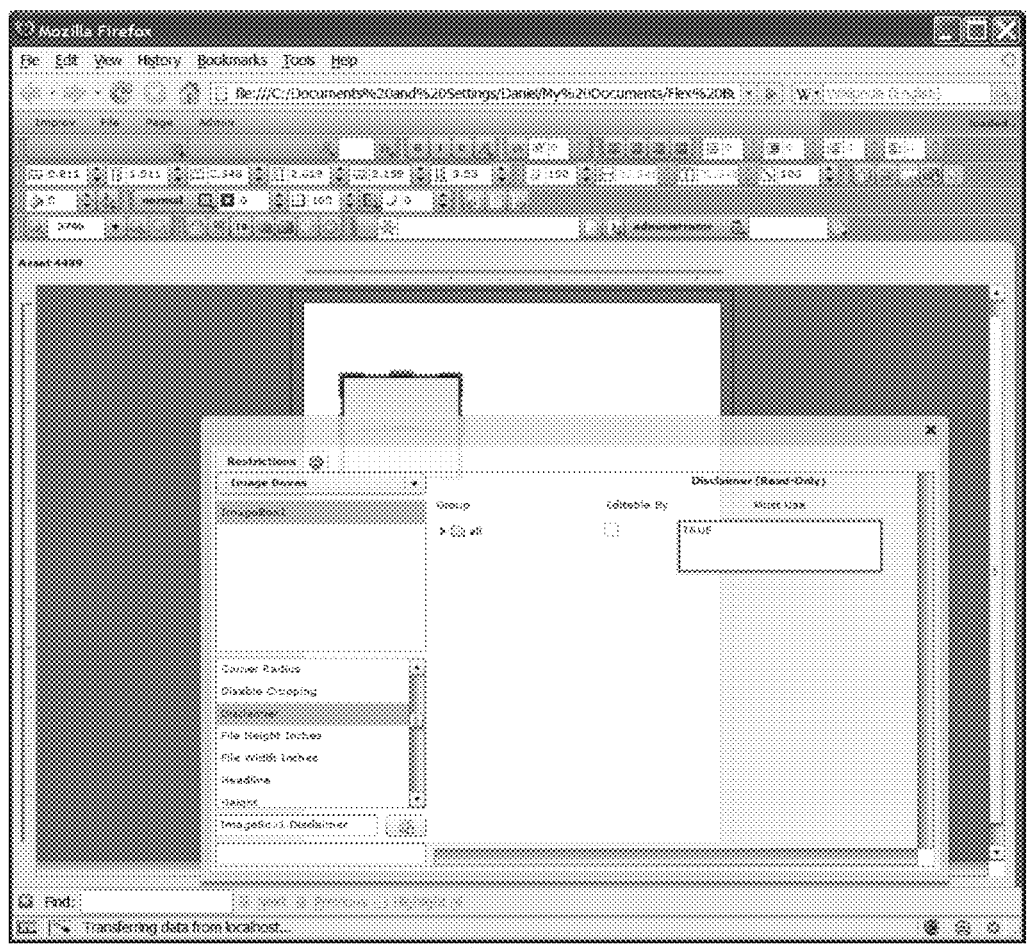
Figure 56:
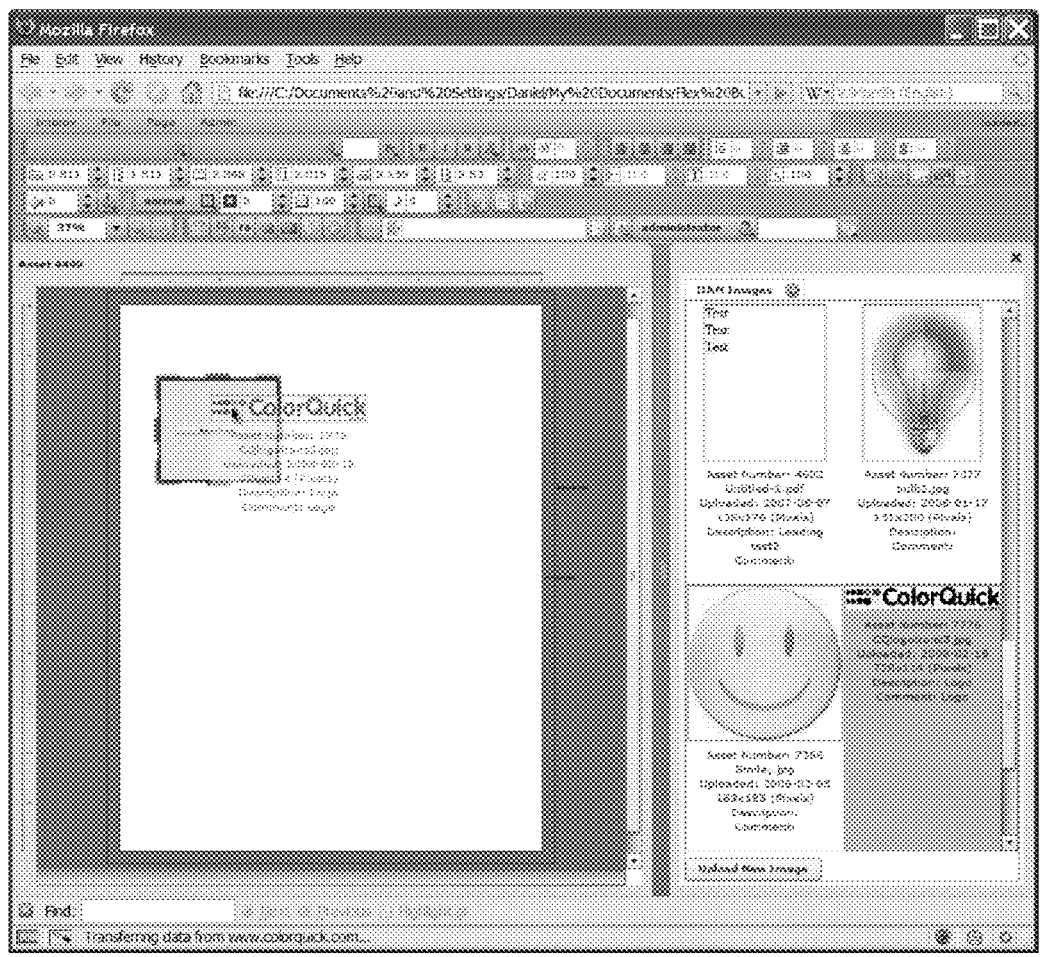
Figure 57:
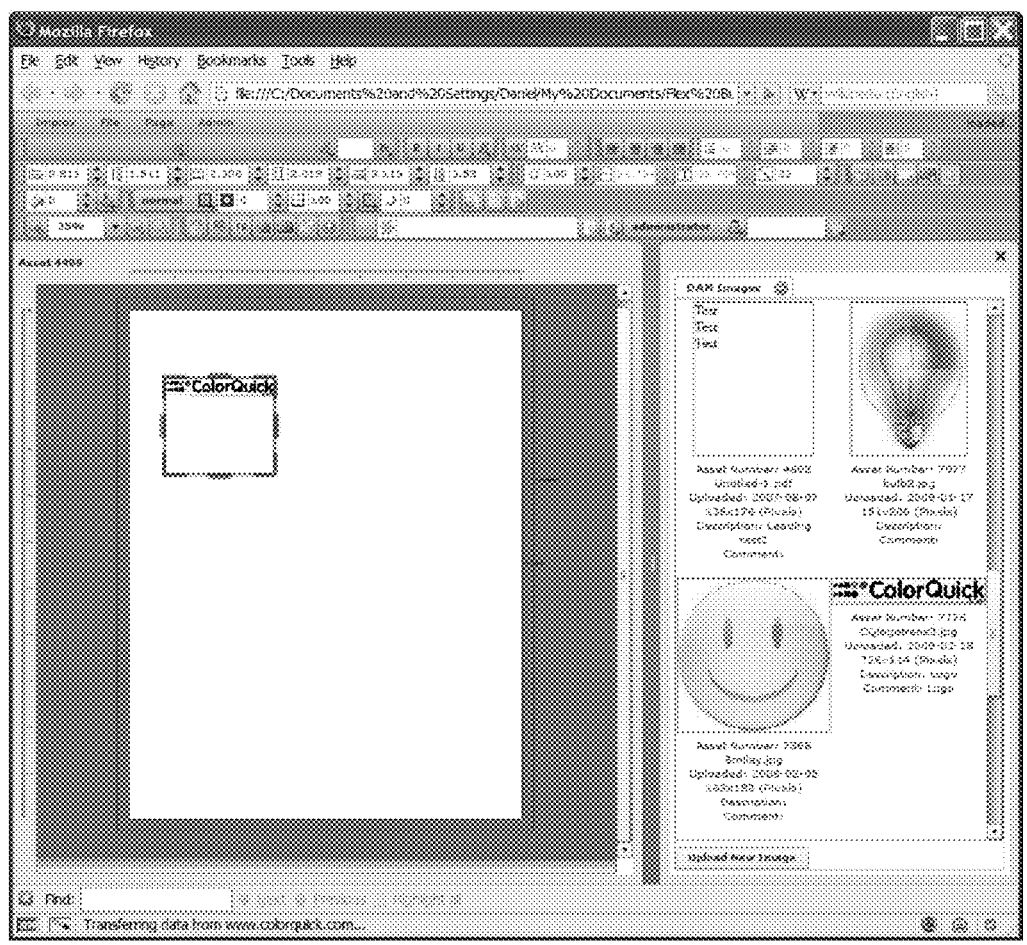
Figure 58:
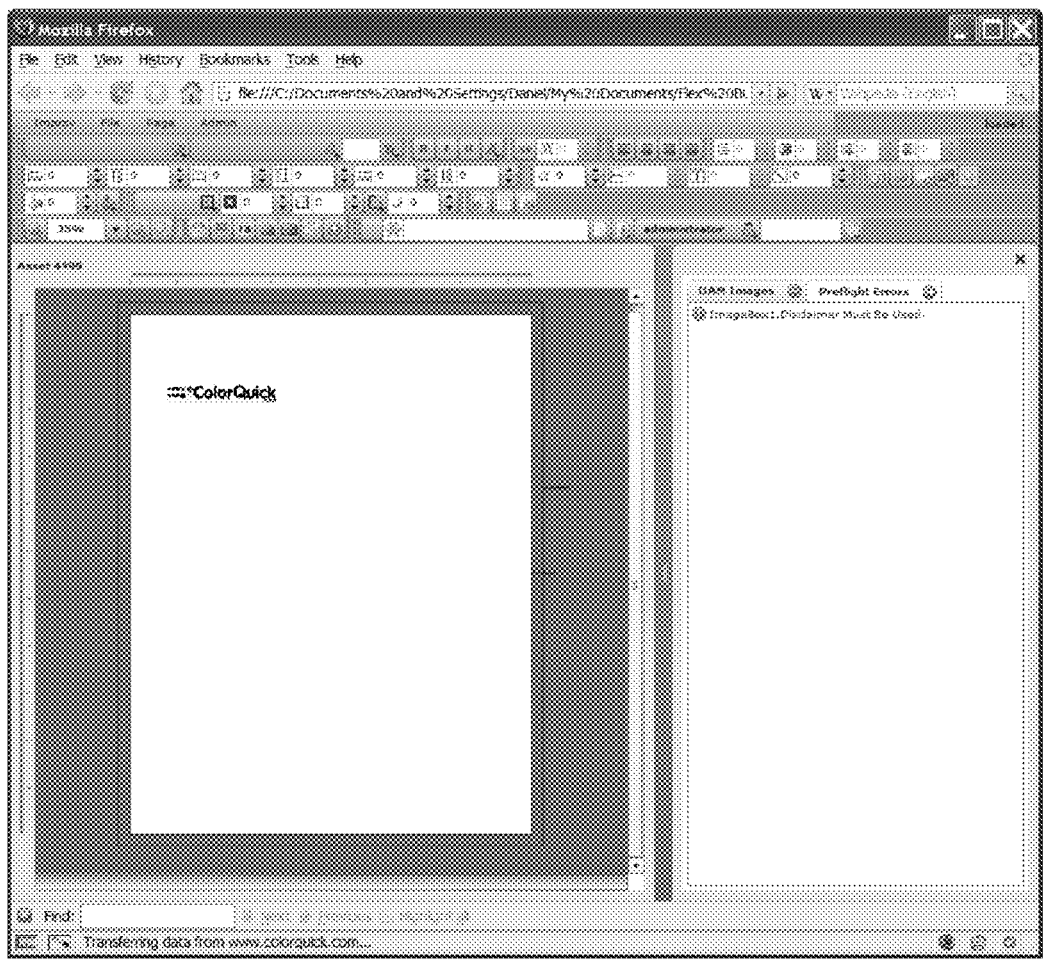

FIG. 55 shows the user creating a rule that requires that the "Disclaimer" property of the image placed within the image box be displayed somewhere in the document. FIG. 56 shows an image being added to the image box. FIG. 57 shows the image box populated with the image. FIG. 58 shows that the activity that occurred in FIG. 57 caused the document to throw an error because the "Disclaimer" property is now valid but is not used.

Figure 59:
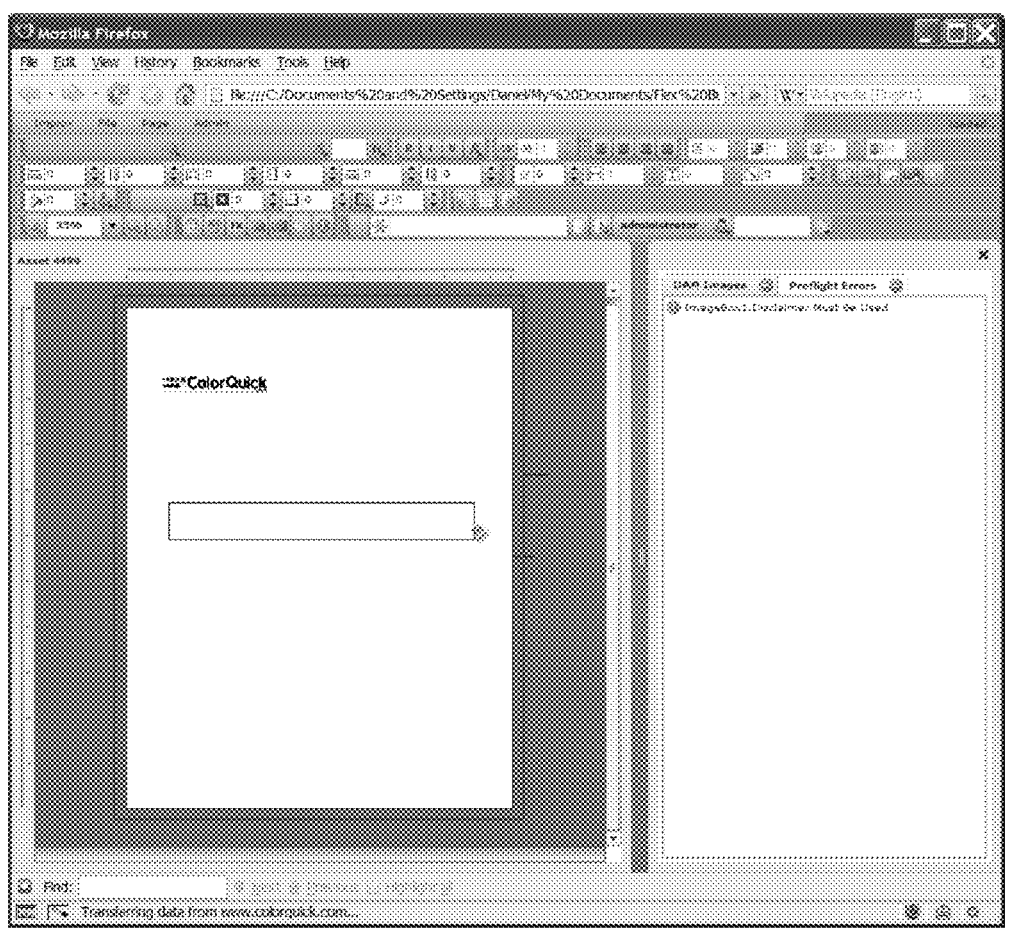
Figure 60:
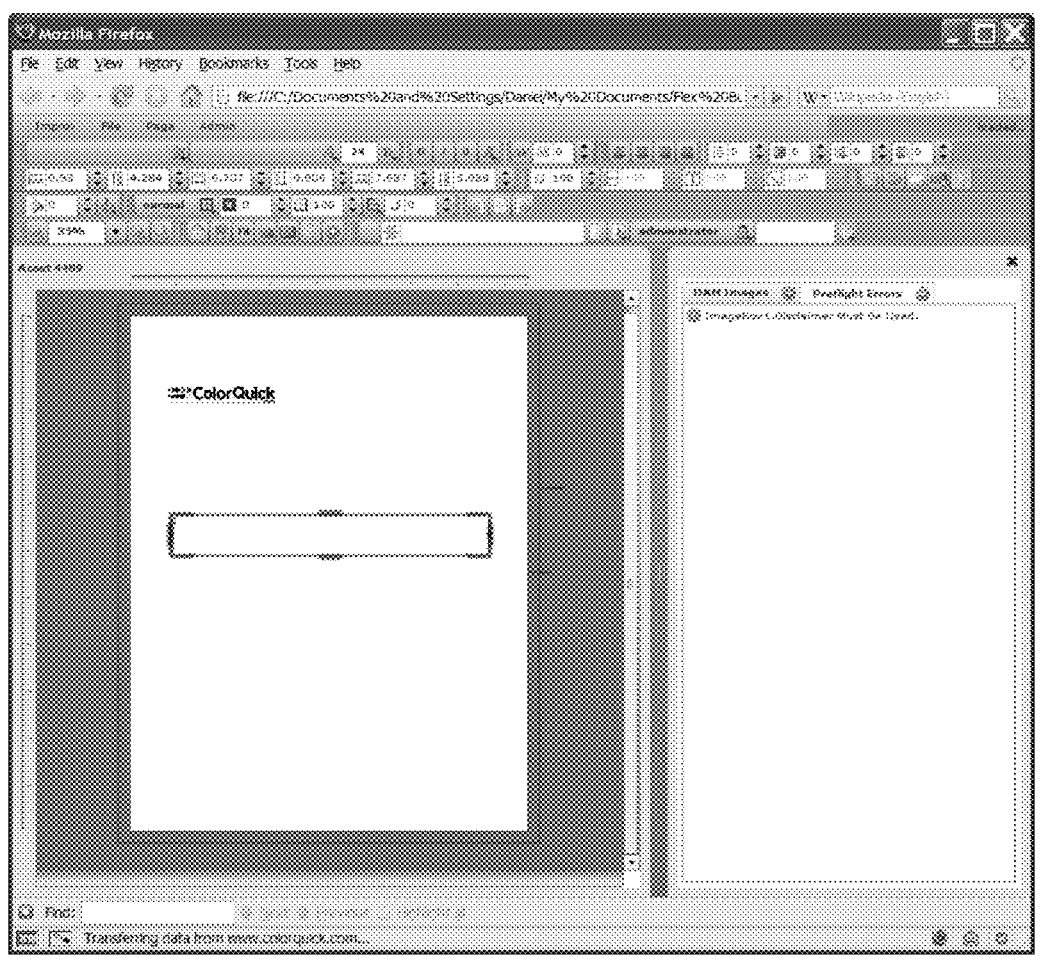

FIGS. 59-60 show a user creating a new text box in the same manner as discussed above.

FIGS. 61A-61C and FIG. 62 show the user populating the aforementioned text box with a variable.

Figure 61A:
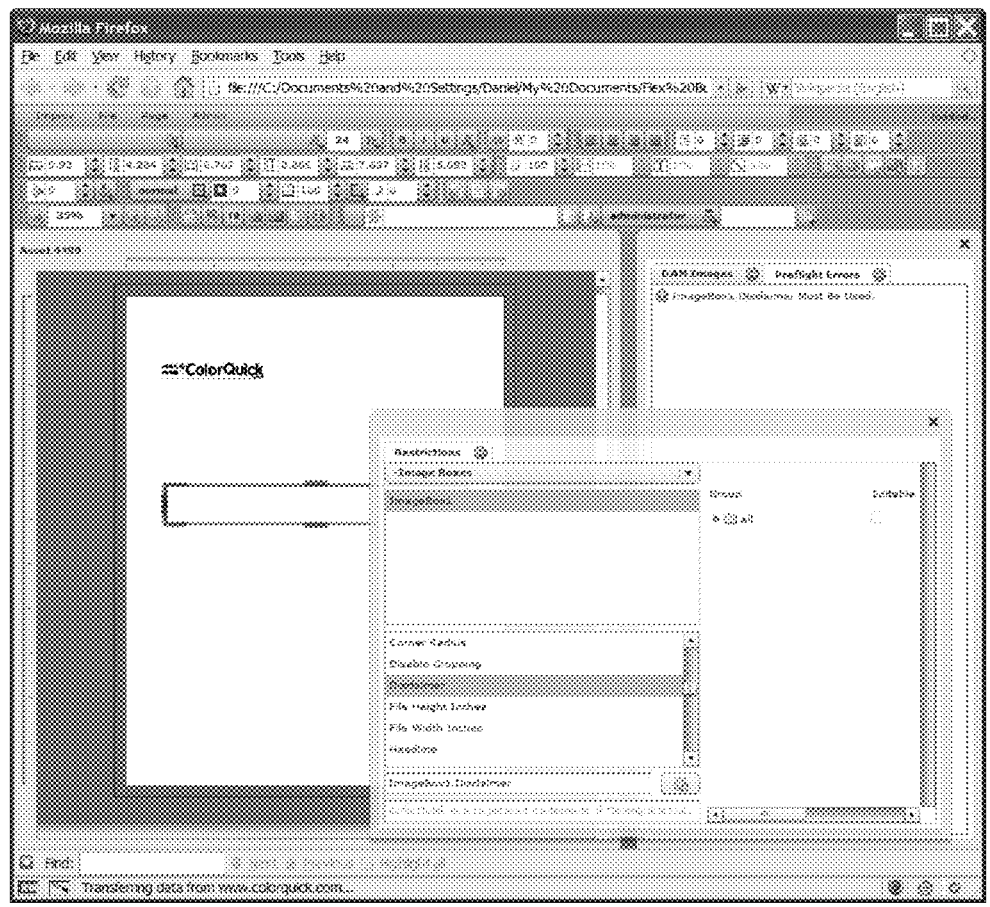
Figure 61B:
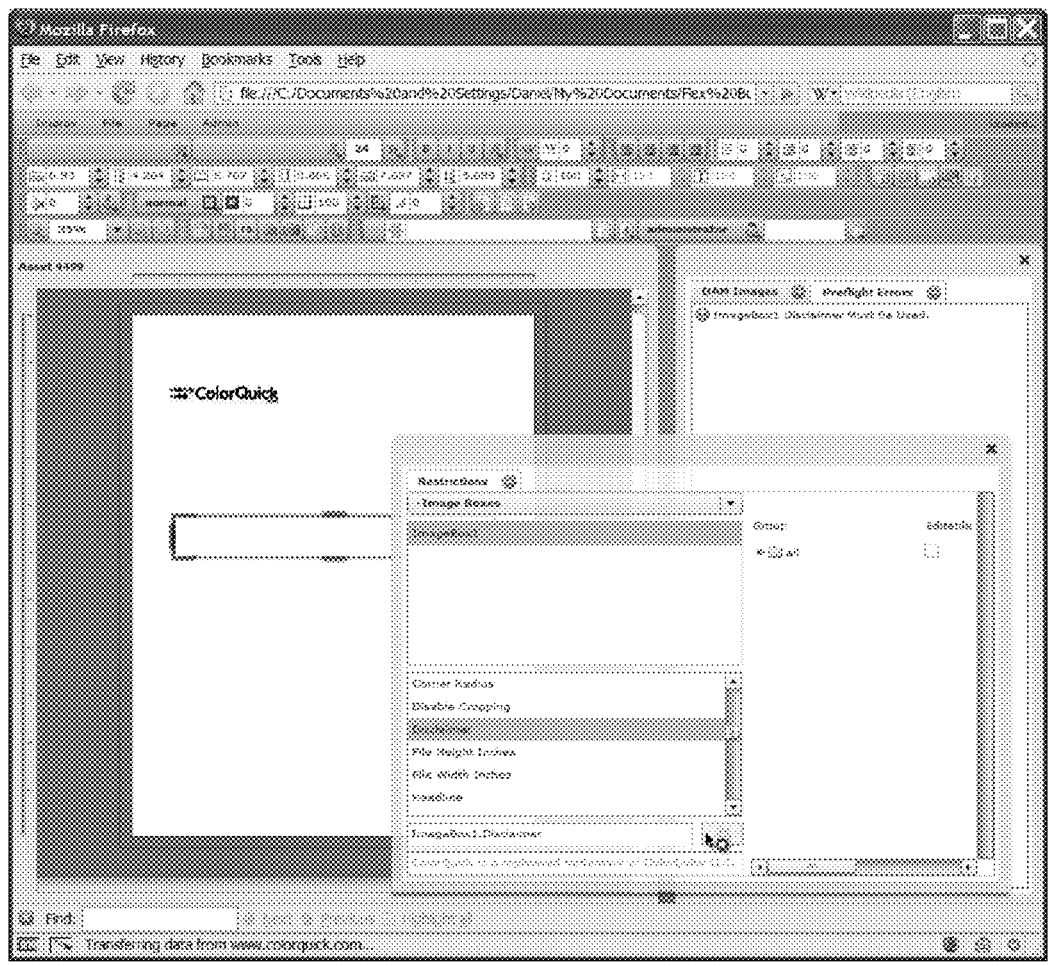
Figure 61C:
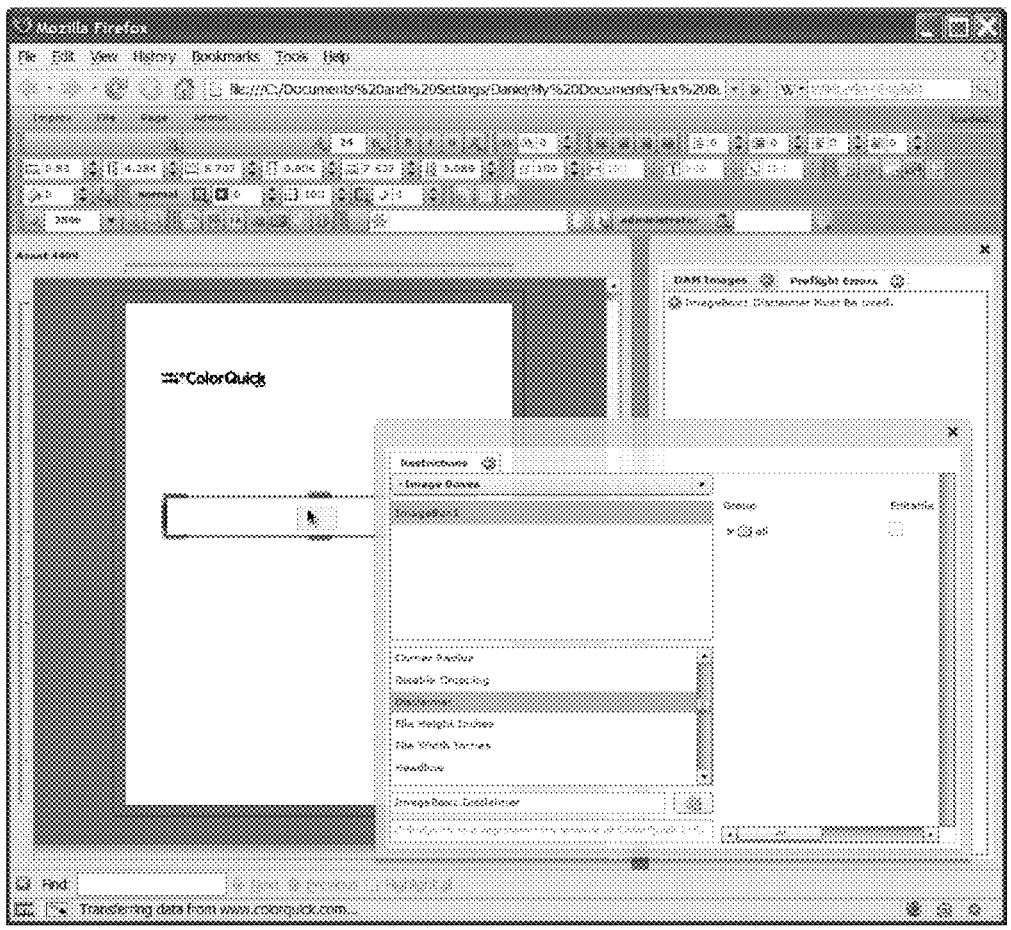
Figure 62:
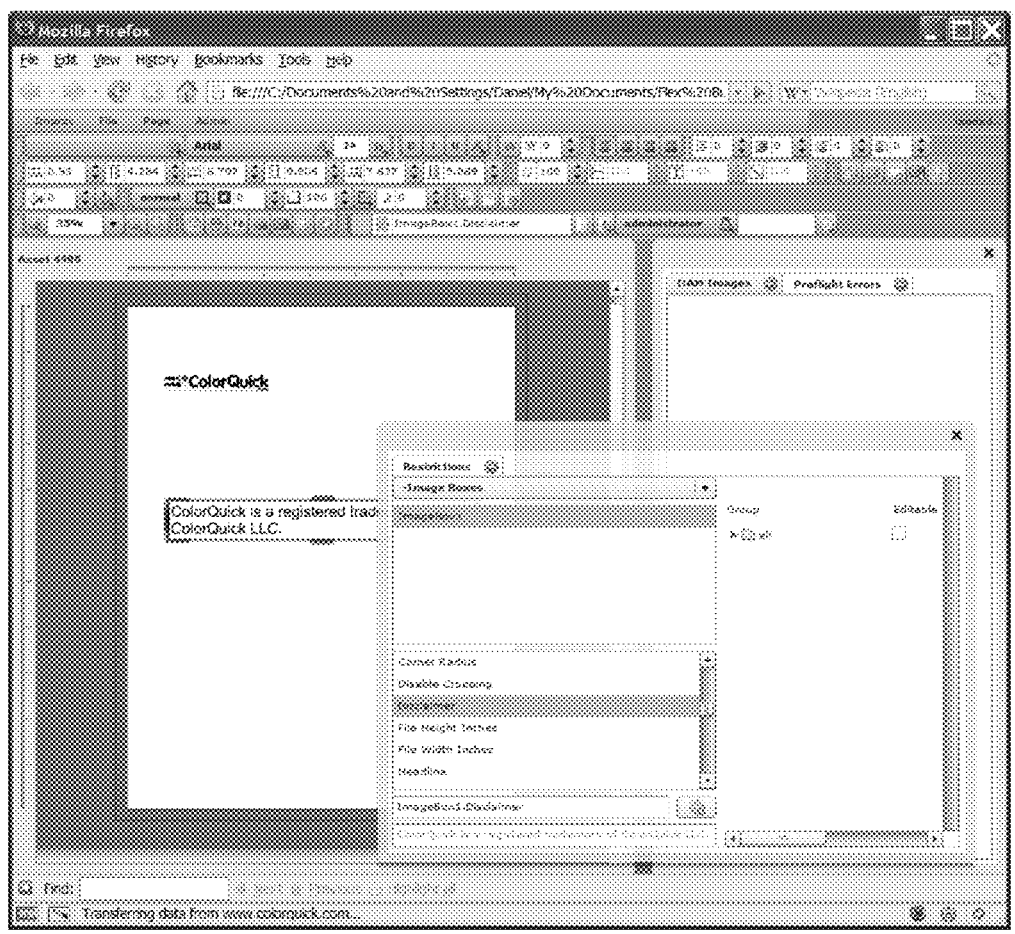

FIG. 61A shows the user browsing the properties of the image box. FIGS. 61B and 61C show the user dragging and dropping a graphic handle representing the "Disclaimer" property into the text box. FIG. 62 shows the result of this drop and drag that the text box is now populated with the "Disclaimer" value and the error has disappeared.

Figure 63:
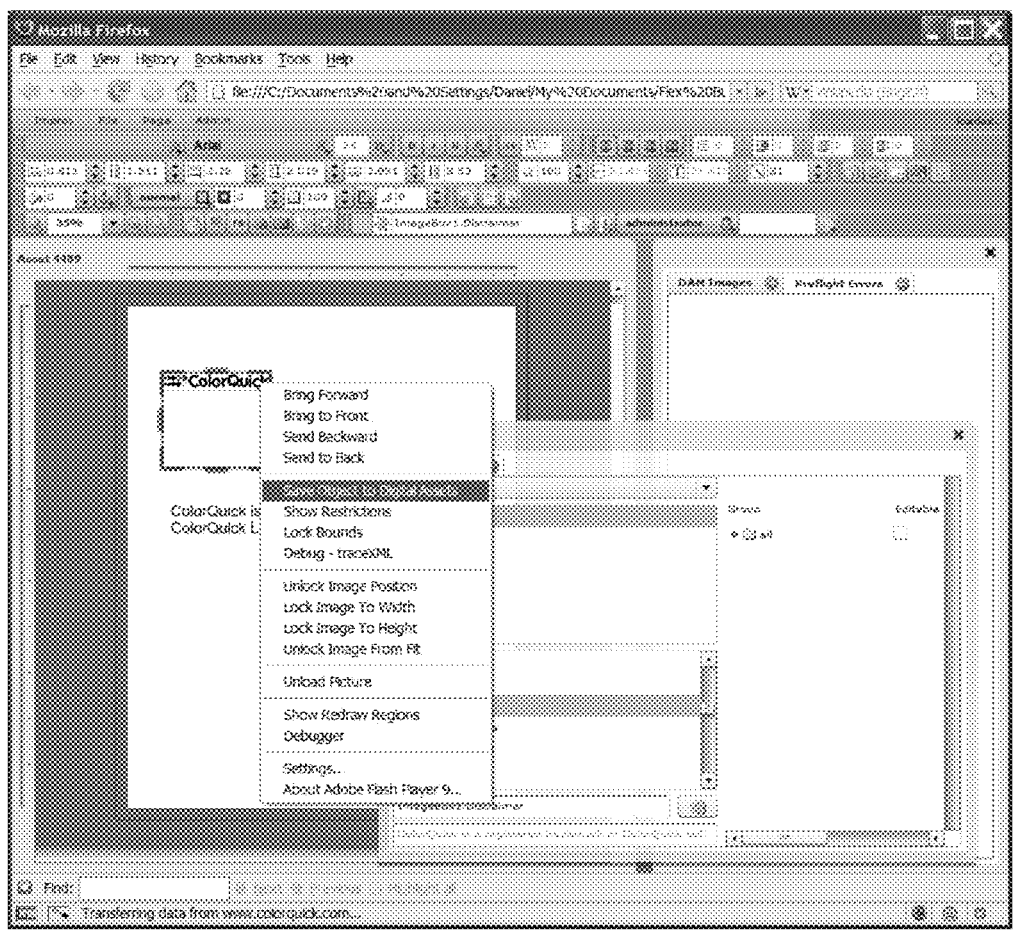
Figure 64:
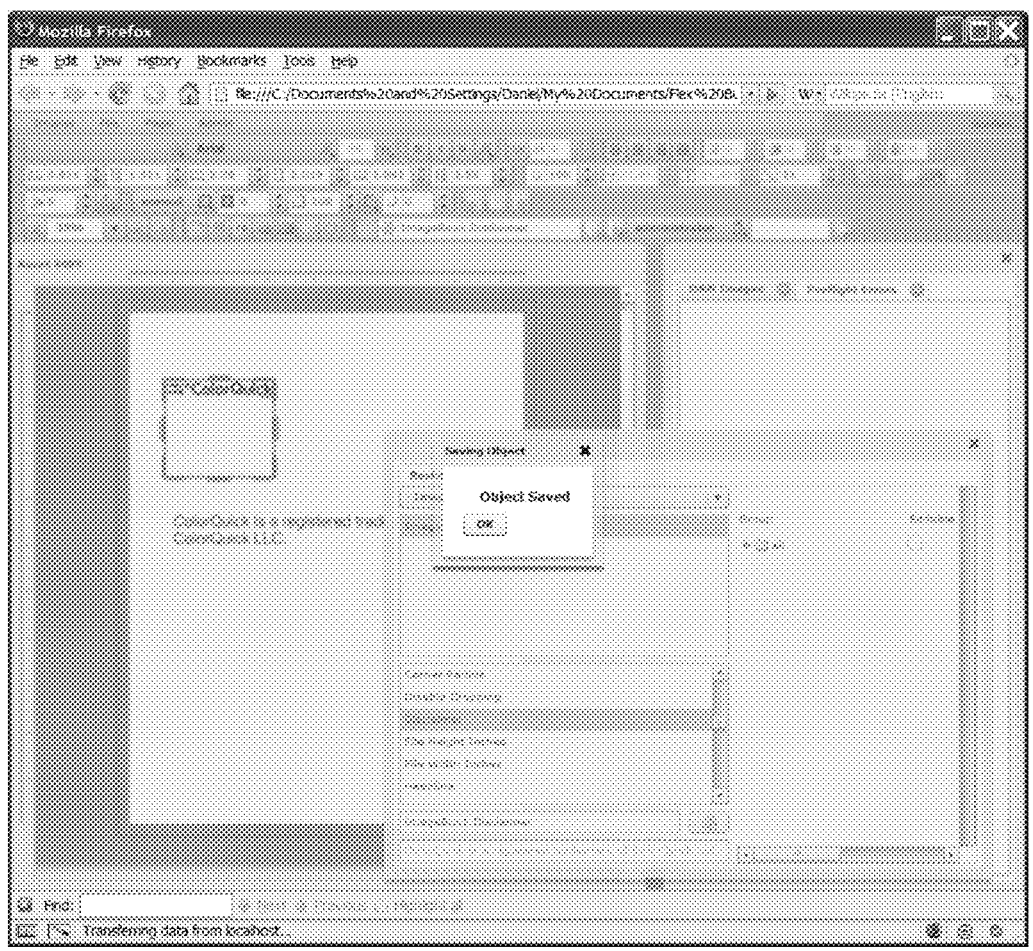

FIGS. 63-64 show the users saving the image box as a Smart Object in the same manner as discussed above.

Figure 65:
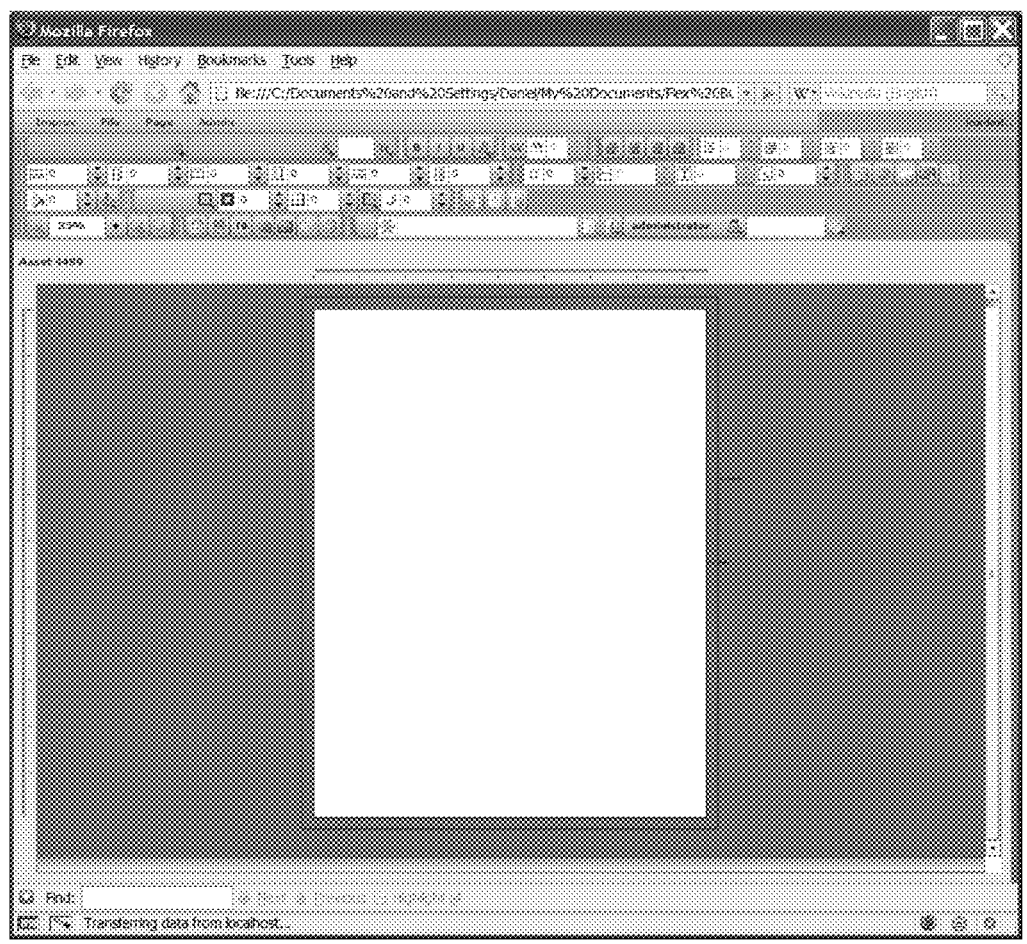

FIG. 65 shows a new document in a new instance of the application.

Figure 66:
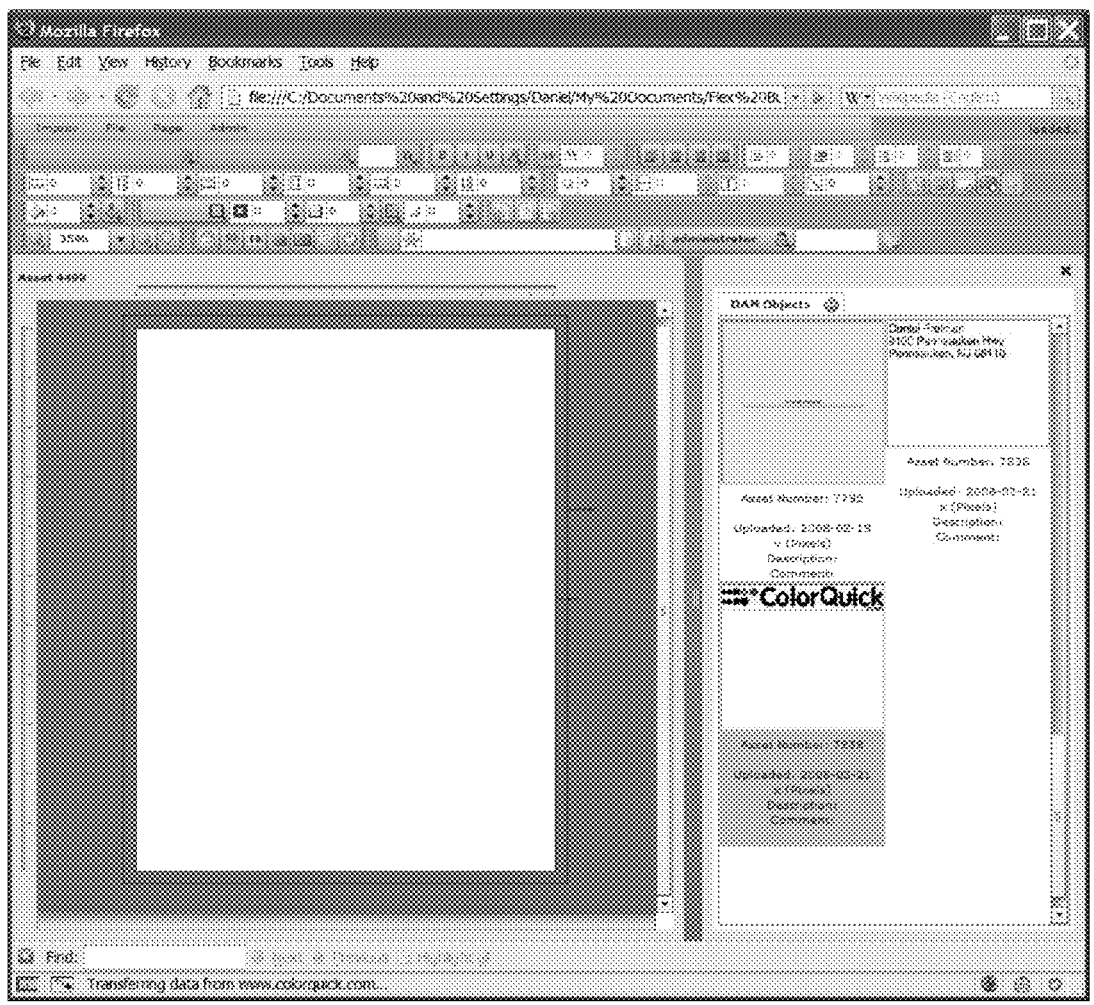
Figure 67:
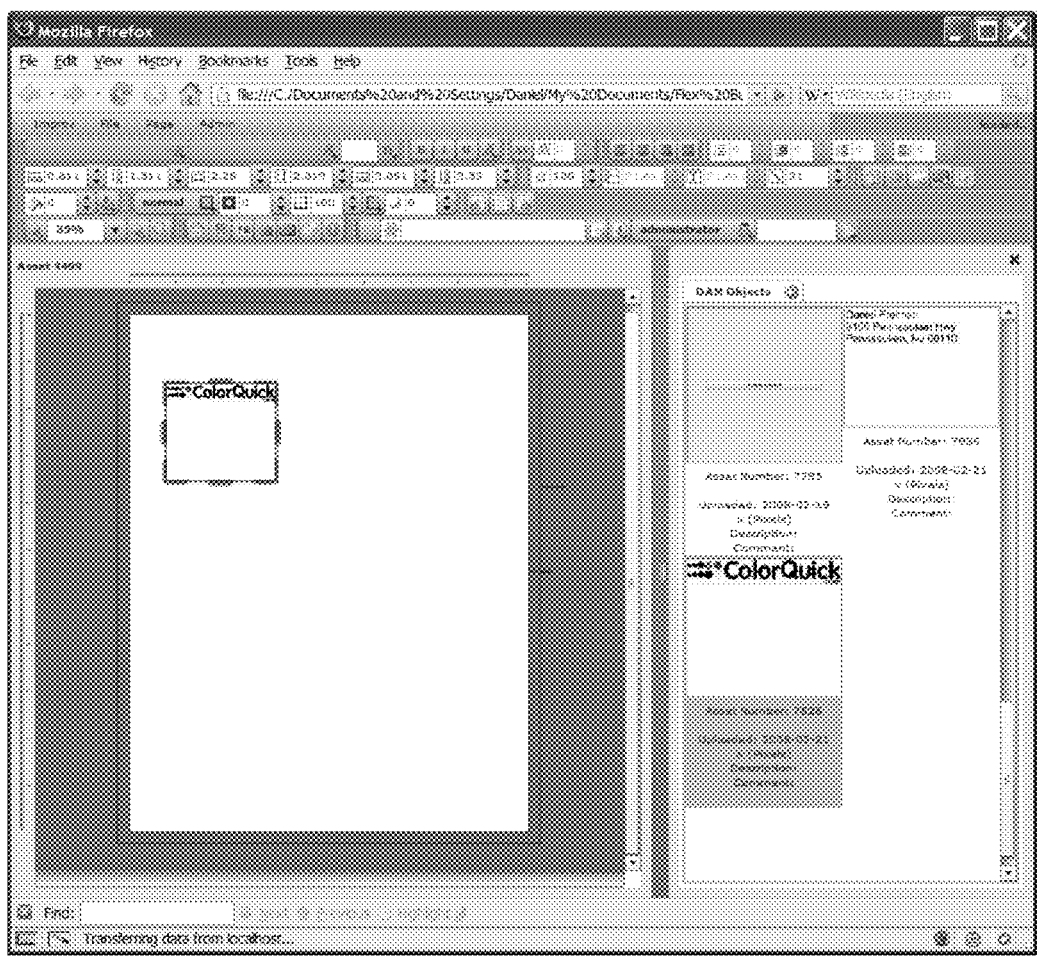
Figure 68:
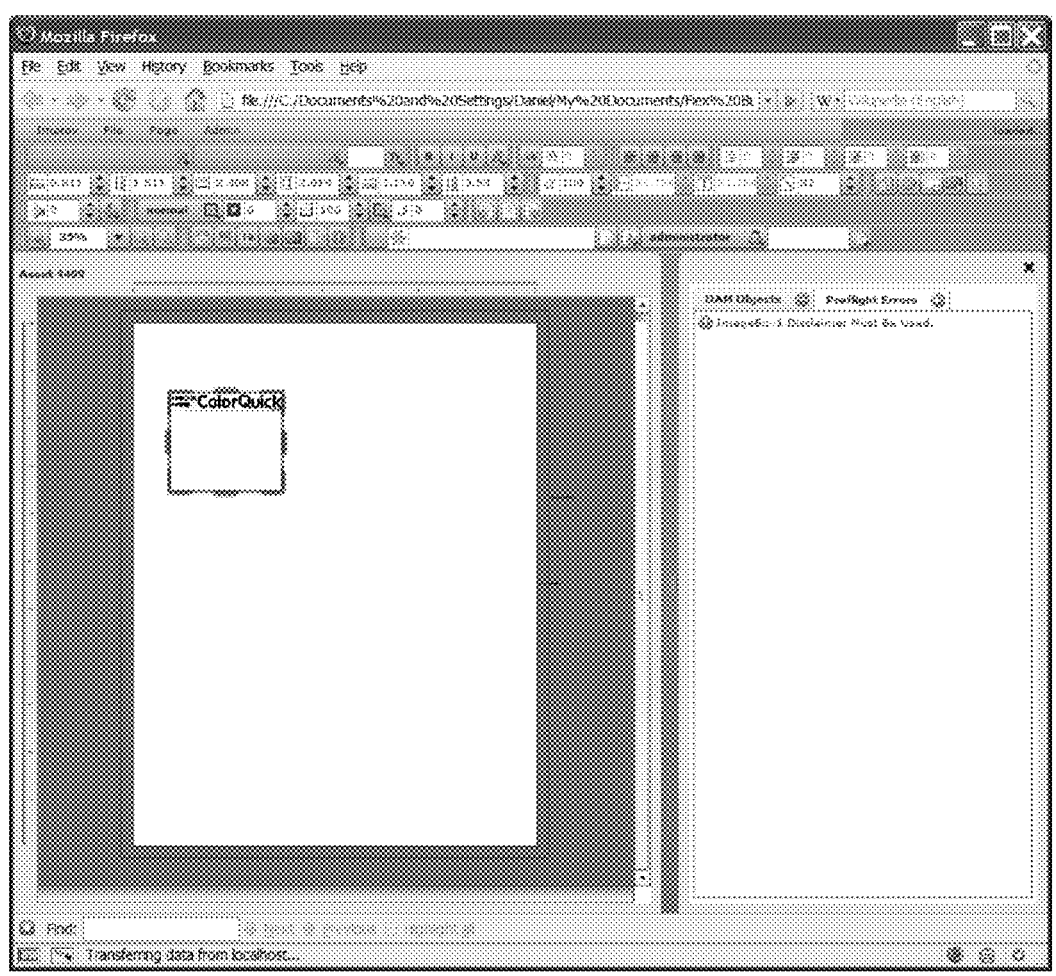

FIGS. 66-68 shows a user importing a copy of the previously saved Smart Object into the new document in the same manner as discussed above.

Figure 69:
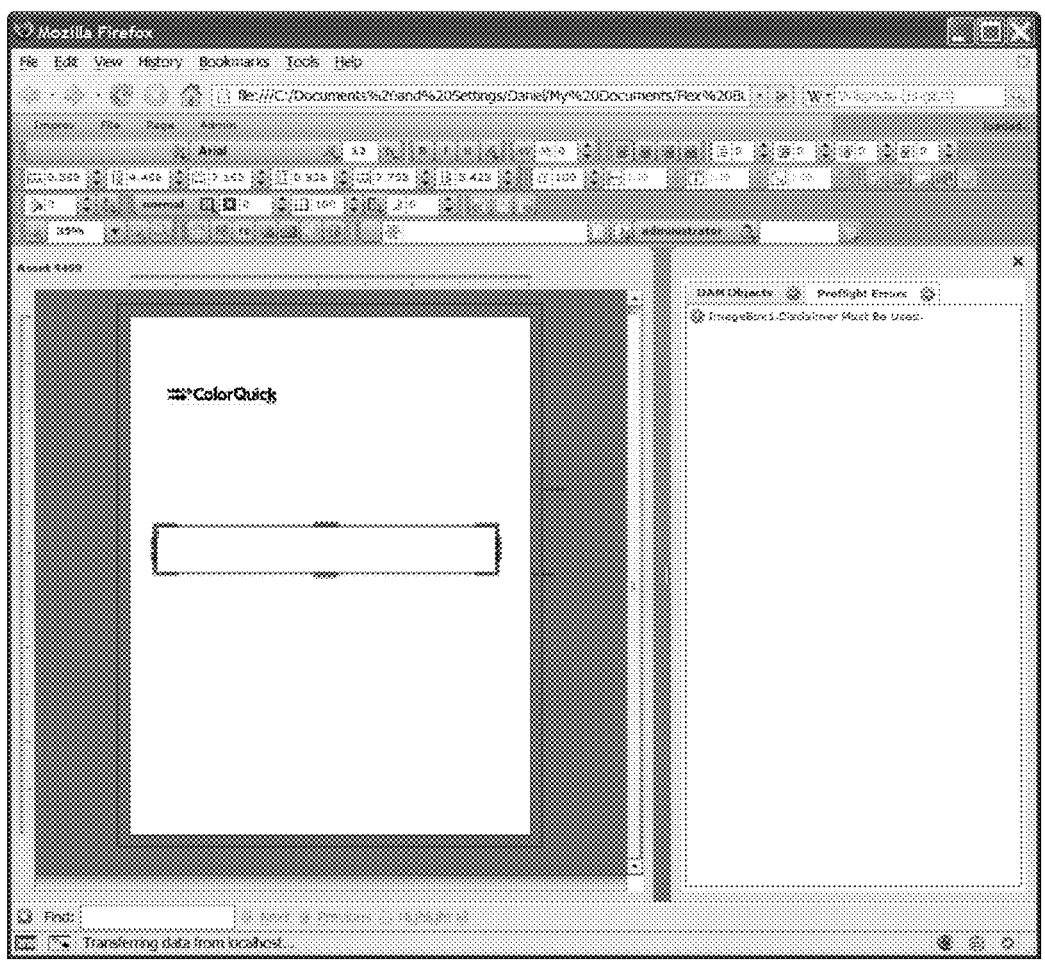
Figure 70:
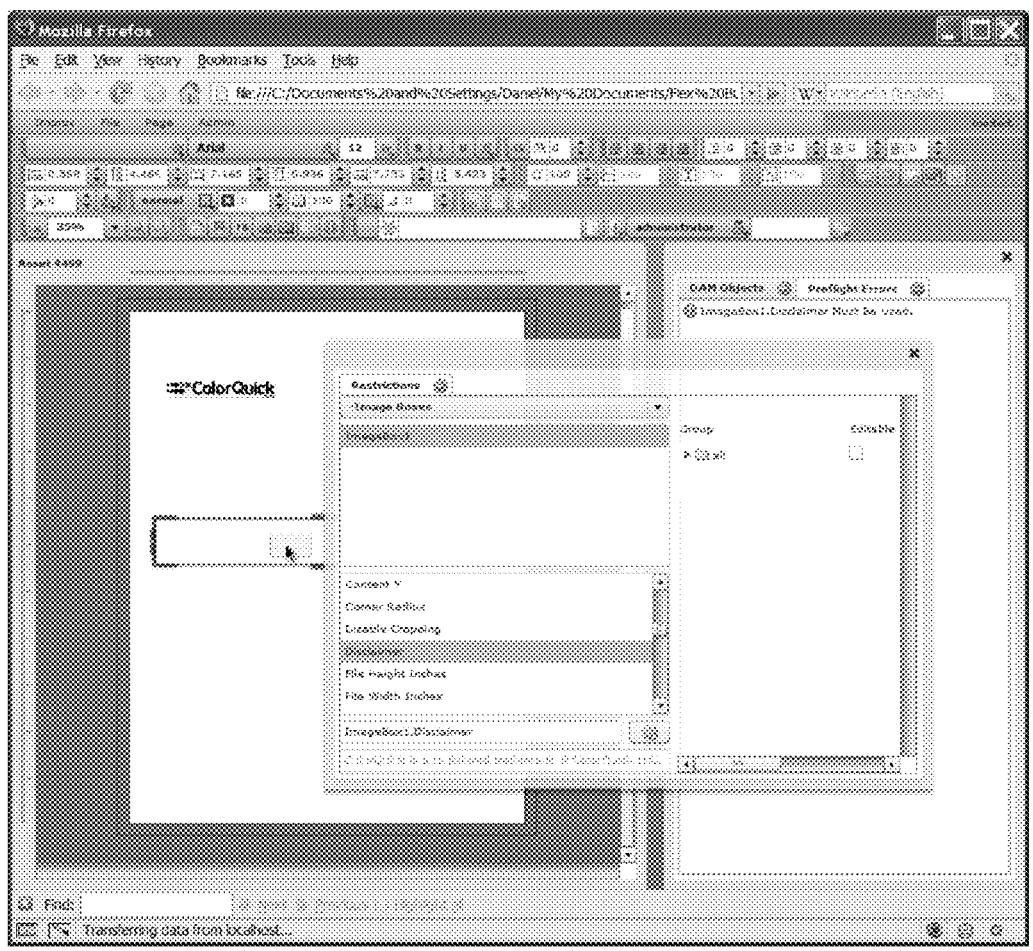
Figure 71:
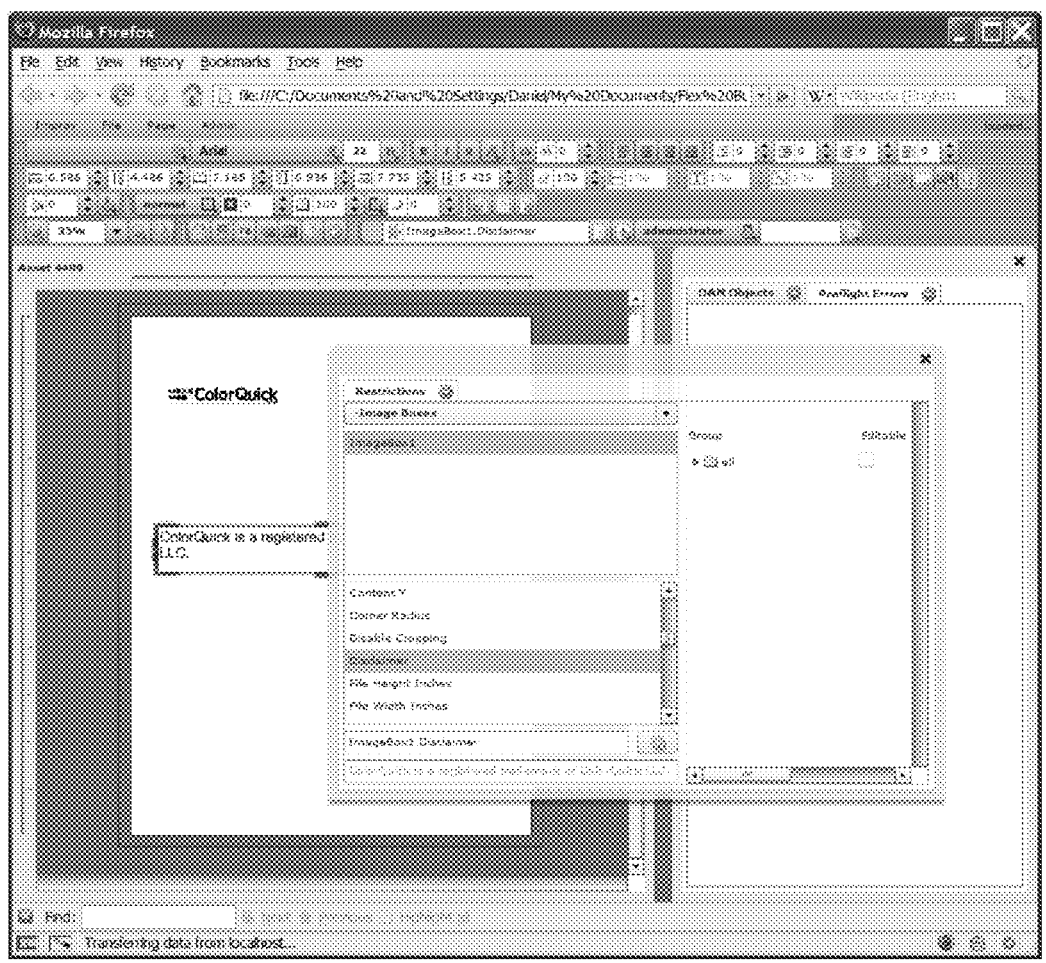

FIGS. 69-71 show the user creating a new text box and populating it with a variable in the same manner as shown in FIGS. 61A-61C and FIG. 62. Again, the error has been removed.

Figure 72:
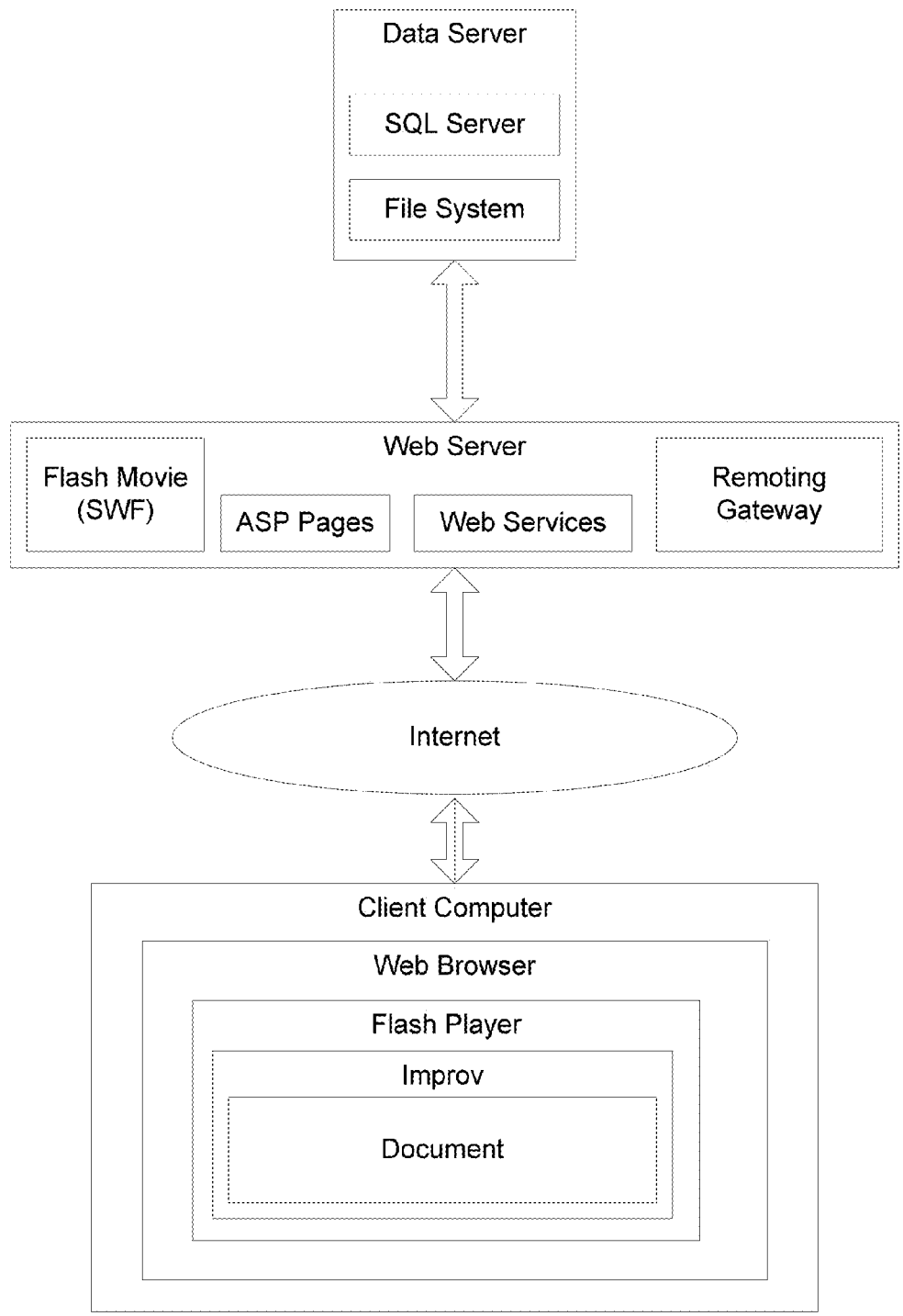
FIG. 72 is a schematic diagram of a hardware configuration in accordance with one preferred embodiment of the present invention.

FIG. 72 shows a self-explanatory hardware configuration for one preferred embodiment of the present invention.

As discussed above, rules may affect the appearance of an object (e.g., FIGS. 12-15 and 22-25). Rules can be simple or complex. For example, FIG. 6 shows a simple rule wherein the width of an image box is constrained to be exactly 3 inches. On the other hand, FIG. 34A shows a complex rule that can be expressed as follows:

"If the document type is an envelope, then the left side of the text box must be more than 0.5 inches from the left side of the page and less than the width of the page minus the width of the text box minus 0.5 inches from the left side of the page. Otherwise, the left side of the text box is unconstrained."

Included in the Appendix is sample source code from the client application shown in the figures, and server-side code that interacts with the aforementioned client application. The following information is provided to assist in an understanding of the sample source code:

a) The client-side application is a document composition application created with the Adobe® Flex® 2.0.1 framework and compiler. The server side code was implemented using ASP.NET and Weborb 3.3.

b) Calls to server-side methods retrieve assets (e.g., images, data lists, templates) which are identified by an integer id. Asset collections (list of images, list of smart objects), which is a list of all available assets of a given type, may also be retrieved. Lastly, documents may be received as templates identified by an integer, or job pages identified by a pair of integers.

c) Multiple files are included in the Appendix. Start of files are marked with "FILE START:" followed by the relative file path. The end of files are marked with "FILE END:" followed by the relative file path. These start and end lines are not part of compilable code. XML and XML list snippets are headed by appropriate comments. The syntax of the source code identifies what language the code is written in and thus how the code may be compiled and executed. For further detail, ".as" and ".mxml" files are client-side Adobe Flex files and ".cs" files are c# files server-side files.

d) The following additional information is provided to assist in the compiling of the client side code provided in the Appendix:
  i) Files in the mx.graphics packages and its sub-packages are not included in the Appendix. However, these files are only used to create graphical previews of objects and documents, and thus are not required for implementing the present invention.
  ii) The class "OpenNumericStepper" was omitted from the Appendix. This class is a derivative of the class NumericStepper from the Flex 2.0.1 framework. To recreate this class, the non-public properties and methods are changed to public properties and methods.
  iii) Artwork to be embedded in the application (e.g., icons) is not included. When compiling the code, replacement artwork should be provided as necessary.
  iv) Font files are not included. This application uses "embedded fonts" loaded from external Adobe Flash® files, but could be modified to use "device fonts" without changing the material functionality of the application.
  v) The uri of some locations have been redacted. The vast majority of the functionality at these locations is irrelevant to the functioning of this source code and can be ignored or coded around. Material functionality located at these locations is explicitly addressed below.

e) The following is a discussion of the relevant server-side code:
  i) The asp pages, referenced in the code as "imageDownloadPage" and "DAMThumbnailImagePage", are passed an asset number for an asset of type image. These pages return the asset image or thumbnail of the asset image, respectively.
  ii) Sample remoting code using WebORB is provided, including the List Provider MailingListProvider. MailingListProvider is included in the Appendix as a representative example of other List Providers that allow for the retrieval of list assets from the server to the client. The data serialization is the standard serialization done by WebORB.
  iii) The web service method "getImage" returns data for the image with the id that was passed to the method. An example of this data format is included in the Appendix.
  iv) The web service method "getDAMImages" returns a list of data for all image assets in the form of a list of xml. An example of this data format is included in the Appendix.
  v) The web service method "getDocument" is passed a template id, a job id and a page id. If the template id is not 0, then the template with that id is returned. Otherwise, the page of the job of the respectively passed ids is returned. In either event, a document is returned in xml format. An example document is included in the Appendix.
  vi) The web service method "saveDocument" is passed a document in xml format and an id. The document format is the same as the document format referred to in section v. A Boolean value and preview image are also passed, as seen in the client-side code in the Appendix. These items are not relevant to the functionality of the preferred embodiments and thus are not further discussed. If the document is a template, the template id is passed as the id. Otherwise, the job number and the page number separated by a comma is passed.
  vii) The web service method "getObjects" returns a list of all smart object assets in the form of a list of xml. An example of this data format is included in the Appendix.
  viii) The web service method "saveObject" takes a serialized version of a Smart Object. An example of this data format is included in the Appendix. A description, comment, and image preview are passed to this web method, as seen in the client-side code in the Appendix. These items are not relevant to the functionality of the preferred embodiments and thus are not further discussed. The server should save this serialized data with a new id so that when "getObjects" is next called, the newly saved objects are retrieved with all other preexisting objects in the same format as referenced in section vii.
  ix) Any GUIDs passed to a web method, as seen in the client-side code in the Appendix, are not relevant to the functionality of the preferred embodiments and thus are not further discussed.

In preferred embodiments described above and shown in the source code of the accompanying Appendix, the plurality of different environments is a plurality of different documents. In an alternative embodiment, the plurality of different environments may be a plurality of different applications.

One preferred embodiment of the present invention is implemented via the source code in the accompanying Appendix. However, the scope of the present invention is not limited to this particular implementation of the invention.

Figures include icons created by Mark James from "http://WorldWideWeb.famfamfam.com/lab/silk/" licensed under the Creative Commons Attribution 2.5 License.

The present invention may be implemented with any combination of hardware and software. If implemented as a computer-implemented apparatus, the present invention is implemented using means for performing all of the steps and functions described above.

The present invention can be included in an article of manufacture (e.g., one or more computer program products) having, for instance, computer useable media. The media has embodied therein, for instance, computer readable program code means for providing and facilitating the mechanisms of the present invention. The article of manufacture can be included as part of a computer system or sold separately.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention.

While the present invention has been particularly shown and described with reference to one preferred embodiment thereof, it will be understood by those skilled in the art that various alterations in form and detail may be made therein without departing from the spirit and scope of the present invention.

What is claimed is:

1. A method of employing an electronically manipulative object that is usable in a plurality of different electronic documents, the object comprising at least one electronically stored property that includes an associated rule that affects the object, the at least one property and associated rule being elements of the object, the object being manipulated in a manner that would violate the rule or in a manner that would not violate the rule, and wherein the object and the at least one property and associated rule exists outside of an electronic document that the object is used in, the rule associated with the at least one property being enforced in the plurality of different electronic documents, the method comprising:
   (a) importing a copy of the object, including the object's at least one electronically stored property that includes an associated rule, into an electronic document from outside of the electronic document; and
   (b) enforcing the rule associated with the at least one property of the object imported in step (a) in the electronic document, wherein if the object is manipulated in a manner that would violate the rule, the at least one property is automatically set to a value that does not violate the rule.

2. The method of claim 1 wherein the rule affects the appearance of the object.

3. A method of employing an electronically manipulative object that is usable in a plurality of different electronic documents, the object comprising at least one electronically stored property that includes an associated rule that affects the electronic document that the object is used in, the at least one property and associated rule being elements of the object, the object being manipulated in a manner that would violate the rule or in a manner that would not violate the rule, and wherein the object and the at least one property and associated rule exists outside of an electronic document that the object is used in, the rule associated with the at least one property being enforced in the plurality of different electronic documents, the method comprising:
   (a) importing a copy of the object, including the object's at least one electronically stored property that includes an associated rule, into an electronic document from outside of the electronic document; and
   (b) in the electronic document, enforcing the rule associated with the at least one property of the object imported in step (a), wherein if the object is manipulated in a manner that would violate the rule, displaying an indication of the violation.

4. The method of claim 3 wherein the rule is that certain text and/or images must be used in the electronic document whenever the object is used in the electronic document.

* * * * *